(12) United States Patent
Jung et al.

(10) Patent No.: US 11,736,729 B2
(45) Date of Patent: *Aug. 22, 2023

(54) VIDEO SIGNAL PROCESSING METHOD AND APPARATUS USING SECONDARY TRANSFORM

(71) Applicant: SAMSUNG ELECTRONICS CO., LTD., Suwon-si (KR)

(72) Inventors: Jaehong Jung, Seoul (KR); Juhyung Son, Uiwang-si (KR); Dongcheol Kim, Suwon-si (KR); Geonjung Ko, Seoul (KR); Jinsam Kwak, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,956

(22) Filed: Apr. 8, 2022

(65) Prior Publication Data

US 2022/0239948 A1 Jul. 28, 2022

Related U.S. Application Data

(63) Continuation of application No. 17/088,110, filed on Nov. 3, 2020, now Pat. No. 11,330,302, which is a
(Continued)

(30) Foreign Application Priority Data

Jun. 25, 2019 (KR) .................. 10-2019-0075438
Jul. 3, 2019 (KR) .................. 10-2019-0080390
Jul. 7, 2019 (KR) .................. 10-2019-0081763

(51) Int. Cl.
*H04N 19/61* (2014.01)
*H04N 19/132* (2014.01)
(Continued)

(52) U.S. Cl.
CPC ........... *H04N 19/61* (2014.11); *H04N 19/132* (2014.11); *H04N 19/176* (2014.11); *H04N 19/18* (2014.11); *H04N 19/70* (2014.11)

(58) Field of Classification Search
CPC .... H04N 19/61; H04N 19/132; H04N 19/176; H04N 19/18; H04N 19/70
See application file for complete search history.

(56) References Cited

U.S. PATENT DOCUMENTS

2017/0094313 A1 3/2017 Zhao et al.
2017/0324643 A1 11/2017 Seregin et al.
(Continued)

FOREIGN PATENT DOCUMENTS

CN 109076230 A 12/2018
CN 109076243 A 12/2018
(Continued)

OTHER PUBLICATIONS

Non-Final Rejection for U.S. Appl. No. 17/088,110 from the USPTO dated Jan. 13, 2021.
(Continued)

*Primary Examiner* — Fabio S Lima
(74) *Attorney, Agent, or Firm* — Sughrue Mion, PLLC

(57) ABSTRACT

A video signal decoding apparatus, comprising a processor, wherein the processor is configured to: parse a syntax element related to a secondary transform of a coding unit based on whether a prediction method of the coding unit is MIP (Matrix based Intra Prediction), check whether or not the secondary transform is applied to a transform block included in the coding unit based on the parsed syntax element, obtain one or more inverse transform coefficients based on an inverse transform of the secondary transform when the secondary transform is applied to the transform
(Continued)

block, obtain a residual sample for the transform block based on the one or more inverse transform coefficients.

20 Claims, 25 Drawing Sheets

Related U.S. Application Data continuation of application No. PCT/KR2020/008301, filed on Jun. 25, 2020.

(51) Int. Cl.
  *H04N 19/176*  (2014.01)
  *H04N 19/18*  (2014.01)
  *H04N 19/70*  (2014.01)

(56) References Cited

U.S. PATENT DOCUMENTS

| | | | |
|---|---|---|---|
| 2018/0288409 A1 | 10/2018 | Heo et al. | |
| 2019/0281321 A1* | 9/2019 | Zhao | H04N 19/61 |
| 2019/0387241 A1* | 12/2019 | Kim | H04N 19/11 |
| 2020/0177889 A1 | 6/2020 | Kim et al. | |
| 2020/0288134 A1 | 9/2020 | Lim et al. | |
| 2020/0314425 A1* | 10/2020 | Koo | H04N 19/122 |
| 2020/0322617 A1* | 10/2020 | Zhao | H04N 19/119 |
| 2020/0389666 A1* | 12/2020 | Zhao | H04N 19/70 |
| 2020/0396487 A1* | 12/2020 | Nalci | H04N 19/176 |

FOREIGN PATENT DOCUMENTS

| | | |
|---|---|---|
| KR | 10-2018-0048739 A | 5/2018 |
| KR | 10-2019-0003950 A | 1/2019 |
| WO | 2018-174402 A1 | 9/2018 |

OTHER PUBLICATIONS

Final Rejection for U.S. Appl. No. 17/088,110 from the USPTO dated Apr. 23, 2021.
Non-Final Rejection for U.S. Appl. No. 17/088,110 from the USPTO dated Aug. 30, 2021.
Notice of Allowance for U.S. Appl. No. 17/088,110 from the USPTO dated Jan. 12, 2022.
Supplemental Notice of Allowability for U.S. Appl. No. 17/088,110 from the USPTO dated Jan. 20, 2022.
Supplemental Notice of Allowability for U.S. Appl. No. 17/088,110 from the USPTO dated Mar. 28, 2022.
Notification of First Office Action (for PCT Application Entering Chinese National Phase) for CN Application No. 202080002631.0 from China National Intellectual Property Administration. Dated Apr. 2, 2022.
Search Report for CN Application No. 202080002631.0 from China National Intellectual Property Administration.
Notification for Patent Registration Formalities for CN Application No. 202080002631.0 from China National Intellectual Property Administration. Dated Oct. 8, 2022.
Decision to Grant a Patent for Japanese Patent Application No. 2020-562152 dated May 9, 2022.
Written Decision on Registration KR Application No. 10-2020-7032652 from KIPO dated Apr. 18, 2022.
International Search Report & Written Opinion of the International Searching Authoriity_PCT/KR2020/008301_dated Sep. 29, 2020.
Moonmo Koo et al, 'CE6: Reduced Secondary Transform (RST) (CE6-3.1)', JVET-N0193, Joint Video Experts Team (JVET) of ITU-T SG 16 WP 3 and ISO/IEC JTC 1/SC 29/WG 11 14th Meeting: Geneva, CH, Mar. 27, 2019.
Karam Naser et al., 'CE6-Related: NSST with 8 Coefficients Computation', JVET-N0509-v3, Joint Video Experts Team (JVET) of ITU-T SG 16 WP 3 and ISO/IEC JTC 1/SC 29/WG 11 14th Meeting: Geneva, CH, Mar. 22, 2019.
Jianle Chen et al, Algorithm description for Versatile Video Coding andTest Model 5 (VTM 5), JVET of ITU-T and ISOIEC, 14th meeting, JVET-N1002-v1(May 21, 2019).
Mischa Siekmann et al, CE6-2.1 Simplification of Low Frequency Non-Separable Transform, JVET-O0094-draft-text-based on—JVET-N1001-v8 (Jun. 18, 2019).
Office Action from KIPO for Corresponding Korean application No. KR10-2020-7032652 dated Oct. 20, 2021.
Man-Shu Chiang, et al., CE6-related: Latency reductionfor LFNST signalling, Joint Video Experts Team (JVET) of ITU-T SG 16 WP3 and ISO/IEC JTC 1/SC 29/WG 11, JVET-O0293-v5, 15th Meeting: Gothenburg, SE, Jul. 2019, pp. 1-11.
Jason Jung, et al., Non-CE6: Simplified LFNST signalling, Joint Video Experts Team (JVET) of ITU-T SG 16 WP 3 and ISO/IEC JTC1/SC 29/WG 11, JVET-O0472-v5, 15th Meeting : Gothenburg, SE, Jul. 2019, pp. 1-5.
Alican Nalci, et al., Non-CE6: Combination of JVET-O0472 and JVET-O0569 for TU-level LFNST Signaling with Last Position Constraints, Joint Video Experts Team (JVET) of ITU-T SG 16 WP 3 and ISO/IEC JTC 1/SC 29/WG 11, JVET-O0963-v4, 15th Meeting: Gothenburg, SE, Jul. 2019, pp. 1-10.
Bross B et al: "Versatile Video Coding (Draft 5)", 126. MPEG Meeting; Mar. 25, 2019-Mar. 29, 2019; Geneva; (Motion Picture Expert Group of ISO/IEC JTC1/SC29/WG11), No. m48053 Jun. 11, 2019 (Jun. 11, 2019), XP030212626, Retrieved from the Internet: URL: http://phenix.int-evry.fr/mpeg/doc_end_user/documents/126_Geneva_wg11/m48053-JVET-N1001-v8.zip JVET-N1001-v8.docx [retrieved on Jun. 11, 2019].
Siekmann (Fraunhofer) M et al: "CE6-2.1: Simplification of Low Frequency Non-Separable Transform", 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-O0094 Jun. 18, 2019 (Jun. 18, 2019), XP030205632, Retrieved from the Internet: URL: http://phenix.int-evry.fr/jvet/doc_end_user/documents/15_Gothenburg/wg11/JVET-O0094-v1.zip JVET-O0094.docx [retrieved on Jun. 18, 2019].
Jung (Wilusgroup) J et al: "Non-CE6: Simplified LFNST signaling", 127. MPEG Meeting; Jul. 8, 2019-Jul. 12, 2019; Gothenburg; (Motion Picture Expert Group or ISO/IEC JTC1/SC29/WG11), No. m48595 Jul. 6, 2019 (Jul. 6, 2019), XP030222140, Retrieved from the Internet: URL: http://phenix.int-evry.fr/mpeg/doc_end_user/documents/127_Gothenburg/wg11/m48595-JVET-O0472-v4-JVET-O0472.zip JVET-O0472-v4-clean.docx [retrieved on Jul. 6, 2019].
Extended European Search Report(EESR) for Application No. 20797644.0-1208(EP 20797644) dated Feb. 11, 2022.
Examination Report under sections 12 & 13 of the Patents Act, 1970 and the Patents Rules, 2003 for Application No. 202027048216 from Intellectual Property India. dated Feb. 1, 2022.
Office Action for Japanese Patent Application No. 2020-562152 from JPO dated Jan. 12, 2022.
Shrestha et al, 'Non-CE3: Simplification of harmonization for LFNST and MIP', JVET-P0503, Joint Video Experts earn (JVET) of ITU-T SG 16 WG 05 MPEG Joint Video Coding Team(s) with ITU-T SG 16: Geneva, Oct (Year: 2019).
Communication pursuant to Article 94(3) EPC for EP Application No. 20797644.0-1208, dated Nov. 16, 2022.
Communication dated Mar. 31, 2023 by the European Patent Office in corresponding European Application No. 20797644.0.
Communication dated Apr. 25, 2023 by the Japanese Patent Office in counterpart Japanese Application No. 2022-096604.

\* cited by examiner

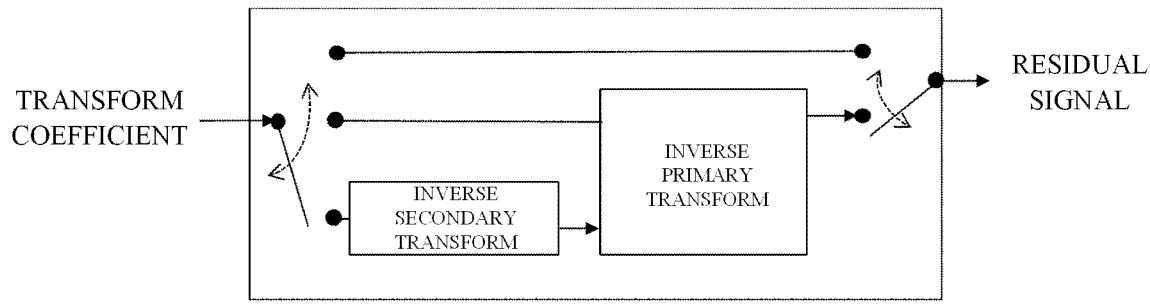

FIG. 8

| Transform Type | Basis function $T_i(j)$, $i,j=0, 1,\ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br><br>where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$,<br><br>where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

FIG. 9

```
i = 0
x = 0
y = 0
stopLoop = FALSE
while( !stopLoop ) {
  while( y >= 0 ) {
    if( x < blkWidth  &&  y < blkHeight ) {
      diagScan[ i ][ 0 ] = x
      diagScan[ i ][ 1 ] = y
      i++
    }
    y--
    x++
  }
  y = x
  x = 0
  if( i >= blkWidth * blkHeight )
    stopLoop = TRUE
}
```

FIG. 13

DiagScanOrder[2][2]

| y \ x | 0 | 1 | 2 | 3 |
|---|---|---|---|---|
| 0 | 0 | 2 | 5 | 9 |
| 1 | 1 | 4 | 8 | 12 |
| 2 | 3 | 7 | 11 | 14 |
| 3 | 6 | 10 | 13 | 15 |

(a)

DiagScanOrder[3][3]

| y \ x | 0 | 1 | 2 | 3 | 4 | 5 | 6 | 7 |
|---|---|---|---|---|---|---|---|---|
| 0 | 0 | 2 | 5 | 9 | 14 | 20 | 27 | 35 |
| 1 | 1 | 4 | 8 | 13 | 19 | 26 | 34 | 42 |
| 2 | 3 | 7 | 12 | 18 | 25 | 33 | 41 | 48 |
| 3 | 6 | 11 | 17 | 24 | 32 | 40 | 47 | 53 |
| 4 | 10 | 16 | 23 | 31 | 39 | 46 | 52 | 57 |
| 5 | 15 | 22 | 30 | 38 | 45 | 51 | 56 | 60 |
| 6 | 21 | 29 | 37 | 44 | 50 | 55 | 59 | 62 |
| 7 | 28 | 36 | 43 | 49 | 54 | 58 | 61 | 63 |

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ]  !=  MODE_INTRA  &&<br>      general_merge_flag[ x0 ][ y0 ]  ==  0 ) | |
|       cu_cbf | ae(v) |
|     if( cu_cbf ) { | |
|       ... | |
|       numSigCoeff = 0 | |
|       numZeroOutSigCoeff = 0 | |
|       transform_tree( x0, y0, cbWidth, cbHeight, treeType ) | |
|       lfnstWidth = ( treeType  ==  DUAL_TREE_CHROMA ) ? cbWidth / SubWidthC<br>                  : cbWidth | |
|       lfnstHeight = ( treeType  ==  DUAL_TREE_CHROMA ) ? cbHeight / SubHeightC<br>                  : cbHeight | |
|       if( Min( lfnstWidth, lfnstHeight )  >=  4 &&  sps_lfnst_enabled_flag  ==  1 &&<br>        CuPredMode[ x0 ][ y0 ]  ==  MODE_INTRA  &&<br>        IntraSubPartitionsSplitType  ==  ISP_NO_SPLIT  &&<br>        !intra_mip_flag[ x0 ][ y0 ] ) { | |
|         if( ( numSigCoeff > ( ( treeType  ==  SINGLE_TREE ) ? 2 : 1 ) ) &&<br>          numZeroOutSigCoeff  ==  0 ) | |
|           lfnst_idx[ x0 ][ y0 ] | ae(v) |
|       } | |
|     } | |
|   } | |
| } | |

*FIG. 15*

| residual_coding( x0, y0, log2TbWidth, log2TbHeight, cIdx ) { | Descriptor |
|---|---|
| ... | |
|   for( i = lastSubBlock; i >= 0; i− − ) { | |
| ... | |
|     for( n = firstPosMode0; n >= 0 && remBinsPass1 >= 4; n− − ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if( coded_sub_block_flag[ xS ][ yS ] && ( n > 0 \|\| !inferSbDcSigCoeffFlag ) && <br>         ( xC != LastSignificantCoeffX \|\| yC != Last SignificantCoeffY ) ) { | |
|         sig_coeff_flag[ xC ][ yC ] | ae(v) |
|         remBinsPass1− − | |
|         if( sig_coeff_flag[ xC ][ yC ] ) | |
|           inferSbDcSigCoeffFlag = 0 | |
|       } | |
|       if( sig_coeff_flag[ xC ][ yC ] ) { | |
|         if( !transform_skip_flag[ x0 ][ y0 ] ) { | |
|           numSigCoeff++ | |
|           if( ( ( ( log2TbWidth == 2 && log2TbHeight == 2 ) \|\| <br>             ( log2TbWidth == 3 && log2TbHeight == 3 ) ) && n >= 8 && i == 0 ) \|\| <br>             ( log2TbWidth >= 3 && log2TbHeight >= 3 && ( i == 1 \|\| i == 2 ) ) ) { | |
|             numZeroOutSigCoeff++ | |
|           } | |
|         } | |
| ... | |
|       } | |
| ... | |
|     } | |
| ... | |
|   } // end for sub-blcok loop | |
| } // end for residual_coding | |

*FIG. 16*

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ] != MODE_INTRA && <br>       general_merge_flag[ x0 ][ y0 ] == 0 ) | |
|       cu_cbf | ae(v) |
|     if( cu_cbf ) { | |
|       ... | |
|       ~~numSigCoeff = 0~~ | |
|       numZeroOutSigCoeff = 0 | |
|       transform_tree( x0, y0, cbWidth, cbHeight, treeType ) | |
|       lfnstWidth = ( treeType == DUAL_TREE_CHROMA ) ? cbWidth / SubWidthC <br>         : cbWidth | |
|       lfnstHeight = ( treeType == DUAL_TREE_CHROMA ) ? cbHeight / SubHeightC <br>         : cbHeight | |
|       if( Min( lfnstWidth, lfnstHeight ) >= 4 && sps_lfnst_enabled_flag == 1 && <br>         CuPredMode[ x0 ][ y0 ] == MODE_INTRA && <br>         IntraSubPartitionsSplitType == ISP_NO_SPLIT && <br>         !intra_mip_flag[ x0 ][ y0 ] ) { | |
|         if( ~~( numSigCoeff > ( ( treeType == SINGLE_TREE ) ? 2 : 1 ) ) &&~~ <br>           numZeroOutSigCoeff == 0 ) | |
|           lfnst_idx[ x0 ][ y0 ] | ae(v) |
|       } | |
|     } | |
|   } | |
| } | |

*FIG. 17*

| coding_unit( x0, y0, cbWidth, cbHeight, treeType ) { | Descriptor |
|---|---|
| ... | |
| if( !pcm_flag[ x0 ][ y0 ] ) { | |
|   if( CuPredMode[ x0 ][ y0 ] != MODE_INTRA && <br>     general_merge_flag[ x0 ][ y0 ] == 0 ) | |
|     cu_cbf | ae(v) |
|   if( cu_cbf ) { | |
|     ... | |
|     ~~numSigCoeff = 0~~ | |
|     ~~lfnstLastScanPos = 1~~ | |
|     numZeroOutSigCoeff = 0 | |
|     transform_tree( x0, y0, cbWidth, cbHeight, treeType ) | |
|     lfnstWidth = ( treeType == DUAL_TREE_CHROMA ) ? cbWidth / SubWidthC <br>         : cbWidth | |
|     lfnstHeight = ( treeType == DUAL_TREE_CHROMA ) ? cbHeight / SubHeightC <br>         : cbHeight | |
|     if( Min( lfnstWidth, lfnstHeight ) >= 4 && sps_lfnst_enabled_flag == 1 && <br>       CuPredMode[ x0 ][ y0 ] == MODE_INTRA && <br>       IntraSubPartitionsSplitType == ISP_NO_SPLIT && <br>       !intra_mip_flag[ x0 ][ y0 ] ) { | |
|       if( ~~( numSigCoeff > ( ( treeType == SINGLE_TREE ) ? 2 : 1 ) )~~ <br>         lfnstLastScanPos == 0 && numZeroOutSigCoeff == 0 ) | |
|         lfnst_idx[ x0 ][ y0 ] | ae(v) |
|     } | |
|   } | |
| } | |
| } | |

*FIG. 18*

| residual_coding( x0, y0, log2TbWidth, log2TbHeight, cIdx ) { | Descriptor |
|---|---|
| ... | |
| lastScanPos = numSbCoeff | |
| lastSubBlock = ( 1 << ( log2TbWidth + log2TbHeight − ( log2SbW + log2SbH ) ) ) − 1 | |
| do { | |
|     if( lastScanPos == 0 ) { | |
|         lastScanPos = numSbCoeff | |
|         lastSubBlock− − | |
|     } | |
|     lastScanPos− − | |
| ... | |
| } while( ( xC != LastSignificantCoeffX ) || ( yC != LastSignificantCoeffY ) ) | |
| if( log2TbWidth >= 2 && log2TbHeight >= 2 && !transform_skip_flag[ x0 ][ y0 ] ) { | |
|     lfnstLastScanPos = lfnstLastScanPos && ( lastScanPos < lfnstLastScanPosTb[ cIdx ] ) | |
| } | |
| QState = 0 | |
| for( i = lastSubBlock; i >= 0; i− − ) { | |
|     ... | |
|     if( ( i < lastSubBlock ) && ( i > 0 ) ) { | |
|         coded_sub_block_flag[ xS ][ yS ] | ae(v) |
|         inferSbDcSigCoeffFlag = 1 | |
|     } | |
|     ... | |
|     firstPosMode0 = ( i == lastSubBlock ? lastScanPos : numSbCoeff − 1 ) | |
|     firstPosMode1 = −1 | |
|     for( n = firstPosMode0; n >= 0 && remBinsPass1 >= 4; n− − ) { | |
|         ... | |
|         if( coded_sub_block_flag[ xS ][ yS ] && ( n > 0 \|\| !inferSbDcSigCoeffFlag ) &&<br>          ( xC != LastSignificantCoeffX \|\| yC != LastSignificantCoeffY ) ) { | |
|           sig_coeff_flag[ xC ][ yC ] | ae(v) |
|         ... | |
|         } | |
|         if( sig_coeff_flag[ xC ][ yC ] ) { | |
|           if( !transform_skip_flag[ x0 ][ y0 ] ) { | |
|             ~~numSigCoeff++~~ | |
|             if( ( n >= 8 && i == 0 && ( log2TbWidth == 2 \|\| log2TbWidth == 3 )<br>                && ( log2TbWidth == log2TbHeight ) ) \|\| ( ( i == 1 \|\| i == 2 )<br>            && log2TbWidth >= 3 && log2TbHeight >= 3 ) ) | |
|                 numZeroOutSigCoeff++ | |
|           } // if( transform_skip_flag[ x0 ][ y0 ] ) | |
|         ... | |
|         } // if( sig_coeff_flag[ x0 ][ y0 ] ) | |
|         ... | |
|     } // 1st pass | |
|     ... | |
| } // Sub-block loop | |
| } | |

*FIG. 19*

| residual_coding( x0, y0, log2TbWidth, log2TbHeight, cIdx, treeType ) { | Descriptor |
|---|---|
| ... | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos == 0 ) { | |
|       lastScanPos = numSbCoeff | |
|       lastSubBlock− − | |
|     } | |
|     lastScanPos− − | |
|     ... | |
|   } while( ( xC != LastSignificantCoeffX ) || ( yC != LastSignificantCoeffY ) ) | |
|   if( log2TbWidth >= 2 && log2TbHeight >= 2 && !transform_skip_flag[ x0 ][ y0 ] ) { | |
|     lfnstLastScanPosTh = ( treeType == SINGLE_TREE ) ? val1 : | |
|                    ( ( treeType == DUAL_TREE_LUMA ) ? val2 : val3 ) | |
|     lfnstLastScanPos = lfnstLastScanPos && ( lastScanPos < lfnstLastScanPosTh ) | |
|   } | |
|   QState = 0 | |
|   for( i = lastSubBlock; i >= 0; i− − ) { | |
|     ... | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     ... | |
|     firstPosMode0 = ( i == lastSubBlock ? lastScanPos : numSbCoeff − 1 ) | |
|     firstPosMode1 = −1 | |
|     for( n = firstPosMode0; n >= 0 && remBinsPass1 >= 4; n− − ) { | |
|       ... | |
|       if( coded_sub_block_flag[ xS ][ yS ] && ( n > 0 || !inferSbDcSigCoeffFlag ) && | |
|         ( xC != LastSignificantCoeffX || yC != Last SignificantCoeffY ) ) { | |
|         sig_coeff_flag[ xC ][ yC ] | ae(v) |
|         ... | |
|       } | |
|       if( sig_coeff_flag[ xC ][ yC ] ) { | |
|         if( !transform_skip_flag[ x0 ][ y0 ] ) { | |
|           numSigCoeff++ | |
|           if( ( n >= 8 && i == 0 && ( log2TbWidth == 2 || log2TbWidth == 3 ) | |
|               && ( log2TbWidth == log2TbHeight ) ) || ( ( i == 1 || i == 2 ) | |
|             && log2TbWidth >= 3 && log2TbHeight >= 3 ) ) | |
|             numZeroOutSigCoeff++ | |
|         } // if( transform_skip_flag[ x0 ][ y0 ] | |
|         ... | |
|       } // if( sig_coeff_flag[ x0 ][ y0 ] | |
|       ... | |
|     } // 1st pass | |
|     ... | |
|   } // Sub-block loop | |
| } | |

*FIG. 20*

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ] != MODE_INTRA && <br>       general_merge_flag[ x0 ][ y0 ] == 0 ) | |
|       cu_cbf | ae(v) |
|     if( cu_cbf ) { | |
|       ... | |
|       ~~numSigCoeff = 0~~ | |
|       lfnstLastScanPos = 0 | |
|       numZeroOutSigCoeff = 0 | |
|       transform_tree( x0, y0, cbWidth, cbHeight, treeType ) | |
|       lfnstWidth = ( treeType == DUAL_TREE_CHROMA ) ? cbWidth / SubWidthC <br>         : cbWidth | |
|       lfnstHeight = ( treeType == DUAL_TREE_CHROMA ) ? cbHeight / SubHeightC <br>         : cbHeight | |
|       if( Min( lfnstWidth, lfnstHeight ) >= 4 && sps_lfnst_enabled_flag == 1 && <br>         CuPredMode[ x0 ][ y0 ] == MODE_INTRA && <br>         IntraSubPartitionsSplitType == ISP_NO_SPLIT && <br>         !intra_mip_flag[ x0 ][ y0 ] ) { | |
|         if( ~~( numSigCoeff > ( ( treeType == SINGLE_TREE ) ? 2 : 1 ) )~~ <br>           lfnstLastScanPos > ( ( treeType == SINGLE_TREE ) ? Th1 : <br>           ( ( treeType == DUAL_TREE_LUMA ) ? Th2 : Th3 ) ) <br>           && numZeroOutSigCoeff == 0 ) | |
|           lfnst_idx[ x0 ][ y0 ] | ae(v) |
|       } | |
|     } | |
|   } | |
| } | |

*FIG. 21*

| | Descriptor |
|---|---|
| residual_coding( x0, y0, log2TbWidth, log2TbHeight, cIdx ) { | |
| ... | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos == 0 ) { | |
|       lastScanPos = numSbCoeff | |
|       lastSubBlock− − | |
|     } | |
|     lastScanPos− − | |
|     ... | |
|   } while( ( xC != LastSignificantCoeffX ) \|\| ( yC != LastSignificantCoeffY ) ) | |
|   if( log2TbWidth >= 2 && log2TbHeight >= 2 && !transform_skip_flag[ x0 ][ y0 ] ) { | |
|     lfnstLastScanPos = lfnstLastScanPos − lastScanPos | |
|   } | |
|   QState = 0 | |
|   for( i = lastSubBlock; i >= 0; i− − ) { | |
|     ... | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     ... | |
|     firstPosMode0 = ( i == lastSubBlock ? lastScanPos : numSbCoeff − 1 ) | |
|     firstPosMode1 = −1 | |
|     for( n = firstPosMode0; n >= 0 && remBinsPass1 >= 4; n− − ) { | |
|       ... | |
|       if( coded_sub_block_flag[ xS ][ yS ] && ( n > 0 \|\| !inferSbDcSigCoeffFlag ) && | |
|         ( xC != LastSignificantCoeffX \|\| yC != Last SignificantCoeffY ) ) { | |
|         sig_coeff_flag[ xC ][ yC ] | ae(v) |
|         ... | |
|       } | |
|       if( sig_coeff_flag[ xC ][ yC ] ) { | |
|         if( !transform_skip_flag[ x0 ][ y0 ] ) { | |
|           numSigCoeff++ | |
|           if( ( n >= 8 && i == 0 && ( log2TbWidth == 2 \|\| log2TbWidth == 3 ) | |
|             && ( log2TbWidth == log2TbHeight ) ) \|\| ( ( i == 1 \|\| i == 2 ) | |
|           && log2TbWidth >= 3 && log2TbHeight >= 3 ) ) | |
|           numZeroOutSigCoeff++ | |
|         } // if( transform_skip_flag[ x0 ][ y0 ] | |
|         ... | |
|       } // if( sig_coeff_flag[ x0 ][ y0 ] | |
|       ... | |
|     } // 1st pass | |
|     ... | |
|   } // Sub-block loop | |
| } | |

*FIG. 22*

| transform_unit( x0, y0, tbWidth, tbHeight, treeType, subTuIndex ) { | Descriptor |
|---|---|
| ... | |
|   lfnstLastScanPos = 1 | |
|   numZeroOutSigCoeff = 0 | |
|   if( tu_cbf_luma[ x0 ][ y0 ] ) { | |
|     if( !transform_skip_flag[ x0 ][ y0 ] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   if( tu_cbf_cb[ x0 ][ y0 ] ) | |
|     residual_coding( xC, yC, Log2( wC ), Log2( hC ), 1 ) | |
|   if( tu_cbf_cr[ x0 ][ y0 ] ) { | |
|     if( tu_cbf_cb[ x0 ][ y0 ] ) | |
|       tu_joint_cbcr_residual[ x0 ][ y0 ] | ae(v) |
|     if( !tu_joint_cbcr_residual[ x0 ][ y0 ] ) | |
|       residual_coding( xC, yC, Log2( wC ), Log2( hC ), 2 ) | |
|   } | |
|   lfnstWidth = ( treeType == DUAL_TREE_CHROMA ) ? tbWidth / SubWidthC<br>        : tbWidth | |
|   lfnstHeight = ( treeType == DUAL_TREE_CHROMA ) ? tbHeight / SubHeightC<br>        : tbHeight | |
|   if( min( lfnstWidth, lfnstHeight ) >= 4 && sps_lfnst_enabled_flag == 1 &&<br>    CuPredMode[ x0 ][ y0 ] == MODE_INTRA &&<br>    IntraSubPartitionsSplitType == ISP_NO_SPLIT &&<br>    !intra_mip_flag[ x0 ][ y0 ] ) { | |
|     if( lfnstLastScanPos == 0 && numZeroOutSigCoeff == 0 ) | |
|       lfnst_idx[ x0 ][ y0 ] | ae(v) |
|   } | |
| } | |

*FIG. 23*

| transform_unit( x0, y0, tbWidth, tbHeight, treeType, subTuIndex ) { | Descriptor |
|---|---|
| ... | |
| lfnstLastScanPos = 0 | |
| numZeroOutSigCoeff = 0 | |
| if( tu_cbf_luma[ x0 ][ y0 ] ) { | |
|   if( !transform_skip_flag[ x0 ][ y0 ] ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) | |
|   residual_coding( xC, yC, Log2( wC ), Log2( hC ), 1 ) | |
| if( tu_cbf_cr[ x0 ][ y0 ] ) { | |
|   if( tu_cbf_cb[ x0 ][ y0 ] ) | |
|     tu_joint_cbcr_residual[ x0 ][ y0 ] | ae(v) |
|   if( !tu_joint_cbcr_residual[ x0 ][ y0 ] ) | |
|     residual_coding( xC, yC, Log2( wC ), Log2( hC ), 2 ) | |
| } | |
| lfnstWidth = ( treeType == DUAL_TREE_CHROMA ) ? tbWidth / SubWidthC <br>     : tbWidth | |
| lfnstHeight = ( treeType == DUAL_TREE_CHROMA ) ? tbHeight / SubHeightC <br>     : tbHeight | |
| if( min( lfnstWidth, lfnstHeight ) >= 4 && sps_lfnst_enabled_flag == 1 && <br>   CuPredMode[ x0 ][ y0 ] == MODE_INTRA && <br>   IntraSubPartitionsSplitType == ISP_NO_SPLIT && <br>   !intra_mip_flag[ x0 ][ y0 ] ) { | |
|   if( lfnstLastScanPos > ( ( treeType == SINGLE_TREE ) ? Th1 : <br>   ( ( treeType == DUAL_TREE_LUMA ) ? Th2 : Th3 ) ) <br>   && numZeroOutSigCoeff == 0 ) | |
|     lfnst_idx[ x0 ][ y0 ] | ae(v) |
| } | |
| } | |

*FIG. 24*

| coding_unit( x0, y0, cbWidth, cbHeight, treeType ) { | Descriptor |
|---|---|
| ... | |
|   if( !pcm_flag[ x0 ][ y0 ] ) { | |
|     if( CuPredMode[ x0 ][ y0 ] != MODE_INTRA && <br>       general_merge_flag[ x0 ][ y0 ] == 0 ) | |
|       cu_cbf | ae(v) |
|     if( cu_cbf ) { | |
|       ... | |
|       ~~numSigCoeff = 0~~ | |
|       ~~numZeroOutSigCoeff = 0~~ | |
|       transform_tree( x0, y0, cbWidth, cbHeight, treeType ) | |
|       ~~lfnstWidth = ( treeType == DUAL_TREE_CHROMA ) ? cbWidth / SubWidthC~~ <br>              ~~: cbWidth~~ | |
|       ~~lfnstHeight = ( treeType == DUAL_TREE_CHROMA ) ? cbHeight / SubHeightC~~ <br>              ~~: cbHeight~~ | |
|       ~~if( Min( lfnstWidth, lfnstHeight ) >= 4 && sps_lfnst_enabled_flag == 1 &&~~ <br>         ~~CuPredMode[ x0 ][ y0 ] == MODE_INTRA &&~~ <br>         ~~IntraSubPartitionsSplitType == ISP_NO_SPLIT &&~~ <br>         ~~!intra_mip_flag[ x0 ][ y0 ] ) {~~ | |
|         ~~if( ( numSigCoeff > ( ( treeType == SINGLE_TREE ) ? 2 : 1 ) ) &&~~ <br>           ~~numZeroOutSigCoeff == 0 )~~ | |
|           ~~lfnst_idx[ x0 ][ y0 ]~~ | ~~ae(v)~~ |
|       } | |
|     } | |
|   } | |
| } | |

*FIG. 25*

| transform_unit( x0, y0, tbWidth, tbHeight, treeType, subTuIndex ) { | Descriptor |
|---|---|
| ... | |
| lfnstLastScanPos = 1 | |
| numZeroOutSigCoeff = 0 | |
| if( tu_cbf_luma[ x0 ][ y0 ] && !transform_skip_flag[ x0 ][ y0 ] ) | |
|    last_significant_pos( x0, y0, Log2( tbWidth ), Log2( tbHeight ), 0 ) | |
| if( tu_cbf_cb[ x0 ][ y0 ] ) { | |
|    if( tu_cbf_cr[ x0 ][ y0 ] ) | |
|      tu_joint_cbcr_residual[ x0 ][ y0 ] | ae(v) |
|    last_significant_pos( xC, yC, Log2( wC ), Log2( hC ), 1 ) | |
| } | |
| if( tu_cbf_cr[ x0 ][ y0 ] ) | |
|    last_significant_pos( xC, yC, Log2( wC ), Log2( hC ), 2 ) | |
| lfnstWidth = ( treeType = = DUAL_TREE_CHROMA ) ? tbWidth / SubWidthC : tbWidth | |
| lfnstHeight = ( treeType = = DUAL_TREE_CHROMA ) ? tbHeight / SubHeightC : tbHeight | |
| if( Min( lfnstWidth, lfnstHeight ) >= 4 && sps_lfnst_enabled_flag = = 1 && <br> CuPredMode[ x0 ][ y0 ] = = MODE_INTRA && <br> IntraSubPartitionsSplitType = = ISP_NO_SPLIT && !intra_mip_flag[ x0 ][ y0 ] ) { | |
|    if( lfnstLastScanPos = = 0 && numZeroOutSigCoeff = = 0 ) | |
|      lfnst_idx[ x0 ][ y0 ] | ae(v) |
| } | |
| if( tu_cbf_luma[ x0 ][ y0 ] ) { | |
|    if( !transform_skip_flag[ x0 ][ y0 ] ) | |
|      residual_coding( x0, y0, Log2( tbWidth ), Log2( tbHeight ), 0 ) | |
|    else | |
|      residual_ts_coding( x0, y0, Log2( tbWidth ), Log2( tbHeight ), 0 ) | |
| } | |
| if( tu_cbf_cb[ x0 ][ y0 ] ) | |
|    residual_coding( xC, yC, Log2( wC ), Log2( hC ), 1 ) | |
| if( tu_cbf_cr[ x0 ][ y0 ] ) { | |
|    ~~if( tu_cbf_cb[ x0 ][ y0 ] )~~ | |
|      ~~tu_joint_cbcr_residual[ x0 ][ y0 ]~~ | ae(v) |
|    if( !tu_joint_cbcr_residual[ x0 ][ y0 ] ) | |
|      residual_coding( xC, yC, Log2( wC ), Log2( hC ), 2 ) | |
| } | |
| } | |

*FIG. 26*

| last_significant_pos( x0, y0, log2TbWidth, log2TbHeight, cIdx ) { | Descriptor |
|---|---|
| Parsing the last significant coefficient position | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
|   if( lastScanPos == 0 ) { | |
|     lastScanPos = numSbCoeff | |
|     lastSubBlock− − | |
|   } | |
|   lastScanPos− − | |
|   xS = DiagScanOrder[ log2TbWidth − log2SbW ][ log2TbHeight − log2SbH ][ lastSubBlock ][ 0 ] | |
|   yS = DiagScanOrder[ log2TbWidth − log2SbW ][ log2TbHeight − log2SbH ][ lastSubBlock ][ 1 ] | |
|   xC = ( xS << log2SbW ) + DiagScanOrder[ log2SbW ][ log2SbH ][ lastScanPos ][ 0 ] | |
|   yC = ( yS << log2SbH ) + DiagScanOrder[ log2SbW ][ log2SbH ][ lastScanPos ][ 1 ] | |
| } while( ( xC != LastSignificantCoeffX ) || ( yC != LastSignificantCoeffY ) ) | |
| if( log2TbWidth >= 2 && log2TbHeight >= 2 && !transform_skip_flag[ x0 ][ y0 ] ) { | |
|   if( lastScanPos > 15 || ( ( log2TbWidth = = 2 || log2TbWidth = = 3 ) && ( log2TbWidth = = log2TbHeight ) && lastScanPos > 7 ) ) | |
|     numZeroOutSigCoeff++ | |
|   lfnstLastScanPos = lfnstLastScanPos && (lastScanPos < 1 ) | |
|   } | |
| } | |

*FIG. 27*

| | Descriptor |
|---|---|
| residual_coding( x0, y0, log2TbWidth, log2TbHeight, cIdx ) { | |
| ... | |
|   lastScanPos = numSbCoeff | |
|   lastSubBlock = ( 1 << ( log2TbWidth + log2TbHeight − ( log2SbW + log2SbH ) ) ) − 1 | |
|   do { | |
|     if( lastScanPos == 0 ) { | |
|       lastScanPos = numSbCoeff | |
|       lastSubBlock− − | |
|     } | |
|     lastScanPos− − | |
|   ... | |
|   } while( ( xC != LastSignificantCoeffX ) \|\| ( yC != LastSignificantCoeffY ) ) | |
|   QState = 0 | |
|   for( i = lastSubBlock; i >= 0; i− − ) { | |
|     ... | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     ... | |
|     firstPosMode0 = ( i == lastSubBlock ? lastScanPos : numSbCoeff − 1 ) | |
|     firstPosMode1 = −1 | |
|     for( n = firstPosMode0; n >= 0 && remBinsPass1 >= 4; n− − ) { | |
|       ... | |
|       if( coded_sub_block_flag[ xS ][ yS ] && ( n > 0 \|\| !inferSbDcSigCoeffFlag ) && <br>         ( xC != LastSignificantCoeffX \|\| yC != Last SignificantCoeffY ) ) { | |
|         sig_coeff_flag[ xC ][ yC ] | ae(v) |
|         ... | |
|       } | |
|       if( sig_coeff_flag[ xC ][ yC ] ) { | |
|         if( !transform_skip_flag[ x0 ][ y0 ] ) { | |
|           ~~numSigCoeff++~~ | |
|           ~~if( ( n >= 8 && i == 0 && ( log2TbWidth == 2 \|\| log2TbWidth == 3 )~~ <br>             ~~&& ( log2TbWidth == log2TbHeight ) ) \|\| ( ( i == 1 \|\| i == 2 )~~ <br>             ~~&& log2TbWidth >= 3 && log2TbHeight >= 3 ) )~~ | |
|           ~~numZeroOutSigCoeff++~~ | |
|         } // if( transform_skip_flag[ x0 ][ y0 ] | |
|         ... | |
|       } // if( sig_coeff_flag[ x0 ][ y0 ] | |
|       ... | |
|     } // 1st pass | |
|     ... | |

*FIG. 28*

VIDEO SIGNAL PROCESSING METHOD AND APPARATUS USING SECONDARY TRANSFORM

CROSS-REFERENCE TO RELATED APPLICATIONS

This application is a continuation of pending U.S. application Ser. No. 17/088,110, which was filed on Nov. 3, 2020, and which is a continuation of pending PCT International Application No. PCT/KR2020/008301, which was filed on Jun. 25, 2020, and which claims priority to Korean Patent Application No. 10-2019-0075438 filed with the Korean Intellectual Property Office on Jun. 25, 2019, Korean Patent Application No. 10-2019-0080390 filed with the Korean Intellectual Property Office on Jul. 3, 2019, Korean Patent Application No. 10-2019-0081763 filed with the Korean Intellectual Property Office on Jul. 7, 2019. The disclosures of the above patent applications are incorporated herein by reference in their entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An object of the present invention is to improve coding efficiency of a video signal.

The present invention has an object to increase coding efficiency through a secondary transform.

Technical Solution

The present specification provides a video signal processing method using a secondary transform.

Specifically, a video signal decoding apparatus comprising a processor, wherein the processor is configured to: parse a syntax element related to a secondary transform of a coding unit from a bitstream of a video signal when one or more preset conditions are satisfied; check whether or not the secondary transform is applied to a transform block included in the coding unit based on the parsed syntax element; obtain one or more inverse transform coefficients for a first sub-block by performing an inverse secondary transform based on one or more coefficients of the first sub-block which is one of one or more sub-blocks constituting the transform block when the secondary transform is applied to the transform block; and obtain a residual sample for the transform block by performing an inverse primary transform based on the one or more inverse transform coefficients. The secondary transform is low frequency non-separable transform (LFNST), the transform block is a block to which a primary transform that is separable into a vertical transform and a horizontal transform is applied, and a first condition of the one or more preset conditions is that an index value indicating a position of a first coefficient among the one or more coefficients of the first sub-block is greater than a preset threshold value.

Furthermore, according to the present specification, the syntax element includes information indicating whether or not the secondary transform is applied to the coding unit and information indicating a transform kernel used for the secondary transform.

Furthermore, according to the present specification, the first coefficient is a last significant coefficient according to a preset scan order, and the significant coefficient is a non-zero coefficient.

Furthermore, according to the present specification, the first sub-block is a first sub-block according to a preset scan order.

Furthermore, according to the present specification, a second condition of the one or more preset conditions is that a width and height of the transform block are 4 pixels or more.

Furthermore, according to the present specification, the preset threshold value is 0.

Furthermore, according to the present specification, the preset scan order is an up-right diagonal scan order.

Furthermore, according to the present specification, a third condition of the one or more preset conditions is that a value of a transform skip flag included in the bitstream is not a specific value, and the transform skip flag indicates that the primary transform and the secondary transform are not applied to the transform block when the value of the transform skip flag has the specific value.

Furthermore, according to the present specification, a fourth condition of the one or more preset conditions is that at least one coefficient of the one or more coefficients of the first sub-block is not 0 and the at least one coefficient is present in a place other than a first position according to a preset scan order.

Furthermore, according to the present specification, the coding unit is composed of a plurality of coding blocks, and the syntax element related to the secondary transform is parsed when at least one of the transform blocks corresponding to each of the plurality of coding blocks satisfies the one or more preset conditions.

Furthermore, according to the present specification, a video signal encoding apparatus comprising a processor, wherein the processor is configured to: obtain a plurality of primary transform coefficients for a block by performing a primary transform on a residual sample of the block included in a coding unit; obtain one or more secondary transform coefficients for a first sub-block which is one of sub-blocks constituting the block by performing a secondary transform based on one or more of the plurality of primary transform coefficients; and obtain a bitstream by encoding information for the one or more secondary transform coefficients and a syntax element related to the secondary transform of the coding unit. The secondary transform is low frequency non-separable transform (LFNST), the primary transform is separable into a vertical transform and a horizontal transform, the syntax element related to the secondary transform of the coding unit is encoded when one or more preset conditions are satisfied, and a first condition of the one or more preset conditions is that an index value indicating a position of a first coefficient of the one or more secondary transform coefficients is greater than a preset threshold value.

Furthermore, according to the present specification, the syntax element includes information indicating whether or not the secondary transform is applied to the coding unit and information indicating a transform kernel used for the secondary transform.

Furthermore, according to the present specification, the first coefficient is a last significant coefficient according to a preset scan order, and the significant coefficient is a non-zero coefficient.

Furthermore, according to the present specification, the first sub-block is a first sub-block according to a preset scan order.

Furthermore, according to the present specification, a second condition of the one or more preset conditions is that a width and height of the primary transform block are 4 pixels or more.

Furthermore, according to the present specification, the preset threshold value is 0.

Furthermore, according to the present specification, the preset scan order is an up-right diagonal scan order.

Furthermore, according to the present specification, a third condition of the one or more preset conditions is that a value of a transform skip flag included in the bitstream is not a specific value, and the transform skip flag indicates that the primary transform and the secondary transform are not applied to the block when the transform skip flag value has the specific value.

Furthermore, according to the present specification, a fourth condition of the one or more preset conditions is that at least one coefficient of the one or more secondary transform coefficients is not 0 and the at least one coefficient is present in a place other than a first position according to a preset scan order.

Furthermore, according to the present specification, a non-transitory computer-readable medium stores a bitstream. The bitstream is encoded by an encoding method comprising: obtaining a plurality of primary transform coefficients for a block by performing a primary transform on a residual sample of the block included in a coding unit; obtaining one or more secondary transform coefficients for a first sub-block which is one of sub-blocks constituting the block by performing a secondary transform based on one or more of the plurality of the primary transform coefficients; and encoding information for the one or more secondary transform coefficients and a syntax element related to the secondary transform of the coding unit. The secondary transform is low frequency non-separable transform (LFNST), the primary transform is separable into a vertical transform and a horizontal transform, the syntax element related to the secondary transform is encoded when one or more preset conditions are satisfied, and a first condition of the one or more preset conditions is that an index value indicating a position of a first coefficient of the one or more secondary transform coefficients is greater than a preset threshold value.

Advantageous Effects

An embodiment of the present invention provides a video signal processing method using a secondary transform and an apparatus therefor.

BRIEF DESCRIPTION OF THE DRAWINGS

FIG. 8 is a diagram specifically illustrating a method for acquiring a residual signal by inverse transforming a transform coefficient by an encoder and a decoder.

FIG. 9 is a diagram illustrating a basis function for a plurality of transform kernels that may be used in a primary transform.

FIG. 13 is a diagram illustrating a method for determining an up-right diagonal scan order according to an embodiment of the present invention.

FIG. 14 is a diagram illustrating an up-right diagonal scan order according to an embodiment of the present invention according to a block size.

FIG. 15 is a diagram illustrating a method for indicating a secondary transform at a coding unit level.

FIG. 16 is a diagram illustrating a residual_coding syntax structure according to an embodiment of the present invention.

FIG. 17 is a diagram illustrating a method for indicating a secondary transform at a coding unit level according to an embodiment of the present invention.

FIG. 18 is a diagram illustrating a method for indicating a secondary transform at a coding unit level according to an embodiment of the present invention.

FIG. 19 is a diagram illustrating a residual_coding syntax structure according to an embodiment of the present invention.

FIG. 20 is a diagram illustrating a residual_coding syntax structure according to another embodiment of the present invention.

FIG. 21 is a diagram illustrating a method for indicating a secondary transform at a coding unit level according to another embodiment of the present invention.

FIG. 22 is a diagram illustrating a residual_coding syntax structure according to another embodiment of the present invention.

FIG. 23 is a diagram illustrating a method for indicating a secondary transform at a transform unit level according to an embodiment of the present invention.

FIG. 24 is a diagram illustrating a method for indicating a secondary transform at a transform unit level according to another embodiment of the present invention.

FIG. 25 is a diagram illustrating a coding unit syntax according to an embodiment of the present invention.

FIG. 26 is a diagram illustrating a method for indicating a secondary transform at a transform unit level according to another embodiment of the present invention.

FIG. 27 illustrates a syntax structure related to a position of a last significant coefficient in a scan order according to an embodiment of the present invention.

FIG. 28 is a diagram illustrating a residual_coding syntax structure according to another embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including at least one a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
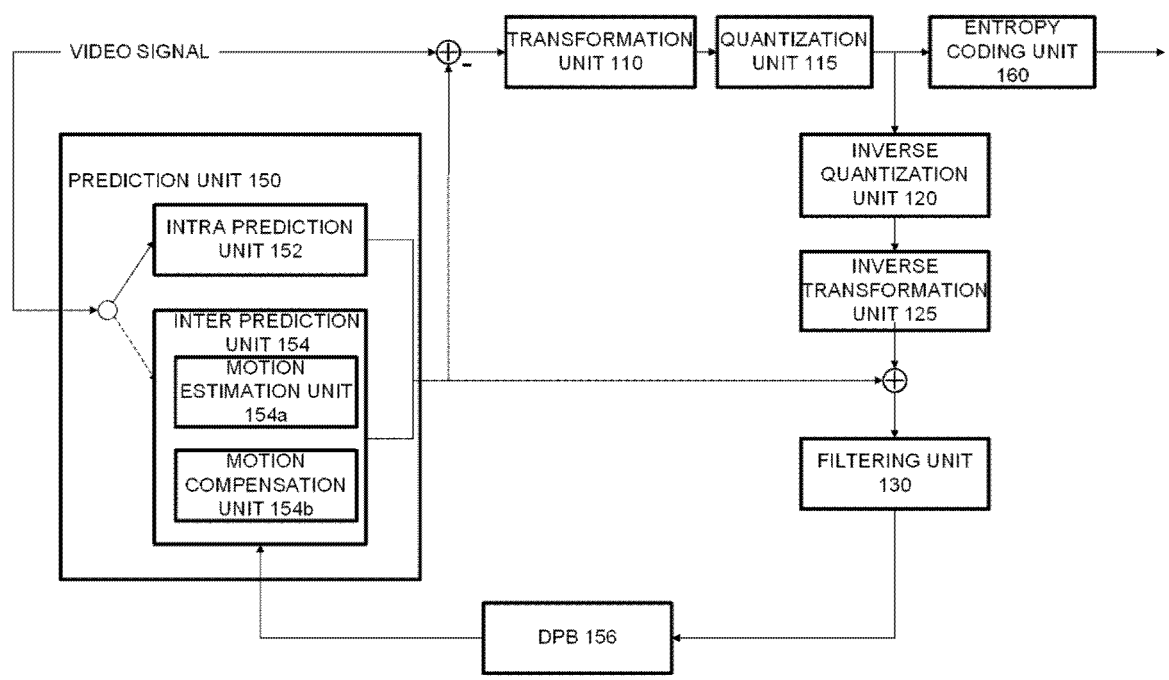
FIG. 1 is a schematic block diagram of a video signal encoding apparatus according to an embodiment of the present invention.

FIG. 1 is a schematic block diagram of a video signal encoding apparatus 100 according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to increase coding efficiency, instead of coding a picture signal as it is, a method for acquiring a reconstructed picture is used in which a picture is predicted using a region that has been already coded through the prediction unit 150, and a residual value between the original picture and the predicted picture is added to the predicted picture. An intra prediction unit 152 performs intra prediction within the current picture, and an inter prediction unit 154 predicts the current picture by using a reference picture stored in the decoded picture buffer 156. The intra prediction unit 152 performs intra prediction from reconstructed regions in the current picture, and transmits intra encoding information to an entropy coding unit 160. Again, the inter prediction unit 154 may include a motion estimation unit 154a and a motion compensation unit 154b. The motion estimation unit 154a obtains a motion vector value of the current region by referring to the reconstructed specific region. The motion estimation unit 154a may transmit position information (reference frame, motion vector, or the like) of the reference region to the entropy coding unit 160 to be included in the bitstream. The motion compensation unit 154b performs inter-motion compensation using the motion vector value transmitted from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The intra encoding information may include information on the reference sample. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information on a reference region to the entropy coding unit 160.

According to an additional embodiment, the prediction unit 150 may include an intra block copy (BC) prediction unit (not illustrated). The intra BC prediction unit performs intra BC prediction from reconstructed samples in the current picture, and transmits intra BC encoding information to an entropy coding unit 160. The intra BC prediction unit refers to a specific region in the current picture and obtains a block vector value indicating a reference region to be used for prediction of the current region. The intra BC prediction unit may perform intra BC prediction using the obtained block vector value. The intra BC prediction unit transmits the intra BC encoding information to the entropy coding unit 160. The intra BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients information, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used. For example, the entropy coding unit 160 may binarize information representing a quantized transform coefficient. In addition, the entropy coding unit 160 may generate a bitstream by arithmetic coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
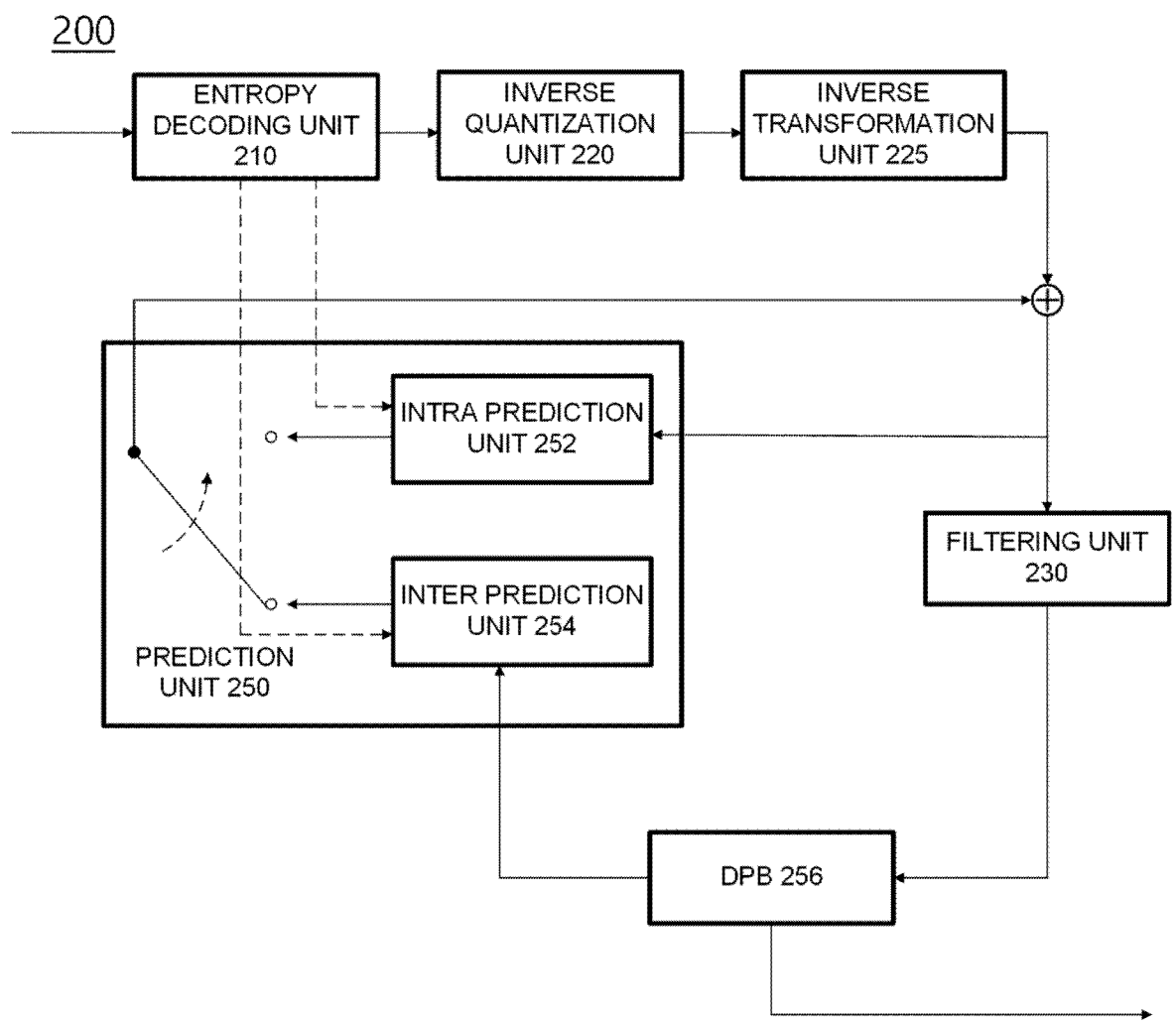
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients information, intra encoding information, and inter encoding information for each region. For example, the entropy decoding unit 210 may obtain a binary code for transform coefficient information of a specific region from a video signal bitstream. In addition, the entropy decoding unit 210 obtains a quantized transform coefficient by inverse binarizing the binarized code. A dequantization unit 220 inverse quantizes the quantized transform coefficient, and an inverse transform unit 225 reconstructs a residual value by using the inverse quantized transform coefficient. The video signal processing apparatus 200 reconstructs the original pixel value by adding the residual value obtained in the inverse transformation unit 225 and the prediction value obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. A picture (or tile/slice) using only the current picture for reconstruction, that is, performing intra prediction or intra BC prediction is referred to as an intra picture or I picture (or tile/slice), and a picture (or tile/slice) performing all of intra prediction, inter prediction, and intra BC prediction is referred to as an inter picture (or tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice)

uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and restored samples in the current picture. As described above, the intra encoding information may include at least one of an intra prediction mode, a Most Probable Mode (MPM) flag, and an MPM index. The intra prediction unit 252 predicts the sample values of the current block by using the restored samples located on the left and/or upper side of the current block as reference samples. In this disclosure, restored samples, reference samples, and samples of the current block may represent pixels. Also, sample values may represent pixel values.

According to an embodiment, the reference samples may be samples included in a neighboring block of the current block. For example, the reference samples may be samples adjacent to the left boundary of the current block and/or samples adjacent to the upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in a bi-prediction scheme may be regions selected from each of an L0 picture list and an L1 picture list.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not illustrated). The intra BC prediction unit may reconstruct the current region by referring to a specific region including reconstructed samples in the current picture. The intra BC prediction unit obtains intra BC encoding information on the current region from the entropy decoding unit 210. The intra BC prediction unit obtains a block vector value of the current region indicating a specific region in the current picture. The intra BC prediction unit may perform intra BC prediction using the obtained block vector value. The intra BC encoding information may include block vector information.

The reconstructed video picture is generated by adding the prediction value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
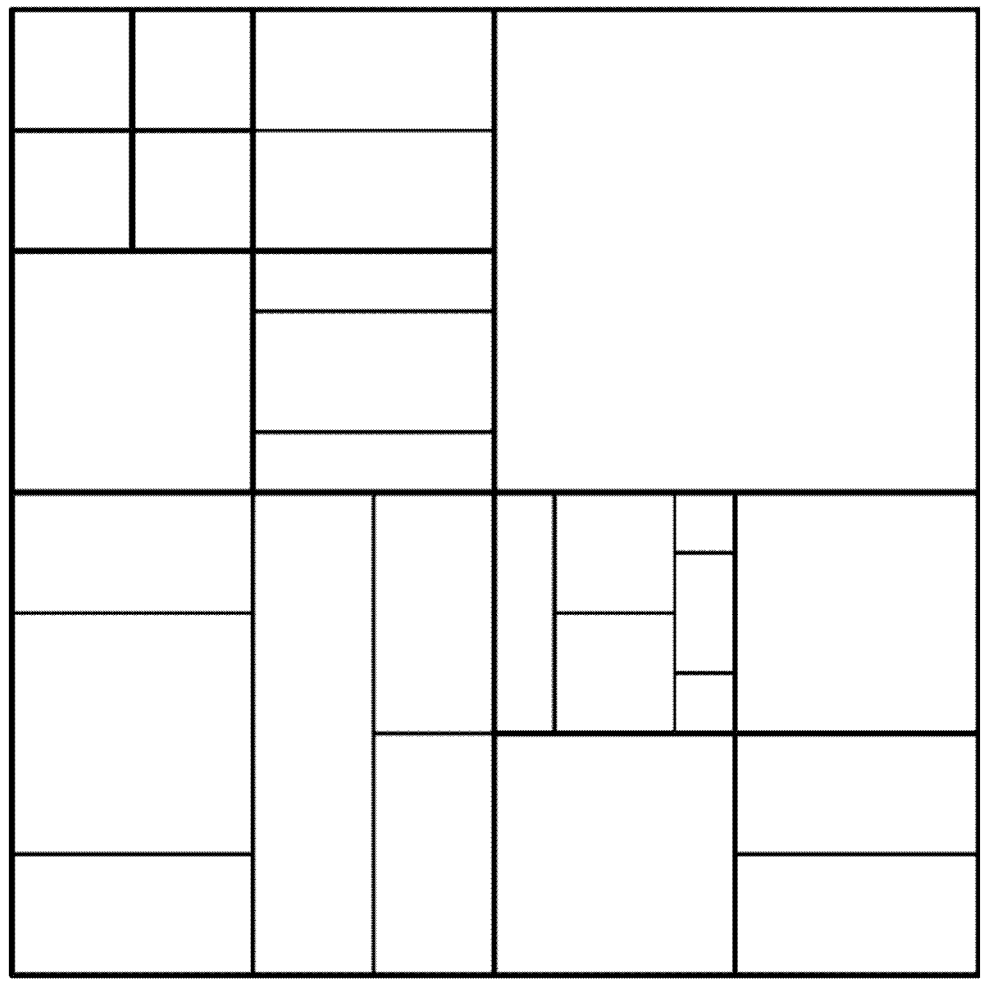
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

A leaf node of a multi-type tree may be a coding unit. When the coding unit is not greater than the maximum transform length, the coding unit may be used as a unit of prediction and/or transform without further separation. As an embodiment, if the width or height of the current coding unit is greater than the maximum transform length, the current coding unit may be partitioned into a plurality of transform units without explicit signaling regarding partitioning. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
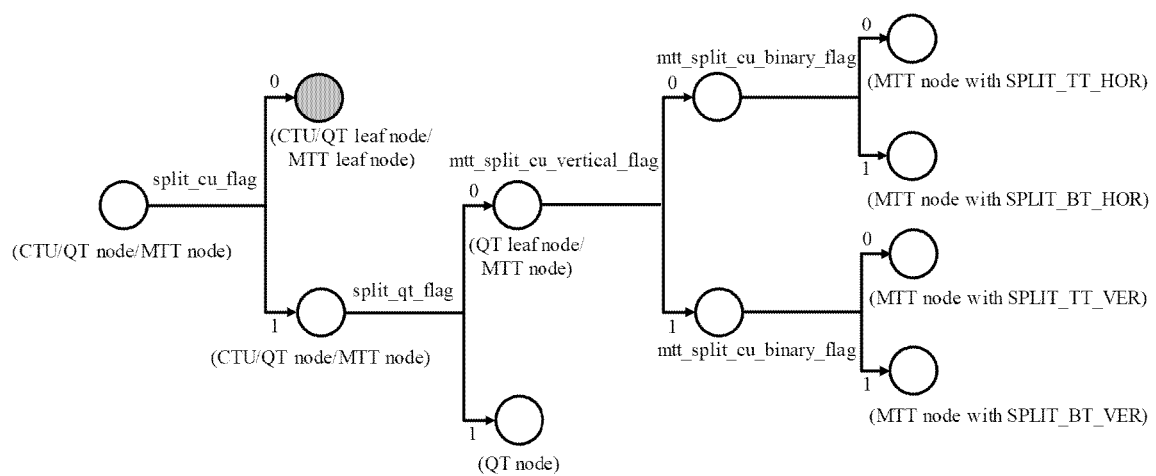
FIG. 4 shows an embodiment of a method for signaling a division of a quad tree and a multi-type tree.

FIG. 4 illustrates an embodiment of a method for signaling a quad tree and multi-type tree split. Preset flags may be used to signal the quad tree and multi-type tree split described above. With reference to FIG. 4, at least one of a flag 'split_cu_flag' indicating whether or not a node is split, a flag 'split_qt_flag' indicating whether or not a quad tree node is split, a flag 'mtt_split_cu_vertical_flag' indicating a split direction of the multi-type tree node, or a flag 'mtt_split_cu_binary_flag' indicating the split shape of the multi-type tree node may be used.

According to an embodiment of the present invention, 'split_cu_flag', which is a flag indicating whether or not the current node is split, may be signaled first. When the value of 'split_cu_flag' is 0, it indicates that the current node is not split, and the current node becomes a coding unit. When the current node is a coding tree unit, the coding tree unit includes one non-split coding unit. When the current node is a quad tree node 'QT node', the current node is a leaf node 'QT leaf node' of the quad tree and becomes the coding unit. When the current node is a multi-type tree node 'MTT node', the current node is a leaf node 'MTT leaf node' of the multi-type tree and becomes a coding unit.

When the value of 'split_cu_flag' is 1, the current node may be split into nodes of a quad tree or a multi-type tree according to the value of 'split_qt_flag'. The coding tree unit is a root node of a quad tree, and may be first split into a quad tree structure. In the quad-tree structure, 'split_qt_flag' is signaled for each node 'QT node'. When the value of 'split_qt_flag' is 1, the node is split into 4 square nodes, and when the value of 'split_qt_flag' is 0, the node becomes the leaf node of the quad tree 'QT leaf node', and the node is split into multi-type nodes. According to an embodiment of the present invention, the quad-tree split may be limited according to the type of the current node. When the current node is a coding tree unit (root node of the quad tree) or a quad tree node, quad-tree split may be allowed, and when the current node is a multi-type tree node, the quad tree split may not be allowed. Each quad tree leaf node 'QT leaf node' may be further split into multi-type tree structures. As described above, when 'split_qt_flag' is 0, the current node may be split into multi-type nodes. In order to indicate the split direction and split shape, 'mtt_split_cu_vertical_flag' and 'mtt_split_cu_binary_flag' may be signaled. When the value of 'mtt_split_cu_vertical_flag' is 1, the vertical split of the node 'MTT node' is indicated, and when the value of 'mtt_split_cu_vertical_flag' is 0, the horizontal split of the node 'MTT node' is indicated. In addition, when the value of 'mtt_split_cu_binary_flag' is 1, the node 'MTT node' is split into two rectangular nodes, and when the value of 'mtt_split_cu_binary_flag' is 0, the node 'MTT node' is split into three rectangular nodes.

Picture prediction (motion compensation) for coding is performed on coding units that are no longer split (that is, leaf nodes of the coding tree unit). The basic unit that performs such prediction is hereinafter referred to as a prediction unit or a prediction block.

Hereinafter, the term unit used in the present specification may be used as a term for replacing the prediction unit, which is a basic unit for performing prediction. However, the present invention is not limited thereto, and may be more broadly understood as a concept including the coding unit.

Figure 5:
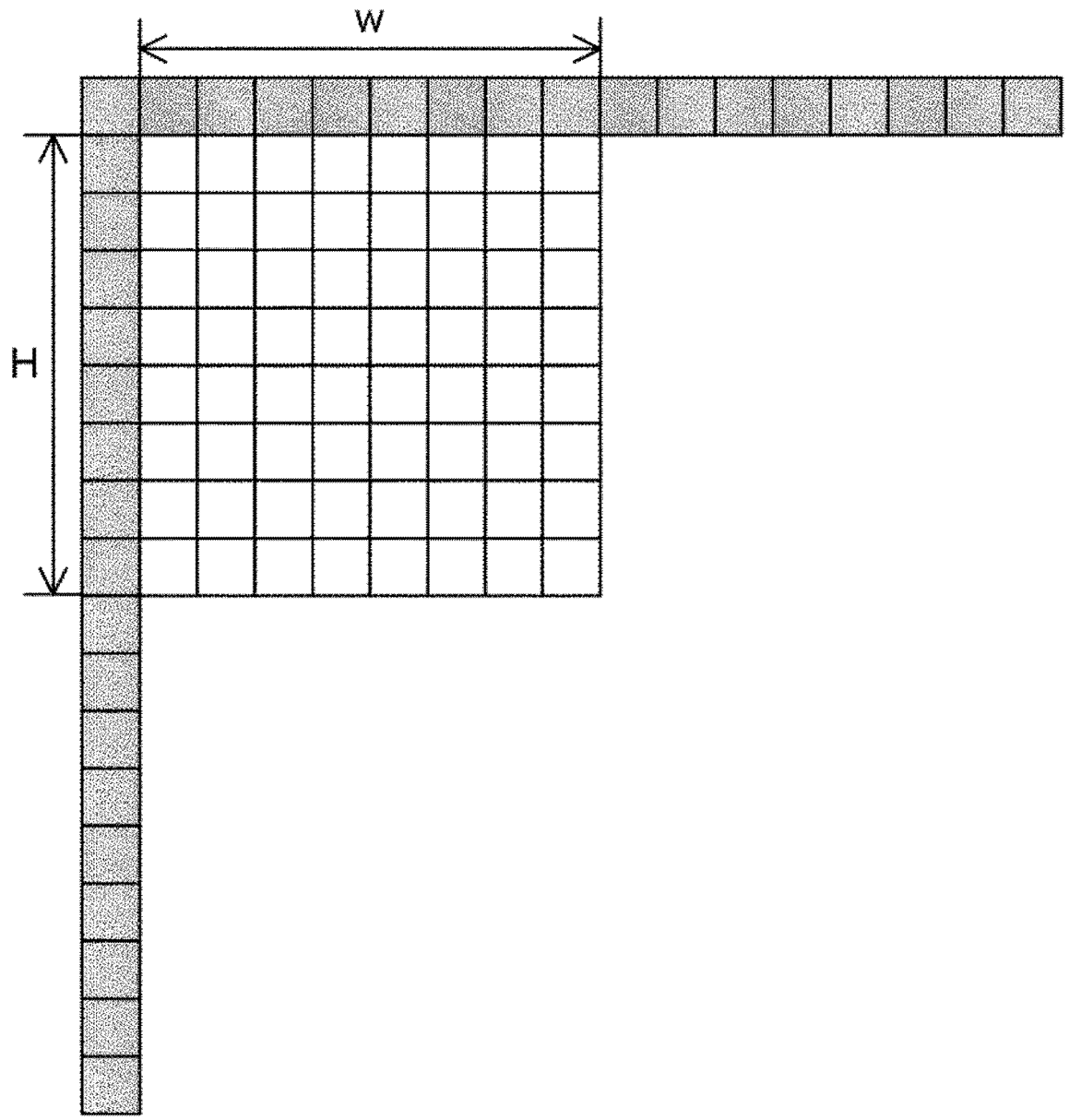
FIGS. 5 and 6 more specifically illustrate an intra prediction method according to an embodiment of the present invention.
Figure 6:
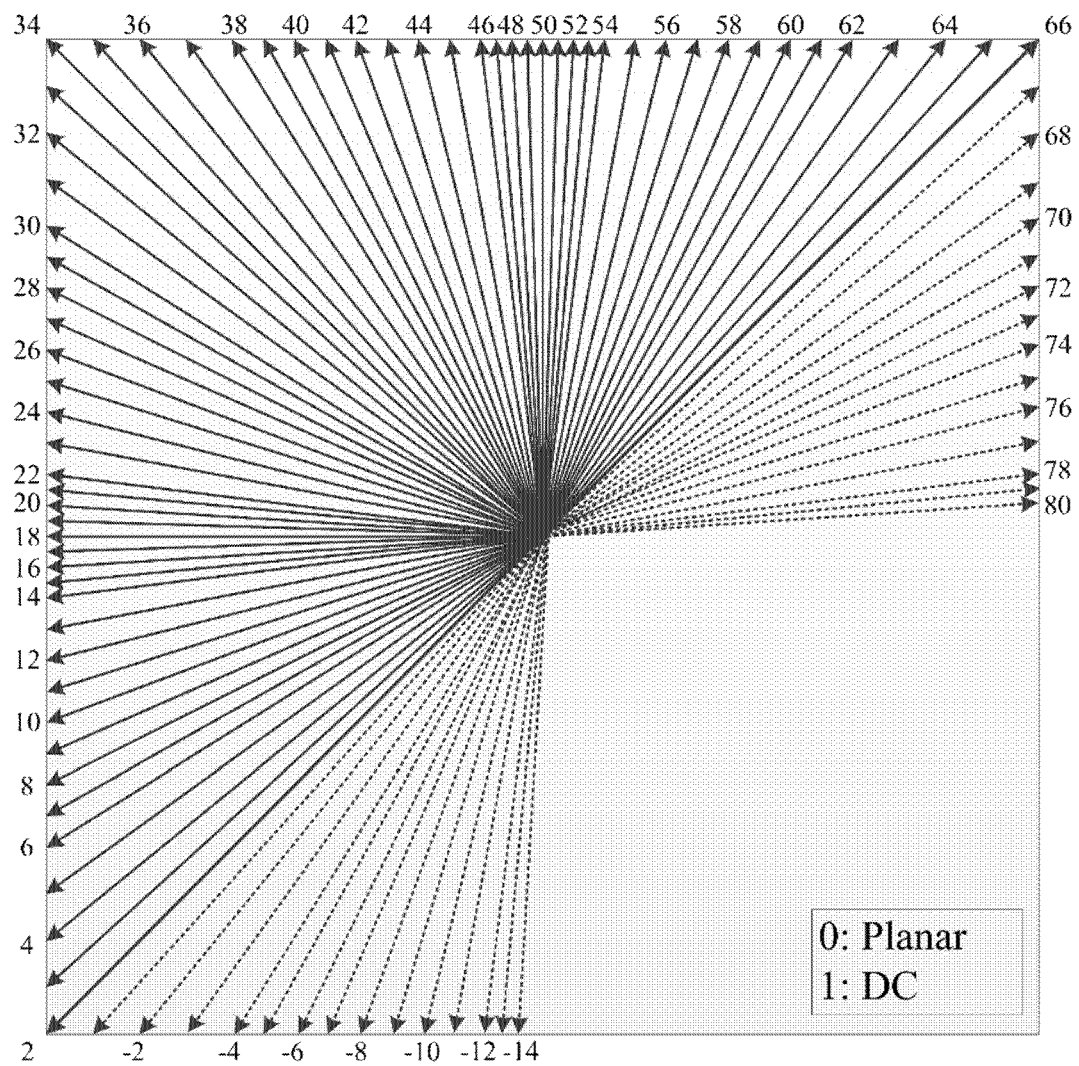

FIGS. 5 and 6 more specifically illustrate an intra prediction method according to an embodiment of the present invention. As described above, the intra prediction unit predicts the sample values of the current block by using the restored samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

In addition, if at least some of the samples to be used as reference samples have not been restored, the intra prediction unit may obtain a reference sample by performing a reference sample padding process. In addition, the intra prediction unit may perform a reference sample filtering process to reduce errors in intra prediction. That is, performing filtering on surrounding samples and/or reference samples obtained by a reference sample padding process may be performed to obtain filtered reference samples. The intra prediction unit predicts the samples of the current block using the reference samples thus obtained. The intra prediction unit predicts samples of the current block by using reference samples that have not been filtered or reference samples that have been filtered. In the present disclosure, surrounding samples may include samples on at least one reference line. For example, the surrounding samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45-offset2) degrees and (−135-offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes {2, 4, 6, . . . , 66} and the extended angle mode is an angle mode corresponding to any one of intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes {2, 3, 4, . . . , 66} and the extended angle mode is an angle mode corresponding to any one of intra prediction modes among {−10, −9, . . . , −1} and {67, 68, . . . , 76}. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes {2, 4, 6, . . . , 66}. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode may be used for intra prediction of the current block. According to another embodiment, when the current block is a block other than a square, the extended angle mode can be used for intra prediction of the current block, and when the current block is a square block, only the basic angle mode can be used for intra prediction of the current block.

On the other hand, in order to increase coding efficiency, instead of coding the residual signal described above as it is, a method in which a transform coefficient value obtained by transforming the residual signal is quantized and the quantized transform coefficient is coded may be used. As described above, the transform unit may obtain a transform coefficient value by transforming the residual signal. In this case, the residual signal of a specific block may be distributed over the entire region of the current block. Accordingly, it is possible to improve coding efficiency by concentrating energy in the low frequency domain through frequency domain transform on the residual signal. Hereinafter, a method for transforming or inversely transforming a residual signal will be described in detail.

Figure 7:
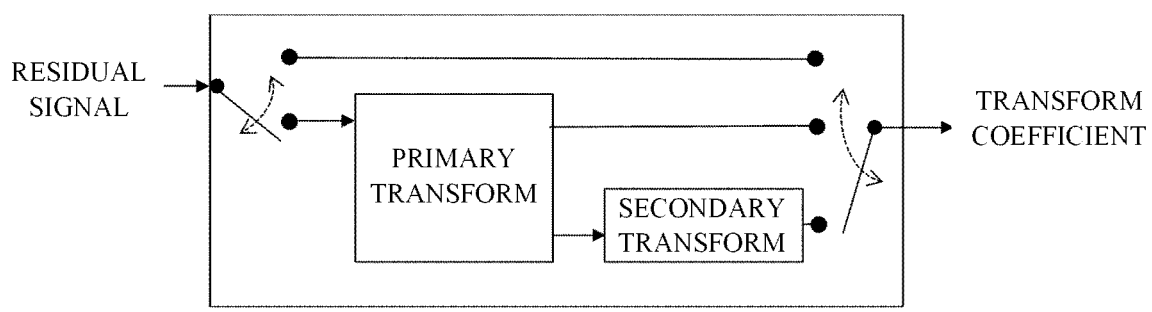
FIG. 7 is a diagram specifically illustrating a method for transforming a residual signal by an encoder.

FIG. 7 is a diagram specifically illustrating a method for transforming a residual signal by an encoder. As described above, the residual signal in a spatial domain may be transformed to a frequency domain. The encoder may obtain a transform coefficient by transforming the obtained residual signal. First, the encoder may acquire at least one residual block including a residual signal for the current block. The residual block may be any one of the current block or blocks into which the current block is divided. In the present disclosure, the residual block may be referred to as a residual array or a residual matrix including residual samples of the current block. In addition, in the present disclosure, the residual block may represent a transform unit or a block having the same size as the size of the transform block.

Next, the encoder may transform the residual block using a transform kernel. The transform kernel used for transforming the residual block may be a transform kernel having separable characteristics into a vertical transform and a horizontal transform. In this case, the transform on the residual block may be separable into the vertical transform and the horizontal transform. For example, the encoder may perform the vertical transform by applying a transform kernel in the vertical direction of the residual block. In addition, the encoder may perform the horizontal transform by applying a transform kernel in the horizontal direction of the residual block. In the present disclosure, the transform kernel may be used as a term to refer to a parameter set used for transforming the residual signal such as transform matrix, transform array, and transform function. According to an embodiment, the transform kernel may be any one of a plurality of available kernels. Further, a transform kernel based on different transform types may be used for each of the vertical transform and the horizontal transform.

The encoder may transmit a transform block transformed from the residual block to a quantization unit to quantize it. In this case, the transform block may include a plurality of transform coefficients. Specifically, the transform block may be composed of a plurality of transform coefficients arranged in two dimensions. Like the residual block, the size of the transform block may be the same as that of any one of the current block or the block into which the current block is divided. The transform coefficients transferred to the quantization unit may be expressed as quantized values.

In addition, the encoder may perform an additional transform before the transform coefficient is quantized. As illustrated in FIG. 7, the above-described transform method may be referred to as a primary transform, and an additional transform may be referred to as a secondary transform. The secondary transform may be selective for each residual block. According to an embodiment, the encoder may improve coding efficiency by performing the secondary transform on a region where it is difficult to concentrate energy in a low-frequency domain only by the primary transform. For example, the secondary transform may be added to a block in which residual values appear relatively large in a direction other than the horizontal or vertical direction of the residual block. The residual values of the intra-predicted block may have a relatively high probability of changing in a direction other than the horizontal or vertical direction compared to the residual values of the inter-predicted block. Accordingly, the encoder may additionally perform the secondary transform on the residual signal of the intra-predicted block. In addition, the encoder may omit the secondary transform on the residual signal of the inter-predicted block.

For another example, whether to perform the secondary transform may be determined according to the size of the current block or the residual block. In addition, transform kernels having different sizes may be used according to the size of the current block or the residual block. For example, a 8×8 secondary transform may be applied to a block in which the shorter side of the width or height is equal to or greater than a first preset length. In addition, a 4×4 secondary transform may be applied to a block in which the shorter side of the width or height is equal to or greater than a second preset length and smaller than the first preset length. In this case, the first preset length may be a value greater than the second preset length; however, the present disclosure is not limited thereto. Furthermore, unlike the primary transform, the secondary transform may not be separable into the vertical transform and the horizontal transform. This secondary transform may be referred to as a low frequency non-separable transform (LFNST).

In addition, in the case of a video signal in a specific region, energy in a high frequency band may not be reduced even when a frequency transform is performed due to a sudden change in brightness. Accordingly, the performance of compaction performance due to quantization may deteriorate. In addition, when a transform is performed on a region in which the residual value rarely exists, encoding time and decoding time may unnecessarily increase. Accordingly, the transform on the residual signal of the specific region may be omitted. Whether to perform the transform on the residual signal of the specific region may be determined by a syntax element related to the transform of the specific region. For example, the syntax element may include transform skip information. The transform skip information may be a transform skip flag. When the transform skip information on the residual block indicates transform skip, the transform on the residual block is not performed. In this case, the encoder may immediately quantize the residual signal on which the transform of the region has not been performed. The operations of the encoder described with reference to FIG. 7 may be performed through the transform unit of FIG. 1.

The above-described syntax elements related to the transform may be information parsed from a video signal bitstream. The decoder may entropy decode the video signal bitstream to obtain the syntax elements related to the transform. In addition, the encoder may generate a video signal bitstream by entropy coding the syntax elements related to the transform.

FIG. 8 is a diagram specifically illustrating a method for acquiring a residual signal by inverse transforming a transform coefficient by an encoder and a decoder. Hereinafter, for convenience of description, it will be described that an inverse transform operation is performed through the inverse transform unit of each of the encoder and the decoder. The inverse transform unit may obtain the residual signal by inverse transforming an inverse quantized transform coefficient. First, the inverse transform unit may detect whether or not an inverse transform of a specific region is performed from the transform-related syntax element of the specific region. According to an embodiment, when a transform-related syntax element on a specific transform block indicates a transform skip, the transform on the transform block may be omitted. In this case, both the inverse primary transform and the inverse secondary transform may be omitted for the transform block. In addition, the inverse quantized transform coefficient may be used as the residual signal. For example, the decoder may reconstruct the current block by using the inverse quantized transform coefficient as the residual signal. The above-described inverse primary transform represents an inverse transform for the primary transform, and may be referred to as a primary inverse transform. The inverse secondary transform represents an inverse transform for the secondary transform, and may be referred to as a secondary inverse transform or inverse LFNST. In the present invention, the (inverse) primary transform may be referred to as a first-order (inverse) transform, and the (inverse) secondary transform may be referred to as a second-order (inverse) transform.

According to another embodiment, the transform-related syntax element for a specific transform block may not indicate the transform skip. In this case, the inverse transform unit may determine whether to perform the inverse secondary transform for the secondary transform. For example, when the transform block is a transform block of an intra-predicted block, the inverse secondary transform may be performed on the transform block. In addition, the secondary transform kernel used for the transform block may be determined based on an intra prediction mode corresponding to the transform block. For another example, determination may be made as to whether to perform the inverse secondary transform, based on the size of the transform block. The inverse secondary transform may be performed after the inverse quantization process and before the inverse primary transform is performed.

The inverse transform unit may perform the inverse primary transform on an inverse quantized transform coefficient or an inverse secondary-transformed coefficient. Like the primary transform, the inverse primary transform may be separable into a vertical transform and a horizontal transform. For example, the inverse transform unit may perform a vertical inverse transform and a horizontal inverse transform on the transform block to obtain a residual block. The inverse transform unit may inverse transform the transform block based on the transform kernel used for transforming the transform block. For example, the encoder may explicitly or implicitly signal information indicating a transform kernel applied to the current transform block among a plurality of available transform kernels. The decoder may select a transform kernel to be used for an inverse transform of the transform block among a plurality of available transform kernels by using information indicating the signaled transform kernel. The inverse transform unit may reconstruct the current block by using the residual signal obtained through inverse transform on the transform coefficient.

On the other hand, the distribution of the residual signal of a picture may be different for each region. For example, a distribution of values for the residual signal in a specific region may vary according to the prediction method. When transforming a plurality of different transform regions using the same transform kernel, coding efficiency may vary for each transform region depending on distributions and characteristics of values in the transform region. Accordingly, when a transform kernel used for transforming a specific transform block is adaptively selected from among a plurality of available transform kernels, coding efficiency may be further improved. That is, the encoder and the decoder may be configured to additionally use a transform kernel other than the basic transform kernel in transforming a video signal. A method for adaptively selecting a transform kernel may be referred to as an adaptive multiple core transform (AMT) or multiple transform selection (MTS). In the present disclosure, for convenience of description, the transform and the inverse transform are collectively referred to as transform. In addition, the transform kernel and the inverse transform kernel are collectively referred to as a transform kernel.

The residual signal, which is a difference signal between the original signal and the prediction signal generated through inter prediction or intra prediction, has energy distributed over the entire pixel domain, and thus when the pixel value of the residual signal itself is encoded, it is likely that the compaction efficiency is poor. Therefore, a process is required for concentrating energy on the low frequency region of the frequency domain through transcoding of the residual signal in the pixel domain is required.

In the high efficiency video coding (HEVC) standard, the residual signal in the pixel domain is transformed into the frequency domain mainly by using an efficient discrete cosine transform type-II (DCT-II) when the signal is evenly distributed in the pixel domain (when neighboring pixel values are similar), and by liming a discrete sine transform type-VII (DST-VII) to be used only in the intra predicted 4×4 block. The DCT-II transform may be suitable for a residual signal generated through inter prediction (when energy is evenly distributed in the pixel domain). However, for the residual signal generated through intra prediction, the energy of the residual signal may tend to increase as the distance from the reference sample increases due to the characteristics of intra prediction that is predicted by using the reconstructed reference sample around the current coding unit. Therefore, when only DCT-II transform is used to transform the residual signal into the frequency domain, it is not possible to achieve high coding efficiency.

The AMT is a transform technique that adaptively selects a transform kernel from among several preset transform kernels according to a prediction method. Since a pattern in the pixel domain of the residual signal (signal characteristics in the horizontal direction, signal characteristics in the vertical direction) differs depending on which prediction method is used, higher coding efficiency may be expected than when only DCT-II is used for the transform of the residual signal. In the present invention, the name, AMT, is not limited as described herein, and may be referred to as multiple transform selection (MTS).

FIG. 9 is a diagram illustrating a basis function for a plurality of transform kernels that may be used in a primary transform.

Specifically, FIG. 9 is a diagram illustrating the basis function of a transform kernel used in AMT, and shows DCT-II (discrete cosine transform type-II), DCT-V (discrete cosine transform type-V), DCT-VIII (discrete cosine transform type-VIII), DST-I (discrete sine transform type-I), and DST-VII (discrete sine transform type-VII) kernel formulas applied to the AMT.

DCT and DST may be expressed as functions of cosine and sine, respectively, and when the basis function of the transform kernel for the number of samples N is expressed as Ti(j), index i represents the index in the frequency domain, and index j represents the index in the basis function. That is, the smaller i represents the low frequency basis function, and the larger i represents the high frequency basis function. When expressed as a two-dimensional matrix, the basis function Ti(j) may represent the j-th element of the i-th row, and since all of the transform kernels illustrated in FIG. 9 have separable characteristics, transform may be performed on the residual signal X in the horizontal direction and the vertical direction, respectively. That is, when the residual signal block is denoted by X and the transform kernel matrix is denoted by T, the transform on the residual signal X may be expressed by TXT'. In this case, T' denotes a transpose matrix of the transform kernel matrix T.

The values of the transform matrix defined by the basis function illustrated in FIG. 9 may be in a decimal form rather than an integer form. Values in the decimal form may be difficult to implement in hardware in a video encoding device and a decoding device. Accordingly, a transform kernel approximated to an integer from an original transform kernel including values in the decimal form may be used for encoding and decoding of a video signal. An approximated transform kernel including integer values may be generated through scaling and rounding of the original transform kernel. The integer value included in the approximated transform kernel may be a value within a range representable by a preset number of bits. The preset number of bits may be 8-bit or 10-bit. With the approximation, the orthonormal property of DCT and DST may not be maintained. However, since the resulting coding efficiency loss is not large, it may be advantageous in terms of hardware implementation to approximate the transform kernel in an integer form.

For the primary transform and the inverse primary transform described in FIGS. 7 and 8, since the separable transform kernel is expressed as the two dimensional matrix and transform is performed in the vertical direction and the horizontal direction, it may be seen that the two dimensional matrix multiplication operation is performed twice. Since this involves a large amount of operations, it may be a problem from an implementation point of view. Therefore, from the implementation point of view, it may be an important issue whether or not the amount of operations may be reduced by using a butterfly structure like DCT-II or a combination structure of a half butterfly structure and a half matrix multiplier, or whether or not it is possible to decompose the transform kernel into transform kernels with low implementation complexity (whether or not the kernel may be expressed by the product of matrices with low complexity). In addition, since the elements of the transform kernel (matrix elements of the transform kernel) have to be stored in a memory for operation, the memory capacity for storing the kernel matrix also has to be considered in implementation. From this point of view, since the implementation complexity of DST-VII and DCT-VIII is relatively high, transforms with similar characteristics to DST-VII and DCT-VIII and low implementation complexity may replace DST-VII and DCT-VIII.

DST-IV (discrete sine transform type-IV) and DCT-IV (discrete cosine transform type-IV) may be candidates that may replace DST-VII and DCT-VIII, respectively. The DCT-II kernel for the number of samples 2N may contain a DCT-IV kernel for the number of samples N, and the DST-IV kernel for the number of samples N may be achieved from the DCT-IV kernel for the number of samples N by performing sign conversion and sorting the basis function in reverse order, which are simple operations, and thus DST-IV and DCT-IV for the number of samples N may be simply derived from DCT-II for the number of samples 2N.

Since the residual signal, which is the difference between the original signal and the prediction signal, shows a characteristic that the energy distribution of the signal varies according to the prediction method, when the transform kernel is adaptively selected according to the prediction method such as AMT or MTS, it is possible to improve coding efficiency. In addition, as described in FIGS. 7 and 8, by performing the secondary transform and the inverse secondary transform (inverse transform corresponding to the secondary transform), which are additional transforms in addition to the primary transform and the inverse primary transform (inverse transform corresponding to the primary transform), it is possible to improve coding efficiency. In particular, the secondary transform may improve energy compaction for the intra predicted residual signal block where strong energy is highly likely to exist in a direction other than the horizontal or vertical direction of the residual signal block. As described above, the secondary transform may be referred to as a low frequency non-separable transform (LFNST). In addition, the primary transform may be referred to as a core transform.

Figure 10:
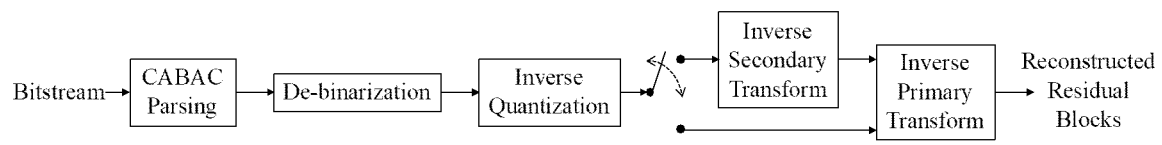
FIG. 10 is a block diagram illustrating a process of reconstructing a residual signal in a decoding unit performing a secondary transform according to an embodiment of the present invention.

FIG. 10 is a block diagram illustrating a process of reconstructing a residual signal in a decoding unit performing a secondary transform according to an embodiment of the present invention. First, an entropy coder may parse a syntax element related to a residual signal from a bitstream and a quantization coefficient may be obtained through de-binarization. The decoder may perform an inverse quantization on the reconstructed quantization coefficient to obtain a transform coefficient, and may perform the inverse transform on the transform coefficient to reconstruct the residual signal block. The inverse transform may be applied to a block to which a transform skip (TS) is not applied. The inverse transform may be performed in the order of the inverse secondary transform and the inverse primary transform in the decoding unit. In this case, the inverse secondary transform may be omitted. The inverse secondary transform may be performed on the inter predicted block and may be omitted. Alternatively, the inverse secondary transform may be omitted depending on the block size condition. The reconstructed residual signal includes a quantization error, and the secondary transform may reduce the quantization error by changing the energy distribution of the residual signal compared with when only the primary transform is performed.

Figure 11:
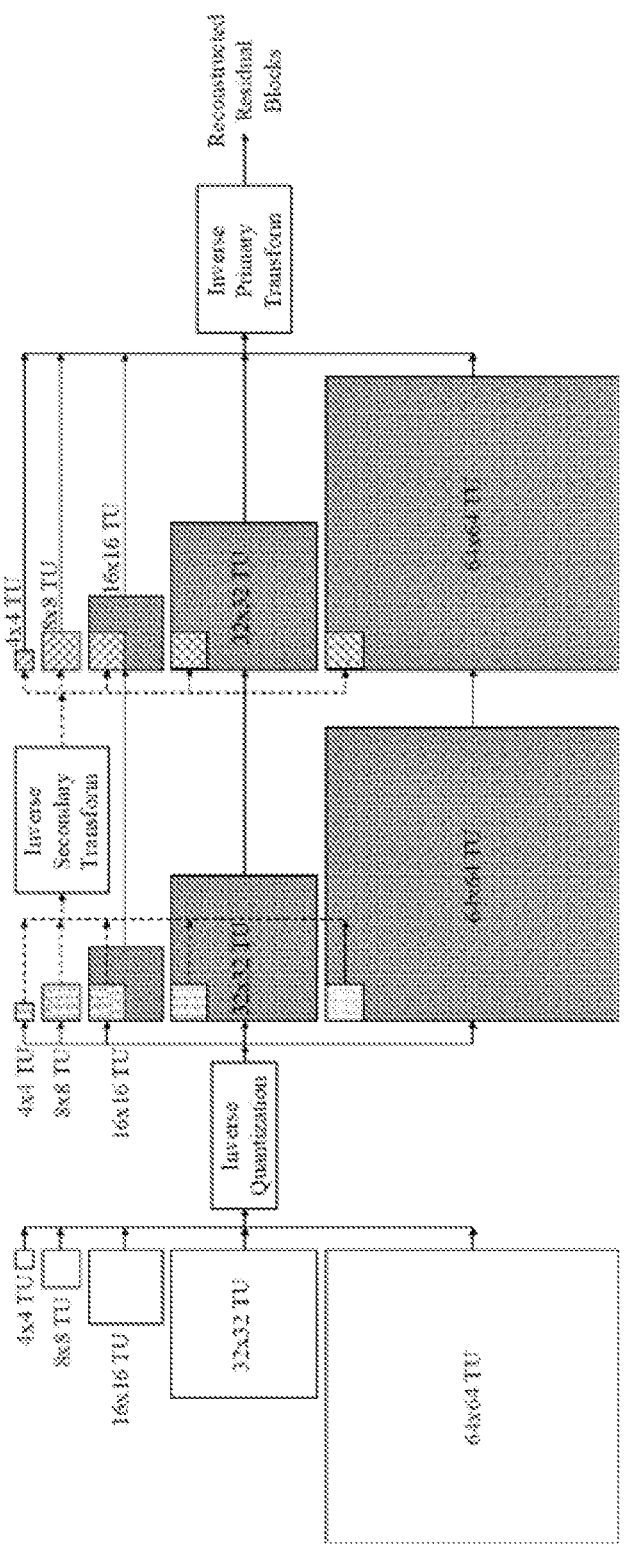
FIG. 11 is a diagram illustrating a process of reconstructing a residual signal in a decoding unit performing a secondary transform according to an embodiment of the present invention at a block level.

FIG. 11 is a diagram illustrating a process of reconstructing a residual signal in a decoding unit performing a secondary transform according to an embodiment of the present invention at a block level. Reconstruction of the residual signal may be performed in units of a transform unit (TU) or the sub-block within the TU. FIG. 11 illustrates a process of reconstructing a residual signal block to which the secondary transform is applied, and the inverse secondary transform may be first performed on an inverse quantized transform coefficient block. The decoder may perform the inverse secondary transform on all samples of W×H (W: width, number of horizontal samples, H: height, number of vertical samples) in the TU; however, taking into account the complexity, the inverse secondary transform may be performed only on a sub-block having a size of W'×H' on the upper left, which is the low frequency region with the highest influence. In this case, W' is less than or equal to W. H' is less than or equal to H. The size of the sub-block, W'×H', on the upper left may be set differently with the TU size. For example, when min(W, H)=4, both W' and H' may be set to 4. When min(W, H)>=8, both W' and H' may be set to 8. min(x, y) represents an operation that returns x when x is less than or equal to y, and returns y when x is greater than y. After performing the inverse secondary transform, the decoder may acquire a sub-block transform coefficient of the size, W'×H', on the upper left in the TU, and may perform the inverse primary transform on the transform coefficient block of the entire size of W×H to reconstruct the residual signal block.

Whether or not the secondary transform may be enabled or applied may be indicated with being included in at least one of High Level Syntax (HLS) RBSPs such as a sequence parameter set (SPS), a picture parameter set (PPS), picture header, slice header, or tile group header, in the form of a 1-bit flag. Additionally, when the secondary transform is applicable, the size of the sub-block on the upper left taken into account in the secondary transform may be indicated in the form of a 1-bit flag in at least one of the HLS RBSPs. For example, whether or not an 8×8-sized sub-block may be used for the secondary transform taking into account a 4×4 or 8×8-sized sub-block may be indicated by a 1-bit flag in at least one of the HLS RBSPs.

When enablement or applicability of the secondary transform is indicated at a higher level (e.g., HLS), whether or not the secondary transform is applied may be indicated by a 1-bit flag at the coding unit (CU) level. In addition, when the secondary transform is applied to the current block, an index indicating a transform kernel used for the secondary transform may be indicated at the coding unit level. The decoder may perform the inverse secondary transform on a block to which the secondary transform is applied by using the transform kernel indicated by the index within a preset transform kernel set, according to the prediction mode. The index representing the transform kernel may be binarized by using truncated unary or fixed length binarization methods. The 1-bit flag indicating whether or not the secondary transform is applied at the CU level and the index indicating the transform kernel used for the secondary transform may be indicated by using one syntax element, and in the present specification, it is referred to as lfnst_idx[x0][y0] or lfnst_idx, but the present invention is not limited to the name. As an embodiment, the first bit of lfnst_idx[x0][y0] may indicate whether or not secondary transform is applied at the CU level. In addition, the remaining bits may represent an index indicating the transform kernel used for the secondary transform. That is, lfnst_idx[x0][y0] may represent whether or not the secondary transform (LFNST) is applied, and an index indicating the transform kernel used when the secondary transform is applied. Such lfnst_idx[x0][y0] may be encoded through the entropy coder such as context-based adaptive binary arithmetic coding (CABAC) and context-based adaptive variable length coding (CAVLC) that perform adaptive encoding based on the context. When the current CU is partitioned into a plurality of TUs smaller than the CU size, the secondary transform may not be applied, and the syntax element, lfnst_idx[x0][y0], related to the secondary transform may be set to 0 without signaling. For example, when lfnst_idx[x0][y0] is 0, it may indicate that the secondary transform is not applied. On the other hand, when lfnst_idx[x0][y0] is greater than 0, it may indicate that the secondary transform is applied, and a transform kernel used for the secondary transform may be selected based on lfnst_idx[x0][y0].

As described above, a coding tree unit, a leaf node of a quad tree, and a leaf node of a multi-type tree may be the coding unit. When the coding unit is not greater than the maximum transform length, the coding unit may be used as a unit of prediction and/or transform without further segmentation. As an embodiment, when the width or height of the current coding unit is greater than the maximum transform length, the current coding unit may be partitioned into a plurality of transform units without explicit signaling regarding segmentation. When the size of the coding unit is greater than the maximum transform size, the coding unit may be partitioned into a plurality of transform blocks without signaling. In this case, when the secondary transform is applied, performance degradation and complexity may increase, and thus, the maximum coding block (or the maximum size of the coding block) to which the secondary transform is applied may be limited. The size of the maximum coding block may be the same as the maximum transform size. Alternatively, the size of the maximum coding block may be defined as the size of a preset coding block. As an embodiment, the preset value may be 64, 32, or 16; however, the present invention is not limited thereto. In this case, a value to be compared with the preset value (or maximum transform size) may be defined as the length of a long side or the total number of samples.

On the other hand, the transform kernels based on DCT-II, DST-VII, and DCT-VIII basis functions used in the primary transform have a separable characteristic. Therefore, two transforms in the vertical/horizontal direction may be performed on samples in the residual block of size N×N, and the size of the transform kernel may be N×N. On the other hand, for the secondary transform, the transform kernel has a non-separable characteristic. Therefore, when the number of samples to be taken into account in the secondary transform is n×n, one transform may be performed. In this case, the size of the transform kernel may be $(n^2) \times (n^2)$. For example, when performing the secondary transform on the 4×4 coefficient block on the upper left, a 16×16 sized transform kernel may be applied. In addition, when performing the secondary transform on the 8×8 coefficient block on the upper left, a 64×64 sized transform kernel may be applied. The transform kernel of the size of 64×64 involves a large amount of multiplication operations, which may be a heavy burden on the encoder and decoder. Therefore, when the number of samples to be taken into account in the secondary transform decreases, the amount of operations and the memory required for storing the transform kernel may be reduced.

Figure 12:
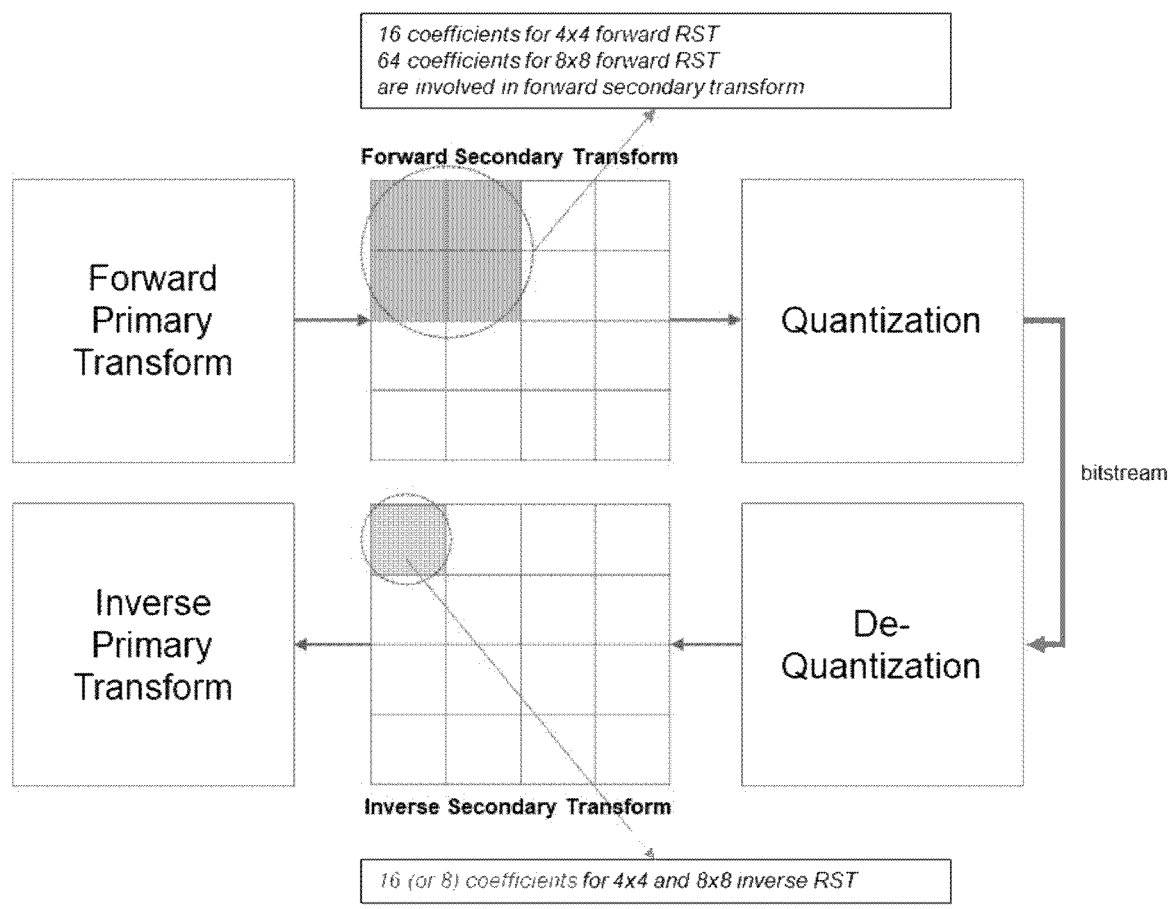
FIG. 12 is a diagram illustrating a method for applying a secondary transform using a reduced number of samples according to an embodiment of the present invention.

FIG. 12 is a diagram illustrating a method for applying a secondary transform using a reduced number of samples according to an embodiment of the present invention. According to an embodiment of the present invention, the secondary transform may be expressed by multiplying a secondary transform kernel matrix and a primary-transformed coefficient vector, and may be interpreted as mapping the primary-transformed coefficient to another space. In this case, when the number of coefficients to be secondary-transformed is reduced, that is, when the number of basis vectors constituting the secondary transform kernel is reduced, the amount of operations required for the secondary transform and a memory capacity required for storing the transform kernel may be reduced. For example, when performing the secondary transform on the 8×8 coefficient block on the upper left, the secondary transform kernel of the size of 16 (row)×64 (column) (or size of 16 (row)×48 (column)) may be applied when the number of coefficients to be secondary-transformed is reduced to 16. The transform unit of the encoder may obtain a secondary-transformed coefficient vector through an inner product of each of row vectors constituting the transform kernel matrix and a primary-transformed coefficient vector. The inverse transform unit of the encoder and the decoder may obtain a primary-transformed coefficient vector through an inner product of each of column vectors constituting the transform kernel matrix and a secondary-transformed coefficient vector.

Referring to FIG. 12, the encoder may first perform a primary transform (forward primary transform) on a residual signal block to obtain a primary-transformed coefficient block. When the size of the primary-transformed coefficient block is M×N, for an intra predicted block with a value of min(M, N) of 4, a 4×4 secondary transform (forward secondary transform) may be performed on the 4×4 samples on the upper left in the primary-transformed coefficient block. For an intra predicted block having a value of min(M, N) equal to or greater than 8, an 8×8 secondary transform may be performed on 8×8 samples of the primary-transformed coefficient block on the upper left. Since the 8×8 secondary transform involves a large amount of operations and memory, only some of the 8×8 samples may be utilized. In an embodiment, in order to improve coding efficiency, for a rectangular block in which a value of min(M, N) is 4 and M or N is greater than 8 (for example, a rectangular block having a size of 4×16 or 16×4), the 4×4 secondary transform may be performed on each of two 4×4 sub-blocks on the upper left in the primary-transformed coefficient block.

Since the secondary transform may be calculated by multiplying the secondary transform kernel matrix and the input vector, the encoder may first construct coefficients in the sub-block on the upper left in the primary-transformed coefficient block in a vector form. A method for constructing the coefficients in vectors may depend on the intra prediction mode. For example, when the intra prediction mode is less than or equal to the 34-th angular mode among the intra prediction modes illustrated in FIG. 6, the encoder may construct the coefficients in vectors by scanning the sub-block on the upper left in the primary-transformed coefficient block in the horizontal direction. When the element of the i-th row and j-th column of the n×n block on the upper left in the primary-transformed coefficient block is expressed as $x(I, j)$, the vectorized coefficients may be expressed as $[x(0, 0), x(0, 1), \ldots, x(0, n-1), x(1, 0), x(1, 1), \ldots, x(1, n-1), \ldots, x(n-1, 0), x(n-1, 1), \ldots, x(n-1, n-1)]$. On the other hand, if the intra prediction mode is greater than the 34-th angular mode, coefficients may be constructed in vectors by scanning the sub-block on the upper left in the primary-transformed coefficient block in the vertical direction. The vectorized coefficients may be expressed as $[x(0, 0), x(1, 0), \ldots, x(n-1, 0), x(0, 1), x(1, 1), \ldots, x(n-1, 1), \ldots, x(0, n-1), x(i, n-1), \ldots, x(n-1, n-1)]$. When only some of the 8×8 samples are utilized in the 8×8 secondary transform in order to reduce the amount of operations, the coefficient $x\_ij$ where i>3 and j>3 may not be included in the above-described method for constructing coefficients in vectors. In this case, in the 4×4 secondary transform, 16 primary-transformed coefficients may be inputs of the secondary transform. In the 8×8 secondary transform, 48 primary-transformed coefficients may be inputs of the secondary transform.

The encoder may acquire secondary-transformed coefficients by multiplying sub-block samples on the upper left in the vectorized primary transform coefficient block and the secondary transform kernel matrix. The secondary transform kernel applied to the secondary transform may be determined with the size of the transform unit or transform block, the intra mode, and the syntax element indicating the transform kernel. As described above, when the number of coefficients to be secondary-transformed is reduced, the amount of operations and memory required for storing the transform kernel may be reduced. Therefore, the number of coefficients to be secondary-transformed may be determined with the size of the current transform block. For example, for a 4×4 block, the encoder may acquire a coefficient vector having a length of 8 by multiplying a vector having a length of 16 and an 8 (row)×16 (column) transform kernel matrix. The 8 (row)×16 (column) transform kernel matrix may be obtained based on the first to eighth basis vectors constituting the 16 (row)×16 (column) transform kernel matrix. For a 4×N block or a M×4 (N and M are 8 or more), the encoder may obtain a coefficient vector having a length of 16 by multiplying a vector having a length of 16 and a 16 (row)×16 (column) transform kernel matrix. For an 8×8 block, the encoder may obtain a coefficient vector having a length of 8 by multiplying a vector having a length of 48 and an 8 (row)×48 (column) transform kernel matrix. The 8 (row)×48 (column) transform kernel matrix may be obtained based on the first to eighth basis vectors constituting the 16 (row)×48 (column) transform kernel matrix. For an M×N block excluding 8×8 (M and N are 8 or more), the encoder may obtain a coefficient vector having a length of 16 by multiplying a vector having a length of 48 and a 16 (row)×48 (column) transform kernel matrix.

According to an embodiment of the present invention, since the secondary-transformed coefficients are in the form of a vector, they may be expressed as data in a two-dimensional form. The coefficients that have been secondary-transformed according to a preset scan order may form a coefficient sub-block on the upper left. In an embodiment, the preset scan order may be an up-right diagonal scan order. The present invention is not limited thereto, and the up-right diagonal scan order may be determined based on a method described in FIGS. 13 and 14 to be described later.

In addition, according to an embodiment of the present invention, transform coefficients of a total transform unit size including secondary-transformed coefficients may be included in a bitstream and transmitted after quantization. The bitstream may include a syntax element related to the secondary transform. Specifically, the bitstream may include information on whether or not the secondary transform is applied to the current block and information indicating a transform kernel applied to the current block.

The decoder may first parse the quantized transform coefficients from the bitstream, and may obtain the transform coefficients through de-quantization. The de-quantization may be referred to as scaling. The decoder may determine whether or not the inverse secondary transform is performed on the current block based on the syntax element related to the secondary transform. When the inverse secondary transform is applied to the current transform unit or transform block, 8 or 16 transform coefficients may be inputs of the inverse secondary transform, depending on the size of the transform unit or transform block. The number of coefficients to be inputs of the inverse secondary transform may match the number of coefficients output from the secondary transform of the encoder. For example, when the size of the transform unit or transform block is 4×4 or 8×8, 8 transform coefficients may be inputs of the inverse secondary transform, and otherwise, 16 transform coefficients may be inputs of the inverse secondary transform. When the size of the transform unit is M×N, for the intra-predicted block with a value of min(M, N) of 4, the 4×4 inverse secondary transform may be performed on 16 or 8 coefficients of the 4×4 sub-block on the upper left in the transform coefficient block. For the intra predicted block with min(M, N) of 8 or more, the 8×8 inverse secondary transform may be performed on 16 or 8 coefficients of the 4×4 sub-block on the upper left in the transform coefficient block. In an embodiment, in order to improve coding efficiency, if min (M, N) is 4 and M or N is greater than 8 (for example, a rectangular block having a size of 4×16 or 16×4), the 4×4 inverse secondary transform may be performed on each of two 4×4 sub-blocks on the upper left in the transform coefficient block.

According to an embodiment of the present invention, since the inverse secondary transform may be calculated by product of the inverse secondary transform kernel matrix and the input vector, the decoder may construct, in a vector form, a de-quantized transform coefficient block that has been input first according to the preset scan order. In an embodiment, the preset scan order may be an up-right diagonal scan order, and the present invention is not limited thereto, and the upper-right diagonal scan order may be determined based on a method described in FIGS. 13 and 14 to be described later.

In addition, according to an embodiment of the present invention, the decoder may obtain a primary-transformed coefficient by multiplying a vectorized transform coefficient and the inverse secondary transform kernel matrix. In this case, the inverse secondary transform kernel may be determined with the size of the transform unit or transform block, the intra mode, and the syntax element indicating the transform kernel. The inverse secondary transform kernel matrix may be a transposed matrix of the secondary transform kernel matrix. Taking implementation complexity into account, elements of the kernel matrix may be integers expressed with 10-bit or 8-bit accuracy. A length of a vector, which is the output of the inverse secondary transform, may be determined based on the size of the current transform block. For example, for a 4×4 block, a coefficient vector may be obtained that has a length of 16 by multiplying a vector having a length of 8 and an 8 (row)×16 (column) transform kernel matrix. The 8 (row)×16 (column) transform kernel matrix may be obtained based on the first to eighth basis vectors constituting the 16 (row)×16 (column) transform kernel matrix. For a 4×N block or a M×N (N and M are 8 or more), a coefficient vector may be obtained that has a length of 16 by multiplying a vector having a length of 16 and a 16 (row)×16 (column) transform kernel matrix. For an 8×8 block, a coefficient vector may be obtained that has a length of 48 by multiplying a vector having a length of 8 and an 8 (row)×48 (column) transform kernel matrix. The 8 (row)×48 (column) transform kernel matrix may be obtained based on the first to eighth basis vectors constituting the 16 (row)×48 (column) transform kernel matrix. For an M×N block excluding 8×8 (M and N are 8 or more), a coefficient vector may be obtained that has a length of 48 by multiplying a vector having a length of 16 and a 16 (row)×48 (column) transform kernel matrix.

In an embodiment, since the primary transform coefficient obtained through the inverse secondary transform is in the vector form, the decoder may again express it as data in the two-dimensional form, which may depend on the intra mode. In this case, the mapping relationship based on the intra mode applied by the encoder may be equally applied. As described above, when the intra prediction mode is less than or equal to the 34-th angular mode, the decoder may obtain the two-dimensional transform coefficient array by scanning the inverse secondary-transformed coefficient vector in the horizontal direction. When the intra prediction mode is greater than the 34-th angular mode, the decoder may obtain the two-dimensional transform coefficient array by scanning the inverse secondary-transformed coefficient vector in the vertical direction. The decoder may obtain the residual signal by performing the inverse primary transform on the entire transform unit including transform coefficients obtained by performing the inverse secondary transform or a transform coefficient block of a transform block size.

Although not illustrated in FIG. 12, in order to correct a scale that increases due to the transform kernel after transform or inverse transform, a scaling process using a bit shift operation may be included in applying the transform or the inverse transform.

FIG. 13 is a diagram illustrating a method for determining an up-right diagonal scan order according to an embodiment of the present invention. According to an embodiment of the present invention, a process of initializing a scan order during encoding or decoding may be performed. An array including scan order information may be initialized according to the block size. Specifically, the initializing process of the up-right diagonal scan order arrangement illustrated in FIG. 13 in which 1<<log2BlockWidth and 1<<log2BlockHeight are inputted for the combination of log2BlockWidth and log2BlockHeight may be invoked (or performed). The output of the initializing process of the up-right diagonal scan order arrangement may be allocated to DiagScanOrder[log2BlockWidth][log2BlockHeight]. Here, log2BlockWidth and log2BlockHeight are variables representing values obtained by taking a logarithm of the base 2 to the width and height of the block, respectively, and may be values of the range [0, 4].

Through the initializing process of the up-right diagonal scan order arrangement illustrated in FIG. 13, the encoder/decoder may output the array diagScan[sPos][sComp] for blkWidth which is the width of the block, and blkHeight which is the height of the block, all of which are received. An array index sPos may represent a scan position (scan index), and may be a value in the range of [0, blkWidth*blkHeight−1]. When sComp, which is an array index, is 0, sPos may represent a horizontal component (x), and when sComp is 1, sPos may represent a vertical component (y). In the algorithm illustrated in FIG. 13, the x-coordinate and y-coordinate values on the two-dimensional coordinates at the scan position sPos may be interpreted as being allocated to diagScan[sPos][0] and diagScan [sPos][1], respectively, in the up-right diagonal scan order. That is, the value stored in the DiagScanOrder [log2BlockWidth][log2BlockHeight][sPos][sComp]

arrangement (array) may refer to a coordinate value corresponding to sComp at the sPos scan position (scan index) in the up-right diagonal scan order of the block, of which width and height are 1<<log2BlockWidth and 1<<log2BlockHeight, respectively.

FIG. 14 is a diagram illustrating an up-right diagonal scan order according to an embodiment of the present invention according to a block size. Referring to FIG. 14(*a*), when both log2BlockWidth and log2BlockHeight are 2, it may mean a 4×4 sized block. Referring to FIG. 14(*b*), when both log2BlockWidth and log2BlockHeight are 3, it may mean a 8×8 sized block. In FIG. 14, the numbers displayed in the gray shaded area indicate the scan position (scan index) sPos. The x and y coordinate values at the sPos position may be allocated to DiagScanOrder[log2BlockWidth][log2BlockHeight][sPos][0] and DiagScanOrder[log2BlockWidth][log2BlockHeight][sPos][1], respectively.

The encoder/decoder may code transform coefficient information based on the above-described scan order. In the present invention, an embodiment based on a case in which the up-right scanning method is used is mainly described; however, the present invention is not limited thereto, and other known scanning methods may also be applied.

Hereinafter, a decoding process related to the secondary transform will be described in detail. For convenience of description, the process related to the secondary transform is described mainly with a decoder, but embodiments to be described later may be applied to the encoder in substantially the same manner.

FIG. 15 is a diagram illustrating a method for indicating a secondary transform at a coding unit level. The secondary transform may be indicated at the coding unit level, and a syntax element related to the secondary transform may be included in a coding_unit syntax structure. The coding_unit syntax structure may include a syntax element related to a coding unit. In this case, based on the upper left luma sample of a picture, (x0, y0), which are the coordinates of the upper left luma sample of a current block, cbWidth, which is the width of the block, cbHeight, which is the height of the block, and treeType, which is a variable representing the type of a coding tree be an input of a coding_unit syntax structure. Since there is a correlation between luma and chroma, efficient image compression is possible if luma and chroma are encoded into the same coding structure. Alternatively, in order to improve coding efficiency, luma and chroma may be encoded in different coding structures. When the variable treeType is SINGLE_TREE, it may mean that luma and chroma are encoded in the same coding tree structure, and the coding unit may include a luma coding block and a chroma coding block according to a color format. When the treeType is DUAL_TREE_LUMA, it means that luma and chroma are encoded in different coding trees, and the currently processed tree may indicate a tree for luma. In this case, the coding unit may include only the luma coding block. When the treeType is DUAL_TREE_CHROMA, it means that luma and chroma are encoded in different coding trees, and the currently processed tree may indicate a tree for chroma. In this case, the coding unit may include the chroma coding block according to the color format.

In the coding_unit syntax structure, a prediction method for a current coding unit may be indicated, and a variable CuPredMode[x0][y0] may indicate a prediction method for a current block. When CuPredMode[x0][y0] is MODE_INTRA, it may indicate that the intra prediction method is applied to the current block, and when CuPredMode[x0][y0] is MODE_INTER, it may indicate that the inter prediction method is applied to the current block. In addition, when CuPredMode[x0][y0] is MODE_IBC, it may indicate that an intra block copy (IBC) prediction, which performs prediction by generating a reference block from a region in which reconstruction of the current picture is completed, is applied to the current block. Depending on the value of the variable CuPredMode[x0][y0], syntax elements related to the prediction method may be processed. For example, when the variable CuPredMode[x0][y0] indicates the intra prediction, the decoder may parse a syntax element including information related to intra prediction mode, reference line index, and intra sub-partitions (ISP) prediction, or may set a variable related to the intra prediction mode according to the preset method.

After processing the syntax element related to the prediction method, the syntax element related to the residual signal may be processed. A transform_tree( ) syntax structure is a syntax structure for a transform tree, and by setting a node of the same size of that of the coding unit as a root node, the transform tree may be split into nodes having a size smaller than that of the root node and a leaf node of a transform tree may be a transform unit. The transform tree syntax structure may include information related to the splitting of the transform tree.

One of the intra prediction methods may be pulse code modulation (PCM) prediction. When the PCM prediction is used for prediction of the current coding unit, since transform and quantization are not performed, the transform_tree syntax structure may not be present. That is, since the transform tree syntax structure does not present, the decoder may not perform an operation on the transform_tree syntax structure. The PCM prediction may be indicated by pcm_flag[x0][y0] when intra prediction is indicated in the current coding unit. That is, when pcm_flag[x0][y0] is 1, the operation of the decoder on the transform_tree syntax structure may not be performed. Meanwhile, whether or not a transform_tree syntax structure is present for the current coding unit may be indicated by a 1-bit flag, which is referred to as cu_cbf in the present specification, but is not limited thereto. When cu_cbf is parsed, or when cu_cbf is not parsed, the decoder may set cu_cbf according to a preset method. When cu_cbf is 1, the decoder may perform an operation on the transform_tree syntax structure. When inter prediction or IBC prediction is used for prediction of the current coding unit, merge prediction may also be used for prediction of the current coding unit. Whether or not the merge prediction is used may be indicated by merge_flag[x0][y0]. When it is indicated that merge prediction is used in the current block (merge_flag[x0][y0]==1), cu_cbf may not be parsed, and the value of cu_cbf may be determined according to a preset method. The preset method may be a method based on cu_skip_flag[x0][y0] indicating a skip mode. For example, when cu_skip_flag[x0][y0] is 1, cu_cbf is inferred as 0, otherwise, cu_cbf may be inferred as 1. When cu_cbf is 1, the transform_tree syntax structure may be processed, and a counter value for measuring the number of non-zero quantization coefficients (significant coefficients) may be initialized to 0.

The numSigCoeff variable may refer to a variable representing the number of non-zero quantization coefficients (significant coefficients) present in the transform unit of the current coding unit, and syntax elements related to the secondary transform may be processed differently depending on the value of numSigCoeff.

The numZeroOutSigCoeff variable may refer to a variable representing the number of non-zero quantization coefficients (significant coefficients) present at a specific position in the transform unit included in the current coding unit, and syntax elements related to the secondary transform may be processed differently depending on the value of numZeroOutSigCoeff.

In transform_tree, the transform tree may be split, and a leaf node of the transform tree may be a transform unit. transform_tree may include a transform_unit syntax structure that is a syntax structure related to a transform unit that is a leaf node. transform_unit may process syntax elements related to the transform unit, and may include a residual_coding syntax structure when the transform unit includes one or more non-zero transform coefficients. The residual_coding syntax structure may include a syntax structure related to quantized transform coefficients and processing related thereto. The transform blocks constituting the transform unit may vary depending on the type of the tree currently being processed. When treeType is SINGLE_TREE, the current transform unit may include a luma transform block and chroma transform blocks according to the color format. When treeType is DUAL_TREE_LUMA, the current transform unit may include a luma transform block. When treeType is DUAL_TREE_CHROMA, the current transform unit may include chroma transform blocks. The transform_unit syntax structure may include coded block flag (CBF) information, which, for transform blocks included in the current transform unit, indicates whether or not the transform blocks include one or more non-zero coefficients according to treeType. The CBF information may be information indicated for each color component. For example, if the value of the CBF for the luma transform block of the current transform unit indicates that the luma transform block does not include one or more non-zero coefficients, the coefficients of the luma transform block are all 0s, and thus the residual_coding syntax structure for the luma transform block may not be processed. For another example, if the value of the CBF for the chroma Cb transform block of the current transform unit indicates that the chroma Cb transform block includes one or more non-zero coefficients, a residual_coding syntax structure for the Cb transform block of the current transform unit may be present.

Whether or not the secondary transform is applied to the current block may be indicated at the CU level. When the secondary transform is applied, an index indicating the transform kernel used for the secondary transform may be additionally indicated. As described with reference to FIG. 11, whether or not the secondary transform is applied to the current block may be indicated by using the lfnst_idx[x0][y0] syntax element. The first bit of lfnst_idx[x0][y0] may indicate whether or not the secondary transform is applied to the current coding unit. When the first bit of lfnst_idx[x0][y0] is 0, that is, when lfnst_idx[x0][y0] is 0, it may indicate that the secondary transform is not applied to the current block. On the other hand, when the first bit of lfnst_idx[x0][y0] is 1, that is, when lfnst_idx[x0][y0] is greater than 0 (lfnst_idx[x0][y0]>0), it indicates that the secondary transform is applied to the current block. In this case, an additional bit may be used to indicate the transform kernel used for the secondary transform, and an index indicating the secondary transform kernel may be signaled through the additional bit.

The lfnst_idx[x0][y0] syntax element may be parsed when conditions to be described later are satisfied. On the other hand, if conditions to be described later are not satisfied, lfnst_idx[x0][y0] does not present in the current coding unit, and lfnst_idx[x0][y0] may be set to 0.

In other words, if the conditions described in the first to fourth embodiments including a lfnst_idx[x0][y0] syntax element parsing condition to be described later are satisfied, the encoder may generate a bitstream including a lfnst_idx[x0][y0] syntax element for the current coding unit. On the other hand, if the conditions to be described later are not satisfied, the lfnst_idx[x0][y0] syntax element for the current coding unit is not included in the bitstream generated by the encoder, and lfnst_idx[x0][y0] may be set to 0. The decoder receiving such a bitstream may parse the lfnst_idx[x0][y0] syntax element based on conditions to be described later.

lfnst_idx[x0][y0] Syntax Element Parsing Condition i) Min(lfnstWidth, lfnstHeight)>=4

First, a first condition is related to a block size. When the width and height of the block are 4 pixels or more, the decoder may parse the lfnst_idx[x0][y0] syntax element.

Specifically, the decoder may check a block size condition to which the secondary transform may be applied. The variables SubWidthC and SubHeightC are set according to the color format, and may represent the ratio of the width of the chroma component to the width of the luma component, and the ratio of the height of the chroma component to the height of the luma component, in a picture, respectively. For example, since a 4:2:0 color format image has a structure including one chroma sample per four luma samples, SubWidthC and SubHeightC may be both set to 2. For another example, since a 4:4:4 color format image has a structure including one chroma sample per one luma sample, SubWidthC and SubHeightC may be both set to 1. lfnstWidth, which is the number of samples in the horizontal direction of the current block, and lfnstHeight, which is the number of samples in the vertical direction, may be set based on SubWidthC and SubHeightC. When treeType is DUAL_TREE_CHROMA, since the coding unit includes only the chroma component, the number of samples in the horizontal direction of the chroma coding block is equal to the value obtained by dividing cbWidth, which is the width of the luma coding block, by SubWidthC. Similarly, the number of samples in the vertical direction of the chroma coding block is equal to the value obtained by dividing cbHeight, which is the height of the luma coding block, by SubHeightC. When treeType is SINGLE_TREE or DUAL_TREE_LUMA, since the coding unit includes a luma component, lnfstWidth and lfnstHeight may be set to cbWidth and cbHeight, respectively. Since the minimum condition of the block to which the secondary transform may be applied is 4×4, if Min(lfnstWidth, lfnstHeight)>=4 is satisfied, lfnst_idx[x0][y0] may be parsed.

ii) sps_lfnst_enabled_flag==1

A second condition relates to a flag value indicating whether or not the secondary transform may be enabled or applied, and when the value of the flag (sps_lfnst_enabled_flag) indicating whether or not the secondary transform may be enabled or applied is set to 1, the decoder may parse the lfnst_idx [x0][y0] syntax element.

Specifically, the secondary transform may be indicated at a high-level syntax RBSP. A flag having a 1-bit size indicating whether or not the secondary transform may be enabled or applied may be included in at least one of SPS, PPS, VPS, tile group header, and slice header. When sps_lfnst_enabled_flag is 1, it indicates that the lfnst_idx[x0][y0] syntax element is present in the coding_unit syntax. When sps_lfnst_enabled_flag is 0, it indicates that the lfnst_idx[x0][y0] syntax element does not present in the coding_unit syntax.

iii) CuPredMode[x0][y0]==MODE_INTRA

A third condition relates to a prediction mode, and the secondary transform may be applied only to the intra-predicted block. Therefore, when the current block is an intra-predicted block, the decoder may parse the lfnst_idx [x0][y0] syntax element.

iv) IntraSubPartitionsSplitType==ISP_NO_SPLIT

A fourth condition relates to whether or not the ISP prediction method is applied. When the ISP is not applied to the current block, the decoder may parse the lfnst_idx[x0][y0] syntax element.

Specifically, as described with reference to FIG. 11, when the current CU is partitioned into a plurality of transform units smaller than the size of the CU, the secondary transform may not be applied to the partitioned transform units. In this case, lfnst_idx[x0][y0], which is a syntax element related to the secondary transform, may be set to 0 without being parsed. When the transform tree for the current CU is split into a plurality of transform units smaller than the size of the CU, a case in which ISP prediction is applied to the current coding unit may be included. When intra prediction is applied to the current coding unit, the ISP prediction method may be a prediction method for splitting a transform tree into a plurality of transform units smaller than the size of a CU according to a preset splitting method. The ISP prediction mode may be indicated at the coding unit level, and a variable IntraSubPartitionsSplitType may be set based on it. In this case, when IntraSubPartitionsSplitType is ISP_NO_SPLIT, it indicates that ISP is not applied to the current block. The secondary transform is indicated at the coding unit level, but the actual secondary transform may be applied at the transform unit level. Therefore, when the transform tree is split into a plurality of transform units, it may be inefficient to apply the same secondary transform kernel to all split transform units. In addition, due to the characteristics of intra prediction in which prediction samples are generated at the transform unit level, the accuracy of prediction may be higher when the transform tree is split into a plurality of transform units than when the transform tree is not split. Therefore, if the transform tree is split into a plurality of transform units, it is highly likely that the energy of the residual signal is efficiently compacted even if the secondary transform is not applied to the split plurality of transform units. In addition, when the size of the current CU is greater than the luma maximum transform block size (MaxTbSizeY) (i.e., cbWidth>MaxTbSizeY||cbHeight>MaxTbSizeY), the transform tree may be split into a plurality of transform units smaller than the size of the CU. Although not illustrated in FIG. 15, even if the size of the current CU is greater than the luma maximum transform block size (MaxTbSizeY), the secondary transform may not be applied. Therefore, the fourth condition may be expressed as IntraSubPartitionsSplitType==ISP_NO_SPLIT&&cbWidth<=MaxTbSizeY&&cbHeight<=M axTbSizeY In this case, MaxTbSizeY may be a natural number expressed in the form of an exponent of 2. MaxTbSizeY may be indicated by being included in a high-level syntax RBSP such as SPS, PPS, slice header, and tile group header, or the encoder and decoder may use the same preset value. For example, the preset value may be 64(2^6).

v) !intra_mip_flag[x0][y0]

A fifth condition relates to an intra prediction method. When matrix based intra prediction (MIP) is not applied to the current coding unit prediction, the decoder may parse the lfnst_idx[x0][y0] syntax element.

Specifically, the MIP may be used as a method for intra prediction, and whether or not the MIP is applied may be indicated by intra_mip_flag[x0][y0] at the coding unit level. When Intra_mip_flag[x0][y0] is 1, it may indicate that the MIP is applied to prediction of the current coding unit, and prediction may be performed by multiplying reconstructed samples around the current block and a preset matrix. Since a residual signal property different from general intra prediction that performs directional or non-directional prediction is appeared when the MIP is applied, the secondary transform may not be applied to the transform block when the MIP is applied.

vi) numSigCoeff>((treeType==SINGLE_TREE)?2:1)

A sixth condition relates to treeType and coefficients.

Specifically, when treeType is SINGLE_TREE, the secondary transform may be applied to the current block when the value of the variable numSigCoeff is greater than 2, and the decoder may parse the lfnst_idx[x0][y0] syntax element.

When treeType is DUAL_TREE_LUMA or DUAL_TREE_CHROMA, the secondary transform may be applied to the current block when the value of the variable numSigCoeff is greater than 1, and lfnst_idx[x0][y0] may be parsed. In this case, numSigCoeff refer to a variable representing the number of significant coefficients present in the current coding unit. When numSigCoeff is less than a threshold value, efficient encoding may not be performed even if the secondary transform is applied to the current block. When the number of significant coefficients is small, it may be that the overhead of signaling lfnst_idx[x0][y0] is relatively large compared to the bits required for coefficient coding. In this case, the significant coefficient may refer to a non-zero coefficient. Hereinafter, the significant coefficient described in the present specification may mean a non-zero coefficient as described above.

vii) numZeroOutSigCoeff==0

A seventh condition relates to the significant coefficient present at a specific position.

Specifically, when the secondary transform is applied to the current block, the transform coefficient quantized in the decoder may always be 0 at a specific position. Therefore, since the secondary transform is not applied to the current block when a non-zero (quantization) coefficient is present at a specific position, determination may be made as to whether or not lfnst_idx[x0][y0] is to be parsed, depending on the number of significant coefficients at the specific position. For example, when numZeroOutSigCoeff is not 0 means that a significant coefficient is present at a specific position, and thus lfnst_idx[x0][y0] may be set to 0 without being parsed. On the other hand, when numZeroOutSigCoeff is 0, it means that no significant coefficient is present at a specific location, and thus lfnst_idx[x0][y0] may be parsed.

FIG. 16 is a diagram illustrating a residual_coding syntax structure according to an embodiment of the present invention.

The residual_coding syntax structure may be a syntax structure related to the quantization coefficient, and may receive x0, y0, log2TbWidth, and log2TbHeight as inputs. In this case, x0 and y0 may refer to (x0, y0), which is the upper left coordinate of the transform block, log2TbWidth may be a value obtained by taking the logarithm of the base 2 to the width of the transform block, and log2TbHeight may be a value obtained by taking the logarithm of the base 2 to the height of the transform block. The coefficients in the transform block may be coded in units of sub-blocks, and the coefficient values in each sub-block may be determined based on several syntax elements including sig_coeff_flag.

In this case, the coefficients of units of sub-blocks may be expressed as a coefficient group (CG). sig_coeff_flag[xC][yC] may indicate whether or not a coefficient value of a position (xC, yC) in the current transform block is 0. If sig_coeff_flag[xC][yC] is 1, it may indicate that the coefficient value of the position is not 0, and if sig_coeff_flag[xC][yC] is 0, it may indicate that the coefficient value of the position is 0. In residual_coding, an x-coordinate value and a y-coordinate value of a last significant coefficient in the scan order may be indicated. An index lastSubBlock of a sub-block including the last significant coefficient in the scan order may be determined based on the x coordinate value and the y coordinate value of the last significant coefficient in the scan order. The index of the sub-block may also be indexed based on the scan order. The scan order may be the up-right diagonal scan order described with reference to FIG. 13. In sub-block unit coefficient coding, indexes xC, yC representing the position (coordinate value) of the coefficient may be determined based on the upper left coordinate of the sub-block (xS<<log2SbW, yS<<log2SbH), and the up-right diagonal scan order (DiagScanOrder). In this case, xS and yS denote an index in the horizontal direction and an index in the vertical direction, respectively. log2SbW and log2SbH may be values obtained by taking the logarithm of the base 2 to the width and height of the sub-block, respectively.

When the value of sig_coeff_flag[xC][yC] is 1 (that is, the coefficient of the position (xC, yC) is not 0) and the transform skip is not applied to the current block (that is, !transform_skip_flag[x0][y0]), numSigCoeff may be counted. When the transform skip is applied, since the secondary transform may not be applied, numSigCoeff used for parsing lfnst_idx[x0][y0] may count the number of significant coefficients of the block to which the transform skip is not applied.

In addition, as described with reference to FIG. 15, when the secondary transform is applied to the transform block, a significant coefficient may not be present in a specific region within the transform block. Therefore, a numZeroOutSigCoeff counter counts the number of significant coefficients (numZeroOutSigCoeff) present in a specific region, and when numZeroOutSigCoeff is not 0, lfnst_idx[x0][y0] may not be parsed. Specifically, when the secondary transform is applied to the transform block, the region in which a significant coefficient is not possible to be present may be determined according to the size of the transform block.

For example, in order to apply the secondary transform, the index [0, 7] region and index [8, 15] region may be divided in the scan order within the transform block when the size of the transform block is 4×4 (i.e., log2TbWidth==2&&log2TbHeight==2), such that the significant coefficient may be present in the [0, 7] region and may not be present in the [8, 15] region. The 4×4 transform block may include one sub-block. Therefore, when the size of the transform block is 4×4, the number of significant coefficients may be counted when the scan position is 8 or more and the index of the sub-block is 0 (i.e., n>=8&&i==0). In this case, the scan order may be an up-right diagonal scan order.

For another example, in order to apply the secondary transform, the significant coefficient may be present only in the first sub-block in the transform block and may not be present in the remaining sub-blocks (e.g., the second and third sub-blocks) when the size of the transform block is 8×8 (i.e., log2TbWidth==3&&log2TbHeight==3). Even within the first sub-block, the significant coefficient may be present in the index [0, 7] region in the scan order, but the significant coefficient may not be present in the index [8, 15] region. Therefore, when the size of the transform block is 8×8, the number of significant coefficients may be counted when the scan position in the first sub-block is 8 or more (i.e., n>=8&&i==0), or the scan position is present in the remaining sub-blocks excluding the first sub-block (for example, be present in the second and third sub-blocks, i==1||i==2).

Finally, the significant coefficient may be present only in the first sub-block in the transform block and may not be present in the remaining sub-blocks (e.g., the second and third sub-blocks), when the size of the transform block is greater than 8×8. Therefore, when the sub-block is the second or third (i.e., i==1||i==2), the number of significant coefficients may be counted. Like the numSigCoeff counter, the numZeroOutSigCoeff counter may count the number of significant coefficients only when sig_coeff_flag[xC][yC] is 1 and transform_skip_flag[x0][y0] is 0. In this case, the sub-blocks may be indexed according to the up-right diagonal scan order described with reference to FIG. 13.

In other words, since the fact that a non-zero coefficient is present in the region where a significant coefficient may not be present (a specific region) indicates that the secondary transform is not performed, the significant coefficient is counted in order to check whether or not a non-zero coefficient is present in the specific region.

FIG. 17 is a diagram illustrating a method for indicating a secondary transform at a coding unit level according to an embodiment of the present invention.

As described in FIGS. 15 and 16, whether or not the secondary transform is applied may be indicated by the lfnst_idx[x0][y0] syntax element at the coding unit level, and in order for lfnst_idx[x0][y0] to be parsed, two significant coefficient counters (that is, the numSigCoeff counter and the numZeroOutSigCoeff counter) may be required. In particular, in the case of numSigCoeff, since the numSigCoeff counter has to count the number of significant coefficients present in the entire coding unit region, the throughput of coefficient coding may be reduced. Therefore, there is a need for a method for reducing the number of counters or not using a counter.

A secondary transform indication method illustrated in FIG. 17 is a method capable of parsing lfnst_idx[x0][y0] regardless of numSigCoeff. In other words, if the conditions described in FIG. 15, i), ii), iii), iv), v), and vii) are all satisfied (if all are true), the decoder may parse lfnst_idx[x0][y0]. Further, since the value of numSigCoeff is not referenced, the operation of the numSigCoeff counter described in FIG. 16 may not be performed.

In the present specification below, a method for indicating secondary transform based on position information of a last significant coefficient in a scan order will be described. Similar to when the number of significant coefficients is small, when the position (scan index) of the last significant coefficient in the scan order is small, coding efficiency due to the secondary transform may be low. Therefore, it is required to efficiently indicate the secondary transform based on the position information of the last significant coefficient in the scan order without using a counter.

First Embodiment

FIG. 18 is a diagram illustrating a method for indicating a secondary transform at a coding unit level according to an embodiment of the present invention.

FIG. 18 is a diagram illustrating a method for parsing lfnst_idx[x0][y0] by using position information of a last significant coefficient in a scan order obtained from residual_coding instead of the numSigCoeff counter.

With reference to FIG. 18, since the numSigCoeff counter is not used, the numSigCoeff value does not have to be initialized, and lfnstLastScanPos, a variable related to the position of the last significant coefficient in the scan order may be initialized to 1. When the lfnstLastScanPos value is 1, it indicates that the position (scan index) of the last significant coefficient in the scan order is less than the threshold value or that all transform coefficients in the block are 0. On the other hand, when the lfnstLastScanPos value is 0, it indicates that at least one significant coefficient is present in the block, and the position (scan index) of the last significant coefficient in the scan order is equal to or greater than the threshold value. Therefore, if the lfnstLastScanPos value is 1, lfnst_idx[x0][y0] may not be parsed, and if the lfnstLastScanPos value is 0, lfnst_idx[x0][y0] may be parsed. In addition, lfnst_idx[x0][y0] may be parsed if the lfnstLastScanPos value is 0, and the conditions i), ii), iii), iv), v), and vii) described in FIG. 15 are all satisfied (if all are true).

In other words, when at least one significant coefficient is present in the current block and the position (scan index) of the last significant coefficient in the scan order is equal to or greater than the threshold value, lfnst_idx[x0][y0] may be parsed. In this case, as described later, the threshold value may be an integer equal to or greater than 0. For example, assuming that the threshold value is 1, the fact that the position (scan index) of the last significant coefficient in the scan order is equal to or greater than the threshold value may mean that the significant coefficient is present at a position other than the upper left of the block. That is, in cases except when the significant coefficient does not present in the current block or is present only in the upper left of the current block, that is, only when the significant coefficient is present at a position other than the upper left of the current block, lfnst_idx[x0][y0] may be parsed. The meaning of the presence of the significant coefficient at a position other than the upper left of the current block may be expressed as 'LfnstDConly==0'. The upper left of the block described in the present specification may mean that the values of the horizontal and vertical coordinates are (0, 0), may refer to the first position in a preset scan order (e.g., up-right diagonal order), or may be referred to as DC.

FIG. 19 is a diagram illustrating a residual_coding syntax structure according to an embodiment of the present invention.

FIG. 19 illustrates the residual_coding syntax structure described with reference to FIG. 18 described above, and in residual_coding, syntax elements related to the x-coordinate and y-coordinate of the last significant coefficient in the scan order may be parsed such that LastSignificantCoeffX and LastSignificantCoeffY variables are may be set. LastSignificantCoeffX represents the x coordinate of the last significant coefficient in the scan order, and LastSignificantCoeffY represents the y coordinate of the last significant coefficient in the scan order. Based on LastSignificantCoeffX and LastSignificantCoeffY, the lastScanPos variable that is the scan index of the last significant coefficient in the scan order and the index lastSubBlock of the sub-block including the last significant coefficient may be determined. In this case, as described with reference to FIG. 16, when the secondary transform is applied to the current block, only the first sub-block may have the significant coefficient. In other words, when the significant coefficient is present only in the first sub-block, the secondary transform may be applied.

For example, when LastSignificantCoeffX is 2 and LastSignificantCoeffY is 3 in the 4×4 sized block of FIG. 14(a), determination may be made that lastScanPos is 13. Since the 4×4 sized block may be composed of one sub-block, determination may be made that the index lastSubBlock of the sub-block including the last significant coefficient is 0. For another example, the 8×8 sized block of FIG. 14(b) may be divided into 4×4 sized sub-blocks. Specifically, in FIG. 14(b), a 4×4 block corresponding to x coordinates 0 to 3 and y coordinates 0 to 3 may be set as a first sub-block, and a 4×4 block corresponding to x coordinates 0 to 3 and y coordinates 4 to 7 may be set as a second sub-block, a 4×4 block corresponding to x coordinates 4 to 7 and y coordinates 0 to 3 may be set as a third sub-block, and a 4×4 block corresponding to x coordinates 4 to 7 and y coordinates 4 to 7 may be set as a fourth sub-block. In this case, the first sub-block may be indexed as index 0, the second sub-block may be indexed as index 1, the third sub-block may be indexed as index 2, and the fourth sub-block may be indexed as index 3. The sub-blocks may be indexed according to the up-right diagonal scan order described with reference to FIG. 13. In this case, when LastSignificantCoeffX is 2 and LastSignificantCoeffY is 3, determination is made that lastScanPos is 13. Since lastScanPos is 13, the sub-block including lastScanPos 13 is the first sub-block (i.e., sub-block index 0), and thus the index (lastSubBlock) of the sub-block including the last significant coefficient may be determined to be 0.

Based on lastScanPos described above, lfnstLastScanPos may be determined. Specifically, when the width and height of the transform block is 4 or more and the transform skip is not applied to the transform block, lfnstLastScanPos may be set as in Equation 1 below. In other words, when log2TbWidth>=2, log2TbHeight>=2, and transform_skip_flag[x0][y0] is 0, lfnstLastScanPos may be set as in Equation 1 below. In this case, when transform_skip_flag[x0][y0] is 0, it may mean that the transform skip is not applied to the current transform block. Specifically, the flag transform_skip_flag[x0][y0] described in the present specification may indicate whether or not the primary transform and the secondary transform are applied to the transform block. For example, when the value of transform_skip_flag[x0][y0] is 1, it may indicate that the primary transform and the secondary transform are not applied to the transform block (that is, the transform skip is applied), and when the value of the transform skip flag[x0][y0] is 0, it may indicate that the primary transform and the secondary transform may be applied to the transform block (that is, the transform skip is not applied).

$$\text{lfnstLastScanPos=fnstLastScanPos\&\&} \\ \text{(lastScanPos<fnstLastScanPosTh[cIdx])} \quad \text{[Equation 1]}$$

As described above, the initial value of lfnstLastScanPos may be set to 1.

In Equation 1, cIdx may represent a variable indicating a color component of the current transform block. For example, when cIdx is 0, it may indicate that a transform block to be processed in residual_coding is a luma Y component. When cIdx is 1, it may indicate that a transform block to be processed in residual_coding is a chroma Cb component, and when cIdx is 2, it may indicate that a transform block to be processed is a chroma Cr component. The threshold value for lastScanPos, lfnstLastScanPosTh[cIdx], may be set to a different value depending on color components.

According to Equation 1, when the immediate previous lfnstLastScanPos is 1 and lastScanPos is less than lfnstLastScanPosTh[cIdx], lfnstLastScanPos may be updated to 1.

On the other hand, when the immediately previous lfnstLastScanPos is 0 or lastScanPos is equal to or greater than lfnstScanPosTh[cIdx], lfnstLastScanPos may be updated to 0. In other words, if lastScanPos of all transform blocks included in the coding unit is less than the threshold value or coefficients of all transform blocks are all 0, determination may be made that lfnstLastScanPos is 1, and lfnst_idx[x0][y0] may be set to 0 without being parsed according to the parsing condition of lfnst_idx[x0][y0] of FIG. 18. The fact that lfnst_idx[x0][y0] is not parsed and is set to 0 indicates that the secondary transform is not applied to the current block. On the other hand, if any one of the transform blocks included in the coding unit has lastScanPos equal to or greater than the threshold value, determination may be made that lfnstLastScanPos is 0, and if the conditions i), ii), iii), iv), v), and vii) described in FIG. 15 are all satisfied (if all are true), the decoder may parse lfnst_idx[x0][y0]. The decoder may parse lfnst_idx[x0][y0] to check whether or not the secondary transform is applied to the current block, and if the secondary transform is applied, a transform kernel used for the secondary transform may be checked/determined.

lfnstLastScanPosTh[cIdx] in Equation 1 is a preset integer value equal to or greater than 0, and both the encoder and the decoder may use the same value. In addition, the same threshold value may be used for all color components. In this case, lfnstLastScanPos may be set as in Equation 2 below. The coding unit described in the present specification may include a plurality of coding blocks, and a transform block corresponding to each of the coding blocks may exist. The transform block may be a transform block having luminance and color difference components. Specifically, the transform block may be a Y transform block, a Cb transform block, or a Cr transform block. In this case, whether to parse lfnst_idx[x0][y0] described in the present specification may be determined for each transform block corresponding to each of the coding blocks. That is, when any one of the Y transform block, the Cb transform block, and the Cr transform block satisfies the conditions described in the present specification, lfnst_idx[x0][y0] may be parsed.

$$\text{lfnstLastScanPos=lfnstLastScanPos\&\&} \\ \text{(lastScanPos<lfnstLastScanPosTh)} \quad \text{[Equation 2]}$$

lfnstLastScanPosTh is a preset integer value equal to or greater than 0, and both the encoder and the decoder may use the same value. For example, lfnstLastScanPosTh may be 1. That is, when lastScanPos is 1 or more, lfnstLastScanPos may be updated to 0, and lfnst_idx[x0][y0] may be parsed. In this case, since the threshold value lfnstLastScanPosTh is an integer value, a case in which lastScanPos is 1 or more may have the same meaning as a case in which lastScanPos is greater than 0. As an example of the present invention, a case where the threshold value is 1 has been described; however, the present invention is not limited thereto.

In other words, whether to parse lfnst_idx[x0][y0] based on lastScanPos may be determined. Specifically, as described above, when the secondary transform is applied, the last significant coefficient in the scan order may be present only in the first sub-block of the transform block. Therefore, when the index lastSubBlock of the sub-block including the last significant coefficient in the scan order (where the index indicated by lastScanPos is located) is 0, the width of the transform block is 4 or more (log2TbWidth>=2), the height of the transform block is 4 or more (log2TbHeight>=2), transform_skip_flag[x0][y0] is 0 (transform skip is not applied), and lastScanPos is greater than 0 (lastScanPos is 1 or more), lfnst_idx[x0][y0] may be parsed. It may be expressed as Equation 3 below.

$$\text{lastSubBlock==0\&\&} \\ \text{log2TbWidth>=2\&\&log2TbHeight>=2\&\&!transform\_skip\_flag} \\ \text{[x0][y0][cIdx]\&\&lastScanPos>0} \quad \text{[Equation 3]}$$

Meanwhile, in the above-described first embodiment, since the numSigCoeff counter is not used for parsing lfnst_idx[x0][y0], the number numSigCoeff of significant coefficients may not be counted.

Second Embodiment

FIG. 20 is a diagram illustrating a residual_coding syntax structure according to another embodiment of the present invention.

FIG. 20 is a diagram illustrating a method for receiving a treeType variable for residual_coding in addition to FIG. 19 and setting a threshold value for lastScanPos according to the treeType.

When the width and height of the transform block is 4 or more and the transform skip is not applied to the transform block, lfnstLastScanPos may be set as in Equation 4 below. In other words, when log2TbWidth>=2, log2TbHeight>=2, and transform skip flag[x0][y0] is 0, lfnstLastScanPos may be set as in Equation 4 below. In this case, when transform_skip_flag[x0][y0] is 0, it may mean that the transform skip is not applied to the current transform block.

$$\text{lfnstLastScanPosTh=(treeType==SINGLE\_TREE)?} \\ \text{val1:((treeType=DUAL\_TREE\_LUMA)?val2:} \\ \text{val3)lfnstLastScanPos=lfnstLastScanPos\&\&} \\ \text{(lastScanPos<lfnstLastScanPosTh)} \quad \text{[Equation 4]}$$

In Equation 4, lfnstLastScanPosTh means a threshold value for lastScanPos, and the value may be set according to treeType. When treeType is SINGLE_TREE, DUAL_TREE_LUMA, and DUAL_TREE_CHROMA, lfnstLastScanPosTh may be set to val1, val2, and val3, respectively. When the immediate previous lfnstLastScanPos is 1 and lastScanPos is less than lfnstLastScanPosTh, lfnstLastScanPos may be updated to 1. On the other hand, when the immediately preceding lfnstLastScanPos is 0 or lastScanPos is equal to or greater than lfnstScanPosTh, lfnstLastScanPos may be updated to 0.

In Equation 4, as a result, when lastScanPos of all transform blocks included in the coding unit is less than the threshold value or coefficients of all transform blocks are all 0, determination may be made that lfnstLastScanPos is 1, and lfnst_idx[x0][y0] may be set to 0 without being parsed according to the parsing condition of lfnst_idx[x0][y0] of FIG. 18. This indicates that the secondary transform is not applied to the current block. On the other hand, if any one of the transform blocks included in the coding unit has lastScanPos equal to or greater than the threshold value, determination may be made that lfnstLastScanPos is 0, and if i), ii), iii), iv), v), and vii) described in FIG. 15 are all satisfied (if all are true), the decoder may parse lfnst_idx[x0][y0]. The decoder may parse lfnst_idx[x0][y0] to check whether or not the secondary transform is applied to the current block, and if the secondary transform is applied, a transform kernel used for the secondary transform may be checked/determined.

val1, val2, and val3 are preset integer values equal to or greater than 0, and both the encoder and the decoder may use the same value. When treeType is SINGLE_TREE, both luma and chroma components are included, and thus val1, which is the value of lfnstLastScanPosTh, may be expressed as the sum of val2 and val3.

In the above-described second embodiment, since the numSigCoeff counter is not used for parsing lfnst_idx[x0][y0], the number numSigCoeff of significant coefficients may not be counted.

Third Embodiment

FIG. 21 is a diagram illustrating a method for indicating a secondary transform at a coding unit level according to another embodiment of the present invention.

With reference to FIG. 21, lfnst_idx[x0][y0] may be parsed by using position information of the last significant coefficient in the scan order obtained from residual_coding instead of the numSigCoeff counter.

Since numSigCoeff counter is not used, numSigCoeff does not have to be initialized, and the variable related to the position of the last significant coefficient in the scan order, lfnstLastScanPos, may be initialized to 0. The lfnstLastScanPos variable of FIG. 21 may be a value obtained by adding lastScanPos of transform blocks included in the coding unit. In this case, if lfnstLastScanPos is greater than the threshold value and the conditions i), ii), iii), iv), v), and vii) described in FIG. 15 are all satisfied (if all are true), the decoder may parse lfnst_idx[x0][y0]. The decoder may parse lfnst_idx[x0][y0] to check whether or not the secondary transform is applied to the current block, and if the secondary transform is applied, a transform kernel used for the secondary transform may be checked/determined. On the other hand, when lfnstLastScanPos is less than or equal to the threshold value, lfnst_idx[x0][y0] may be set to 0 without being parsed. This indicates that the secondary transform is not applied.

The threshold value may be set according to treeType. When treeType is SINGLE_TREE, DUAL_TREE_LUMA, DUAL_TREE_CHROMA, threshold values may be set to Th1, Th2, and Th3, respectively. Th1, Th2, and Th3 are preset integer values equal to or greater than 0, and both the encoder and the decoder may use the same value. When treeType is SINGLE_TREE, both luma and chroma components are included, and thus Th1, which is the threshold value, may be expressed as the sum of Th2 and Th3, which are threshold values.

FIG. 22 is a diagram illustrating a residual_coding syntax structure according to another embodiment of the present invention.

FIG. 22 illustrates the residual_coding syntax structure described with reference with FIG. 21, and when the width and height of the transform block is 4 or more and the transform skip is not applied to the transform block, lfnstLastScanPos may be set as in Equation 5 below. In other words, when log2TbWidth>=2, log2TbHeight>=2, and transform_skip_flag[x0][y0] is 0, lfnstLastScanPos may be set as in Equation 5 below. In this case, when transform_skip_flag[x0][y0] is 0, it may mean that the transform skip is not applied to the current transform block.

lfnstLastScanPos=lfnstLastScanPos+lastScanPos [Equation 5]

In Equation 5 above, lfnstLastScanPos is a value obtained by adding all of lastScanPos of transform blocks included in the coding unit. As described in FIG. 21, whether to parse lfnst_idx[x0][y0] may be determined by comparing lfnstLastScanPos with a threshold value.

In the above-described third embodiment, since the numSigCoeff counter is not used for parsing lfnst_idx[x0][y0], the number numSigCoeff of significant coefficients may not be counted.

On the other hand, the coding unit may include a transform unit split by a transform tree with the same size as the coding unit as a root node. In this case, the transform unit may include a transform block for each color component. When the secondary transform is indicated at the coding unit level, after residual coding is performed on all transform blocks included in the coding unit, lfnst_idx[x0][y0] may be parsed based on coefficient information. In another embodiment, the secondary transform may be indicated at a transform unit level. When the secondary transform is indicated at the transform unit level, each transform unit included in the coding unit may use a different lfnst_idx[x0][y0]. Therefore, the encoder may find lfnst_idx[x0][y0] optimized for each transform unit, and may further improve encoding efficiency. In addition, when the secondary transform is indicated at the coding unit level and the coding unit includes four transform units, the residual coding for all transform blocks included in the four transform units is to be processed in order for lfnst_idx[x0][y0] to be parsed. That is, even if the decoder obtains a transform coefficient through residual coding for the first transform unit, since the decoder does not obtain the lfnst_idx[x0][y0] value, the decoder may not perform inverse transform on the first transform unit. This not only may increase the buffer size of the decoder, but may cause excessive delay time in the decoder.

The first to third embodiments described in FIGS. 18 to 22 may be applied even when the secondary transform is indicated at the transform unit level. When the secondary transform is indicated at the coding unit level, whether to parse lfnst_idx[x0][y0] may be determined based on the position of the last significant coefficient in the scan order of transform blocks included in the coding unit according to the first to third embodiments. In addition, when the secondary transform is indicated at the transform unit level, whether to parse lfnst_idx[x0][y0] may be determined based on the position of the last significant coefficient in the scan order of transform blocks included in the transform unit, according to the first to third embodiments.

Hereinafter, a specific method in which a secondary transform is indicated at a transform unit level will be described.

FIG. 23 is a diagram illustrating a method for indicating a secondary transform at a transform unit level according to an embodiment of the present invention.

With reference to FIG. 23, lfnst_idx[x0][y0] may be parsed by using position information of the last significant coefficient in a scan order obtained from residual_coding instead of the numSigCoeff counter.

First, before residual_coding is performed, a variable related to the position of the last significant coefficient in the scan order, lfnstLastScanPos, may be initialized to 1. When the lfnstLastScanPos variable is 1, it may indicate that the position (scan index) of the last significant coefficient in the scan order for all transform blocks included in the transform unit is less than the threshold value or that all transform coefficients in the block are 0. When the lfnstLastScanPos variable is 0, it may indicate that one or more significant coefficients is present in the block for one or more transform blocks included in the transform unit, and the position (scan index) of the last significant coefficient in the scan order is equal to or greater than the threshold value. According to the first embodiment described above, if lfnstLastScanPos, which is set based on the position of the last significant coefficient in the scan order of the transform block, is 0, and conditions i), ii), iii), iv), v), and vi) to be described later are all satisfied (if all are true), the decoder may parse lfnst_idx[x0][y0].

lfnst_idx[x0][0] Syntax Element Parsing Condition i) Min(lfnstWidth, lfnstHeight)>=4

First, a first condition is related to a block size. When the width and height of the block are 4 pixels or more, the decoder may parse the lfnst_idx[x0][y0] syntax element.

Specifically, the decoder may check a block size condition to which the secondary transform may be applied. The variables SubWidthC and SubHeightC are set according to the color format, and may represent the ratio of the width of the chroma component to the width of the luma component, and the ratio of the height of the chroma component to the height of the luma component, in a picture, respectively. For example, since a 4:2:0 color format image has a structure including one chroma sample per four luma samples, SubWidthC and SubHeightC may be both set to 2. For another example, since a 4:4:4 color format image has a structure including one chroma sample per one luma sample, SubWidthC and SubHeightC may be both set to 1. lfnstWidth, which is the number of samples in the horizontal direction of the current block, and lfnstHeight, which is the number of samples in the vertical direction, may be set based on SubWidthC and SubHeightC. When treeType is DUAL_TREE_CHROMA, since the transform unit includes only the chroma component, the number of samples in the horizontal direction of the chroma transform block is equal to the value obtained by dividing tbWidth, which is the width of the luma transform block, by SubWidthC. Similarly, the number of samples in the vertical direction of the chroma transform block is equal to the value obtained by dividing tbHeight, which is the height of the luma transform block, by SubHeightC. When treeType is SINGLE_TREE or DUAL_TREE_LUMA, since the transform unit includes a luma component, lnfnstWidth and lfnstHeight may be set to tbWidth and tbHeight, respectively. Since the minimum condition of the block to which the secondary transform may be applied is 4×4, if Min(lfnstWidth, lfnstHeight)>=4 is satisfied, lfnst_idx[x0][y0] may be parsed.

ii) sps_lfnst_enabled_flag==1

A second condition relates to a flag value indicating whether or not the secondary transform may be enabled or applied, and when the value of the flag (sps_lfnst_enabled_flag) indicating whether or not the secondary transform may be enabled or applied is set to 1, the decoder may parse lfnst_idx [x0][y0].

Specifically, the secondary transform may be indicated at a high-level syntax RBSP. A flag having a 1-bit size indicating whether or not the secondary transform may be enabled or applied may be included in at least one of SPS, PPS, VPS, tile group header, and slice header. When sps_lfnst_enabled_flag is 1, it indicates that the lfnst_idx[x0][y0] syntax element is present in the transform unit syntax. When sps_lfnst_enabled_flag is 0, it indicates that the lfnst_idx[x0][y0] syntax element does not present in the transform unit syntax.

iii) CuPredMode[x0][y0]==MODE_INTRA

A third condition relates to a prediction mode, and the secondary transform may be applied only to the intra-predicted block. Therefore, when the current block is an intra-predicted block, the decoder may parse lfnst_idx[x0][y0].

iv) IntraSubPartitionsSplitType==ISP_NO_SPLIT

A fourth condition relates to whether or not the ISP prediction method is applied. When the ISP is not applied to the current block, the decoder may parse the lfnst_idx[x0][y0] syntax element.

Specifically, as described with reference to FIG. 11, when the current CU is partitioned into a plurality of transform units smaller than the size of the CU, the secondary transform may not be applied to the partitioned transform units. In this case, lfnst_idx[x0][y0], which is a syntax element related to the secondary transform, may be set to 0 without being parsed. When the transform tree for the current CU is split into a plurality of transform units smaller than the size of the CU, ISP prediction may be applied to the current coding unit. When intra prediction is applied to the current coding unit, the ISP prediction method may be a prediction method for splitting a transform tree into a plurality of transform units smaller than the size of a CU according to a preset splitting method. The ISP prediction mode may be indicated at the coding unit level, and a variable IntraSubPartitionsSplitType may be set based on it. In this case, when IntraSubPartitionsSplitType is ISP_NO_SPLIT, it indicates that ISP is not applied to the current block. Due to the characteristics of intra prediction in which prediction samples are generated at the transform unit level, the accuracy of prediction may be higher when the transform tree is split into a plurality of transform units than when the transform tree is not split. Therefore, it is highly likely that the energy of the residual signal is efficiently compacted even if the secondary transform is not applied to the split plurality of transform units.

v) !intra_mip_flag[x0][y0]

A fifth condition relates to an intra prediction method. When matrix based intra prediction (MIP) is not applied to the current coding unit prediction, the decoder may parse the lfnst_idx[x0][y0] syntax element.

Specifically, the matrix based intra prediction (MIP) may be used as a method for intra prediction, and whether or not the MIP is applied may be indicated by intra_mip_flag[x0][y0] at the coding unit level. When Intra_mip_flag[x0][y0] is 1, it may indicate that the MIP is applied to prediction of the current coding unit, and prediction may be performed by multiplying reconstructed samples around the current block and a preset matrix. Since a residual signal property different from general intra prediction that performs directional or non-directional prediction is appeared when the MIP is applied, the secondary transform may not be applied to the transform block when the MIP is applied.

vi) numZeroOutSigCoeff==0

A sixth condition is related to the significant coefficient present at a specific position.

Specifically, when the secondary transform is applied to the current block, the transform coefficient quantized in the decoder may always be 0 at a specific position. Therefore, since the secondary transform is not applied when a non-zero quantization coefficient is present at a specific position, lfnst_idx[x0][y0] may be parsed depending on the number of significant coefficients at the specific position. For example, when numZeroOutSigCoeff is not 0 means that a significant coefficient is present at a specific position, and thus lfnst_idx[x0][y0] may be set to 0 without being parsed. On the other hand, when numZeroOutSigCoeff is 0, it means that no significant coefficient is present at a specific location, and thus lfnst_idx[x0][y0] may be parsed.

When it is indicated at the transform unit level whether or not the secondary transform is applied to the current block based on the first embodiment described above, the residual_coding method described in FIG. 19 may be followed. If lastScanPos of all transform blocks included in the transform unit is less than the threshold value according to Equation 1 for determining lfnstLastScanPos described in FIG. 19 or coefficients of all transform blocks are all 0, determination may be made that lfnstLastScanPos is 1, and lfnst_idx[x0][y0] may be set to 0 without being parsed. This indicates that the secondary transform is not applied to the current block. On the other hand, if any one of the transform blocks included in the transform unit has lastScanPos equal to or greater than the threshold value, determination may be made that lfnstLastScanPos is 0, and if the conditions i), ii), iii), iv), v), and vii) described in FIG. 23 are all satisfied (if all are true), the decoder may parse lfnst_idx[x0][y0]. The decoder may parse lfnst_idx[x0][y0] to check whether or not the secondary transform is applied to the current block, and when the secondary transform is applied, a transform kernel used for the secondary transform may be confirmed/determined.

When it is indicated at the transform unit level whether or not secondary transform is applied based on the second embodiment described above, the transform unit syntax structure described in FIG. 23 may be applied, and the residual_coding method described in FIG. 20 may be used. When lastScanPos of all transform blocks included in the transform unit is less than the threshold value according to Equation 4 for determining lfnstLastScanPos described in FIG. 20 or coefficients of all transform blocks are all 0, determination may be made that lfnstLastScanPos is 1, and lfnst_idx[x0][y0] may be set to 0 without being parsed. This indicates that the secondary transform is not applied to the current block. On the other hand, if any one of the transform blocks included in the transform unit has lastScanPos equal to or greater than the threshold value, determination may be made that lfnstLastScanPos is 0, and if the conditions i), ii), iii), iv), v), and vi) described in FIG. 23 are all satisfied (if all are true), the decoder may parse lfnst_idx[x0][y0]. The decoder may parse lfnst_idx[x0][y0] to check whether or not the secondary transform is applied to the current block, and when the secondary transform is applied, a transform kernel used for the secondary transform may be checked/determined.

FIG. 24 is a diagram illustrating a method for indicating a secondary transform at a transform unit level according to another embodiment of the present invention.

According to the third embodiment described above, lfnst_idx[x0][y0] may be parsed by using position information of the last significant coefficient in a scan order obtained from residual_coding instead of the numSigCoeff counter.

Before residual_coding is performed, a variable related to the position of the last significant coefficient in the scan order, lfnstLastScanPos, may be initialized to 0. The variable lfnstLastScanPos may be a value obtained by adding lastScanPos of transform blocks included in the transform unit. In this case, if lfnstLastScanPos is greater than the threshold value and the conditions i), ii), iii), iv), v), and vi) described in FIG. 23 are all satisfied (if all are true), the decoder may parse lfnst_idx[x0][y0]. The decoder may parse lfnst_idx[x0][y0] to check whether or not the secondary transform is applied to the current block, and if the secondary transform is applied, a transform kernel used for the secondary transform may be checked/determined. On the other hand, when lfnstLastScanPos is less than or equal to the threshold value, lfnst_idx[x0][y0] may be set to 0 without being parsed. This indicates that the secondary transform is not applied.

The threshold value may be set according to treeType. When treeType is SINGLE_TREE, DUAL_TREE_LUMA, DUAL_TREE_CHROMA, threshold values may be set to Th1, Th2, and Th3, respectively. Th1, Th2, and Th3 are preset integer values equal to or greater than 0, and both the encoder and the decoder may use the same value. When treeType is SINGLE_TREE, both luma and chroma components are included, and thus Th1, which is the threshold value, may be expressed as the sum of Th2 and Th3, which are threshold values.

When it is indicated at the transform unit level whether or not the secondary transform is applied based on the third embodiment described above, the residual_coding method described in FIG. 22 may be used. According to Equation 5 for determining lfnstLastScanPos described in FIG. 22, the variable lfnstLastScanPos may be set to a value obtained by adding all of lastScanPos of transform blocks included in the transform unit. In addition, determination may be made as to whether or not lfnst_idx[x0][y0] is parsed by comparing lfnstLastScanPos with a threshold value.

On the other hand, when the secondary transform is indicated at a transform unit level, a correlation may be high between transform units included in the coding unit. This is because the method for prediction is determined at the coding unit level. Therefore, lfnst_idx[x0][y0] is signaled only in the first transform unit included in the coding unit, and the signaled lfnst_idx[x0][y0] may be shared with the remaining transform units. That is, only if subTuIndex indicating the index of the transform unit is 0, lfnst_idx[x0][y0] may be parsed by using the above-described first to third embodiments. If subTuIndex is greater than 0, the corresponding transform units do not parse lfnst_idx[x0][y0], and may use the value of lfnst_idx[x0][y0] of the shared first transform unit.

On the other hand, a counter for counting the significant coefficient may be used, but determination as to whether or not the decoder parses lfnst_idx[x0][y0] may be made taking into account only significant coefficients present in the sub-block of the transform block on the upper left. This is to reduce the amount of operations.

On the other hand, the delay time of the decoder may be reduced when the secondary transform is indicated at the transform unit level compared to when it is indicated at the coding unit level, but another delay time may occur. For example, even if the secondary transform is indicated at the transform unit level, the secondary transform is indicated after coding of the luma transform coefficient, the Cb transform coefficient, and the Cr transform coefficient is all completed. Therefore, even if the coding (processing) of the luma transform coefficients is all completed, the inverse transform processing for the luma transform coefficients may be performed after the coding (processing) of the Cb transform coefficient and the Cr transform coefficient is completed. This leads to another delay time of the decoder.

Hereinafter, a description will be given of a secondary transform indication method for minimizing a delay time of the decoder.

Fourth Embodiment

By an example of the secondary transform indication method for minimizing the delay time of the decoder, the secondary transform is indicated at a transform unit level, but there may be a method for parsing lfnst_idx[x0][y0], a syntax element related to the secondary transform before a luma transform coefficient coding. Therefore, the decoder may perform an inverse transform processing on the luma transform coefficient immediately after the luma transform coefficient coding is completed, without waiting for the Cb transform coefficient and Cr transform coefficient coding. Similarly, the decoder may perform the inverse transform process on the Cb transform coefficient immediately after the Cb transform coefficient coding is completed, without waiting for the Cr transform coefficient coding. This secondary transform indication method may minimize the delay time of the decoder and may solve the pipeline problem.

FIG. 25 is a diagram illustrating a coding unit syntax according to an embodiment of the present invention.

Referring to FIG. 25, since the secondary transform is indicated at the transform unit level, the syntax related to the secondary transform, lfnst_idx[x0][y0], is not parsed at the coding unit level, and may be parsed at the transform unit level split by the transform_tree.

FIG. 26 is a diagram illustrating a method for indicating a secondary transform at a transform unit level according to another embodiment of the present invention.

Referring to FIG. 26, the secondary transform indication method may be indicated at the transform unit level, and lfnst_idx[x0][y0], which is a syntax element related to the secondary transform, may be first parsed before luma and chroma transform coefficient coding (residual_coding). For example, when lfnst_idx[x0][y0] is first parsed before obtaining the transform coefficient, as soon as the coefficient coding for each of color components Y, Cb, and Cr is completed, the inverse transform on the Y, Cb, and Cr transform coefficients may be processed. For example, as soon as the transform coefficient coding for the Y component is completed, the inverse transform on the luma (Y) transform coefficient may be performed. Similarly, as soon as the transform coefficient coding (residual_coding) for the Cb component is completed, the inverse transform on the Cb transform coefficient may be performed, and as soon as the transform coefficient coding (residual_coding) for the Cr component is completed, the inverse transform on the Cr transform coefficient may be performed.

When lfnst_idx[x0][y0] is parsed after transform coefficient coding (residual_coding) for Y, Cb, Cr, even if transform coefficient coding (residual_coding) for Y is completed, the inverse transform on the Y transform coefficient may not be performed/processed if the transform coefficient coding (residual_coding) for Cb, Cr is not completed/processed. Therefore, even if the transform coefficient coding (residual_coding) for Y is completed, the decoder may not perform the inverse transform on the Y transform coefficient until the transform coefficient coding (residual_coding) for other components Cb and Cr is completed, which may result in unnecessary delay time. However, as described above, if lfnst_idx[x0][y0] is first parsed before transform coefficient coding (residual_coding), since the inverse transform may be performed on the transform coefficients of each of color components Y, Cb, and Cr immediately after the transform coefficient coding (residual_coding) for each of the color components is completed, there is an effect of minimizing the delay time of the decoder.

In the transform_unit( ) syntax structure, tu_cbf_luma[x0][y0], tu_cbf_cb[x0][y0], tu_cbf_cr[x0][y0], transform_skip_ flag[x0][y0], and the like may be parsed.

Specifically, tu_cbf_luma[x0][y0] is an element indicating whether or not the current luma transform block includes one or more non-zero transform coefficients. If tu_cbf_luma[x0][y0] is 1, it may indicate that the current luma transform block includes one or more non-zero transform coefficients. If tu_cbf_luma[x0][y0] is 0, it may indicate that all transform coefficients of the current luma transform block are 0. tu_cbf_cb[x0][y0] is an element indicating whether or not the current chroma Cb transform block includes one or more non-zero transform coefficients. If tu_cbf_cb[x0][y0] is 1, it may indicate that the current chroma Cb transform block includes one or more non-zero transform coefficients. If tu_cbf_cb[x0][y0] is 0, it may indicate that all transform coefficients of the current Cb transform block are 0. tu_cbf_cr[x0][y0] is an element indicating whether or not the current chroma Cr transform block includes one or more non-zero transform coefficients. If tu_cbf_cr[x0][y0] is 1, it may indicate that the current chroma Cr transform block includes one or more non-zero transform coefficients. If tu_cbf_cr[x0][y0] is 0, it may indicate that all of the transform coefficients of the current chroma Cr transform block are 0. transform_skip_flag[x0][y0] is a syntax element related to the transform skip. If transform_skip_flag[x0][y0] is 1, it may indicate that inverse transform is not applied to the luma transform block. If transform_skip_flag[x0][y0] is 0, it may indicate that determination is made by another syntax element as to whether or not the inverse transform is applied to the luma transform block.

As an embodiment of the secondary transform indication method with reference to FIG. 26, based on the position of the last significant coefficient in the scan order, not based on the number of non-zero transform coefficients (significant coefficients), the syntax element related to the secondary transform, lfnst_idx[x0][y0], may be parsed.

First, the lfnstLastScanPos variable may be set by being initialized to 1. The variable lfnstLastScanPos may indicate position information of the last significant coefficient in the scan order of the transform block included in the current transform unit, as described with reference to FIG. 23. Specifically, when lfnstLastScanPos is 1, it may indicate that the position (scan index) of the last significant coefficient in the scan order for all transform blocks included in the transform unit is less than the threshold value or that all transform coefficients in the block are 0. When lfnstLastScanPos is 0, it may indicate that one or more significant coefficients are present in the block for one or more transform blocks included in the transform unit, and the position (scan index) of the last significant coefficient in the scan order is equal to or greater than the threshold value.

Next, the variable numZeroOutSigCoeff may be set by being initialized to 0. When the secondary transform is applied to the transform block, the significant coefficient may not be present at a specific position in the scan order. Therefore, the variable numZeroOutSigCoeff may indicate whether or not the significant coefficient is present at a specific position, and based on this, it may be checked whether the secondary transform is applied. For example, when the secondary transform is applied to the transform block, it is assumed that only a maximum of 16 significant coefficients are allowed. In transform blocks of 4×4 and 8×8 sizes, significant coefficients may be present in the index [0, 7] region in the scan order (maximum of 8 non-zero transform coefficients are allowed). On the other hand, in transform blocks of a size other than 4×4 and 8×8, significant coefficients may be present in the index [0, 15] region in the scan order (maximum of 16 non-zero transform coefficients are allowed). Therefore, if the position (scan index) of the last significant coefficient in the scan order is present outside the above-described region where the significant coefficient may be present, the decoder may clearly recognize that the secondary transform is not applied to the current transform block.

As to whether to parse the syntax element related to the secondary transform lfnst_idx[x0][y0] before coefficient coding (residual_coding), determination may be made based on the position (scan index) of the last significant coefficient in the scan order. Therefore, the decoder may process information related to the position of the last significant coefficient in the scan order before coefficient coding (residual_coding).

Specifically, when the current luma transform block includes one or more significant coefficients (tu_cbf_luma [x0][y0]==1) and the transform skip is not applied to the current luma transform block (transform_skip_flag[x0] [y0]==0), last_significant_pos, which is a syntax structure related to the position of the last significant coefficient in the scan order of luma, may be processed.

When the tu_cbf_luma[x0][y0] value is 0 (tu_cbf_luma [x0][y0]==0), it indicates that all coefficients of the corresponding transform block are 0, which, in turn, indicates that the coefficient coding (residual_coding) is not performed. Therefore, processing for the positional information of the last significant coefficient in the scan order does not have to be performed.

When the transform_skip_flag[x0][y0] value is 1, it may indicate that inverse transform is not applied to the current luma transform block. Therefore, the coefficient coding (residual_coding) may be performed without being based on position information of the last significant coefficient in the scan order.

When the current chroma Cb transform block includes one or more significant coefficients (tu_cbf_cb[x0][y0]==1), last_significant_pos, which is a syntax structure related to the position of the last significant coefficient other than 0 in the scan order of the chroma Cb transform block, may be processed. The last_significant_pos syntax structure may receive, as inputs, (x0, y0), which is the upper left coordinate of the transform block, the value obtained by taking the logarithm of the base 2 to the width of the transform block, the value obtained by taking the logarithm of the base 2 to the height of the transform block, and cIdx, which is a variable indicating which color component the transform block is. For example, when cIdx is 0, the luma Y transform block may be represented, when cIdx is 1, the chroma Cb transform block may be represented, and when cIdx is 2, the chroma Cr transform block may be represented. When the value of tu_cbf_cb[x0][y0] is 0 (tu_cbf_cb[x0][y0]==0), it indicates that all coefficients of the corresponding transform block are 0. This means that the coefficient coding (residual_coding) is not performed, and thus processing for position information of the last significant coefficient other than 0 in the scan order does not have to be performed.

On the other hand, if the current chroma Cr transform block includes one or more significant coefficients (tu_cbf_cr[x0][y0]==1), tu_joint_cbcr_residual[x0][y0], which is the syntax element indicating whether or not chroma Cb and Cr are expressed as one residual signal before the last_significant_pos process, may be parsed. For example, when tu_joint_cbcr_residual[x0][y0] is 1, the coefficient coding (residual_coding) for Cr is not processed, and the residual signal for Cr may be derived from the reconstructed residual signal of Cb. On the other hand, when tu_joint_cbcr_residual[x0][y0] is 0, the coefficient coding (residual_coding) for Cr may be performed according to a value of tu_cbf_cr[x0][y0]. If the current chroma Cr transform block includes one or more significant coefficients (tu_cbf_cr[x0][y0]==1), the syntax structure related to the position of the last significant coefficient in the scan order of chroma Cr, last_significant_pos may be processed. When the value of tu_cbf_cr[x0][y0] is 0 (tu_cbf_cr[x0][y0]==0), it indicates that all coefficients of the chroma Cr transform block are 0. This means that the coefficient coding (residual_coding) is not performed, and thus processing of position information of the last significant coefficient other than 0 in the scan order does not have to be performed.

As the processing of last_significant_pos for each of the color components is performed, the position (scan index) of the last significant coefficient in the scan order for each of the color components may be obtained, and based on this, lfnstLastScanPos and numZeroOutSigCoeff values may be updated.

In addition, if conditions i), ii), iii), iv), v), vi), and vii) to be described later are all satisfied (if all are true), the decoder may parse lfnst_idx[x0][y0] before the coefficient coding (residual_coding).

lfnst_idx[x0][0] Syntax Element Parsing Condition Before Coefficient Coding (Residual_Coding)

i) Min(lfnstWidth, lfnstHeight)>=4

First, a first condition is related to a block size. When the width and height of the block are 4 pixels or more, the decoder may parse the lfnst_idx[x0][y0] syntax element.

Specifically, the decoder may check a block size condition to which the secondary transform may be applied. The variables SubWidthC and SubHeightC are set according to the color format, and may represent the ratio of the width of the chroma component to the width of the luma component, and the ratio of the height of the chroma component to the height of the luma component, in a picture, respectively. For example, since a 4:2:0 color format image has a structure including one chroma sample per four luma samples, SubWidthC and SubHeightC may be both set to 2. For another example, since a 4:4:4 color format image has a structure including one chroma sample per one luma sample, SubWidthC and SubHeightC may be both set to 1. lfnstWidth, which is the number of samples in the horizontal direction of the current block, and lfnstHeight, which is the number of samples in the vertical direction, may be set based on SubWidthC and SubHeightC. When treeType is DUAL_TREE_CHROMA, since the transform unit includes only the chroma component, the number of samples in the horizontal direction of the chroma transform block is equal to the value obtained by dividing tbWidth, which is the width of the luma transform block, by SubWidthC. Similarly, the number of samples in the vertical direction of the chroma transform block is equal to the value obtained by dividing tbHeight, which is the height of the luma transform block, by SubHeightC. When treeType is SINGLE_TREE or DUAL_TREE_LUMA, since the transform unit includes a luma component, lnfnstWidth and lfnstHeight may be set to tbWidth and tbHeight, respectively. Since the minimum condition of the block to which the secondary transform may be applied is 4×4, if Min(lfnstWidth, lfnstHeight)>=4 is satisfied, lfnst_idx[x0][y0] may be parsed.

ii) sps_lfnst_enabled_flag==1

A second condition relates to a flag value indicating whether or not the secondary transform may be enabled or applied, and when the value of the flag (sps_lfnst_enabled_flag) indicating whether or not the secondary transform may be enabled or applied is set to 1, the decoder may parse lfnst_idx [x0][y0].

Specifically, the secondary transform may be indicated at a high-level syntax RBSP. A flag having a 1-bit size indicating whether or not the secondary transform may be enabled or applied may be included in at least one of SPS, PPS, VPS, tile group header, and slice header, and when sps_lfnst_enabled_flag is 1, it may indicate that the lfnst_idx [x0][y0] syntax element is present in the transform unit syntax. When sps_lfnst_enabled_flag is 0, it may indicate that the lfnst_idx[x0][y0] syntax element does not present in the transform unit syntax.

iii) CuPredMode[x0][y0]==MODE_INTRA

A third condition relates to a prediction mode, and the secondary transform may be applied only to the intra-predicted block. Therefore, when the current block is an intra-predicted block, the decoder may parse lfnst_idx[x0][y0].

iv) IntraSubPartitionsSplitType==ISP_NO_SPLIT

A fourth condition relates to whether or not the ISP prediction method is applied. When the ISP is not applied to the current block, the decoder may parse the lfnst_idx[x0][y0] syntax element.

Specifically, as described with reference to FIG. 11, when the current CU is partitioned into a plurality of transform units smaller than the size of the CU, the secondary transform may not be applied to the partitioned transform units. In this case, lfnst_idx[x0][y0], which is a syntax element related to the secondary transform, may be set to 0 without being parsed. When the transform tree for the current CU is split into a plurality of transform units smaller than the size of the CU, ISP prediction may be applied to the current coding unit. When intra prediction is applied to the current coding unit, the ISP prediction method may be a prediction method for splitting a transform tree into a plurality of transform units smaller than the size of a CU according to a preset splitting method. The ISP prediction mode may be indicated at the coding unit level, and a variable IntraSubPartitionsSplitType may be set based on it. When IntraSubPartitionsSplitType is ISP_NO_SPLIT, it indicates that ISP is not applied to the current block. Due to the characteristics of intra prediction in which prediction samples are generated at the transform unit level, the accuracy of prediction may be higher when the transform tree is split into a plurality of transform units than when the transform tree is not split. Therefore, it is highly likely that the energy of the residual signal is efficiently compacted even if the secondary transform is not applied to the split plurality of transform units.

v) !intra_mip_flag[x0][y0]

A fifth condition relates to an intra prediction method. When matrix based intra prediction (MIP) is not applied to the current coding unit prediction, the decoder may parse the lfnst_idx[x0][y0] syntax element.

Specifically, the matrix based intra prediction (MIP) may be used as a method for intra prediction, and whether or not the MIP is applied may be indicated by intra_mip_flag[x0][y0] at the coding unit level. When Intra_mip_flag[x0][y0] is 1, it may indicate that the MIP is applied to prediction of the current coding unit, and prediction may be performed by multiplying reconstructed samples around the current block and a preset matrix. Since a residual signal property different from general intra prediction that performs directional or non-directional prediction is appeared when the MIP is applied, the secondary transform may not be applied to the transform block when the MIP is applied.

vi) lfnstLastScanPos==0

A sixth condition relates to the last significant coefficient in the scan order of the transform block.

Specifically, when the position information (scan index) of the last significant coefficient in the scan order of the transform block included in the current transform unit is less than a preset threshold value, it is highly likely that the coding efficiency gain that may be obtained by the secondary transform is small. Therefore, in this case, it is highly likely that the encoder does not apply the secondary transform to the transform block (lfnst_idx[x0][y0] is 0), and therefore, the encoder may be considered to have high overhead for signaling lfnst_idx[x0][y0]. Therefore, lfnst_idx[x0][y0] may be parsed only when the position (scan index) of the last significant coefficient in the scan order is equal to or greater than a preset threshold value for at least one transform block included in the transform unit.

In other words, as described above, the threshold value may be an integer equal to or greater than 0. For example, assuming that the threshold value is 1, the fact that the position (scan index) of the last significant coefficient in the scan order is equal to or greater than the threshold value may mean that the significant coefficient is present at a position other than the upper left (scan index 0, DC) of the block. In this case, the fact that the position of the last significant coefficient in the scan order of the transform block is equal to or greater than the threshold value may be expressed as 'lfnstLastScanPos==0'.

vii) numZeroOutSigCoeff==0

A seventh condition relates to the significant coefficient present at a specific position.

Specifically, when the secondary transform is applied to the current block, the significant coefficient may not be present at a specific position in the scan position. That is, the numZeroOutSigCoeff variable indicates whether or not a non-zero transform coefficient is present at a specific position. For example, when the secondary transform is applied to the current block, it is assumed that only a maximum of 16 significant coefficients are allowed. In transform blocks of 4×4 and 8×8 sizes, significant coefficients may be present in the index [0, 7] region in the scan order (maximum of 8 non-zero transform coefficients are allowed). On the other hand, in transform blocks of a size other than 4×4 and 8×8, significant coefficients may be present in the index [0, 15] region in the scan order (maximum of 16 non-zero transform coefficients are allowed). Therefore, if the position (scan index) of the last significant coefficient in the scan order is present outside the above-described region where the significant coefficient may be present, the decoder may clearly recognize that the secondary transform is not applied to the current block. Therefore, since the secondary transform is not applied to the current block when numZeroOutSigCoeff>0, lfnst_idx[x0][y0] may be set to 0 without being parsed.

In other words, when numZeroOutSigCoeff is not 0 means that a significant coefficient is present at a specific position, and thus lfnst_idx[x0][y0] may be set to 0 without being parsed. On the other hand, when numZeroOutSigCoeff is 0, it means that no significant coefficient is present at a specific location, and thus lfnst_idx[x0][y0] may be parsed.

If all of the above-described conditions i) to vii) are true, lfnst_idx[x0][y0] may be parsed, otherwise, lfnst_idx[x0][y0] may be set to 0 without being parsed.

FIG. 27 illustrates a syntax structure related to a position of a last significant coefficient in a scan order according to an embodiment of the present invention.

Referring to FIG. 27, a last_significant_pos syntax structure refers to a syntax structure including position information of the last significant coefficient in the scan order for the transform of each of color components Y, Cb, and Cr. In addition, the last_significant_pos syntax structure may receive, as inputs, (x0, y0), which is the upper left coordinate of the transform block, log2TbWidth obtained by taking a logarithm of base 2 to the width of the transform block, log2TbHeight obtained by taking a logarithm of base 2 to the height of the transform block, and cIdx representing the color component of the transform block. When cIdx is 0, the luma transform block may be represented, when cIdx is 1, the chroma Cb transform block may be represented, and when cIdx is 2, the chroma Cr transform block may be represented.

In the last_significant_pos syntax structure, the syntax element related to position information of the last significant coefficient in the scan order may be parsed. Specifically, the syntax element related to an x-coordinate value and a y-coordinate value of the last significant coefficient in the scan order may be parsed. In this case, each coordinate value may be indicated by being divided into prefix information and suffix information. The decoder may set a LastSignificantCoeffX variable, which is the x coordinate of the last significant coefficient in the scan order, based on the prefix information and the suffix information for the x coordinate. Similarly, the decoder may set a LastSignificantCoeffY variable, which is the y coordinate of the last significant coefficient in the scan order, based on the prefix information and the suffix information for the y coordinate. As illustrated in FIG. 27, in the do{ }while( ) structure, the decoder may set lastScanPos, which is the scan index of the last significant coefficient in the scan order, based on LastSignificantCoeffX, LastSignificantCoeffY, and DiagScanOrder. In addition, the decoder may update, based on lastScanPos, numZeroOutSigCoeff and lfnstLastScanPos, which are variables used in a parsing condition of lfnst_idx[x0][y0] which is a syntax element related to the secondary transform.

If the secondary transform is applied to the current block, the significant coefficient is not possible to be present at a specific position on the scan position. The numZeroOutSigCoeff variable indicates whether or not a non-zero transform coefficient is present at the position. For example, when the secondary transform is applied to the current block, it is assumed that only a maximum of 16 significant coefficients are allowed. In transform blocks of 4×4 and 8×8 sizes, significant coefficients may be present in the index [0, 7] region in the scan order (maximum of 8 non-zero transform coefficients are allowed). On the other hand, in transform blocks of a size other than 4×4 and 8×8, significant coefficients may be present in the index [0, 15] region in the scan order (maximum of 16 non-zero transform coefficients are allowed). Therefore, if the position (scan index) of the last significant coefficient in the scan order is present outside the above-described region where the significant coefficient may be present, the decoder may clearly recognize that the secondary transform is not applied to the current block. The minimum size of a block to which the secondary transform may be applied is 4×4, and when the transform skip is applied (transform_skip_flag[x0][y0]==1), the secondary transform may not be applied. Therefore, for a transform block of which the width is 4 or more (log2TbWidth>=2), of which the height is 4 or more (log2TbHeight>=2), and to which the transform skip is not applied (transform_skip_flag[x0][y0]==0), numZeroOutSigCoeff may be updated. When the secondary transform is applied, for a 4×4 or 8×8 sized transform block, a non-zero transform coefficient (significant coefficient) may be present only in the index [0, 7] region in the scan order. Therefore, when the transform block is 4×4 or 8×8, ((log2TbWidth==2||log2TbHeight==3) &&(log2TbWidth==log2TbHeight)) and lastScanPos is greater than 7 (lastScanPos>7), numZeroOutSigCoeff may increase by 1. For blocks excluding the block of a size of 4×4 or 8×8 to which the secondary transform may be applied, a non-zero transform coefficient may be present only in the index [0, 15] region in the scan order. Therefore, when lastScanPos is greater than 15 (lastScanPos>15), numZeroOutSigCoeff may increase by 1.

The decoder may determine lfnstLastScanPos based on lastScanPos. Specifically, when the width and height of the transform block is 4 or more and the transform skip is not applied to the transform block, lfnstLastScanPos may be set as in Equation 6 below. In other words, when log2TbWidth>=2, log2TbHeight>=2, and transform_skip_flag[x0][y0] is 0, lfnstLastScanPos may be set as in Equation 6 below. In this case, when transform_skip_flag[x0][y0] is 0, it may mean that the transform skip is not applied to the current transform block.

$$\text{lfnstLastScanPos=lfnstLastScanPos\&\&} \\ \text{(lastScanPos<lfnstLastScanPosTh[cIdx])} \quad \text{[Equation 6]}$$

As described above, the initial value of lfnstLastScanPos may be set to 1.

As described above, in Equation 6, cIdx may represent a variable indicating a color component of the current transform block.

According to Equation 6, when the immediate previous lfnstLastScanPos is 1 and lastScanPos is less than lfnstLastScanPosTh[cIdx], lfnstLastScanPos may be updated to 1. On the other hand, when the immediately previous lfnstLastScanPos is 0 or lastScanPos is equal to or greater than lfnstLastScanPosTh[cIdx], lfnstLastScanPos may be updated to 0.

In other words, when lastScanPos of all transform blocks included in the transform unit is less than the threshold value or coefficients of all transform blocks are all 0, determination may be made that lfnstLastScanPos is 1, and lfnst_idx[x0][y0] may be set to 0 without being parsed according to the parsing condition of lfnst_idx[x0][y0] of FIG. 26. This indicates that the secondary transform is not applied to the current block. On the other hand, if any one of the transform blocks included in the transform unit has lastScanPos equal to or greater than the threshold value, determination may be made that lfnstLastScanPos is 0, and if the conditions i), ii), iii), iv), v), and vii) of FIG. 26 are all satisfied (if all are true), the decoder may parse lfnst_idx[x0][y0]. The decoder may parse lfnst_idx[x0][y0] to check whether or not the secondary transform is applied to the current block, and when the secondary transform is applied to the current block, a transform kernel used for the secondary transform may be checked/determined.

lfnstLastScanPosTh[cIdx] in Equation 6 is a preset integer value equal to or greater than 0, and both the encoder and the decoder may use the same value. In addition, all color components may use the same threshold value. In this case, lfnstLastScanPos may be set as in Equation 7 below.

$$\text{lfnstLastScanPos=lfnstLastScanPos\&\&} \\ \text{(lastScanPos<lfnstLastScanPosTh)} \quad \text{[Equation 7]}$$

LfnstLastScanPosTh is a preset integer value equal to or greater than 0, and both the encoder and the decoder may use the same value. For example, lfnstLastScanPosTh may be 1. That is, when lastScanPos is 1 or more, lfnstLastScanPos may be updated to 0, and lfnst_idx[x0][y0] may be parsed. In this case, since the threshold value lfnstLastScanPosTh is an integer value, a case in which lastScanPos is 1 or more may have the same meaning as a case in which lastScanPos is greater than 0. In FIG. 27, a case where all color components have the same threshold value of 1 has been described; however, the present invention is not limited thereto.

FIG. 28 is a diagram illustrating a residual_coding syntax structure according to an embodiment of the present invention.

Referring to FIG. 28, position information of the last significant coefficient in the scan order may be indicated before the coefficient coding (residual_coding). Therefore, the coefficient coding (residual_coding) syntax structure may not include a syntax structure related to position information of the last significant coefficient in the scan order. For example, the position information of the last significant coefficient in the scan order may be a prefix and a suffix for the x-coordinate and a prefix or a suffix for the y-coordinate, of the last significant coefficient in the scan order. Referring to the coefficient coding (residual_coding) syntax structure with reference to FIG. 28, the coefficient coding (residual_coding) may be performed based on LastSignificantCoeffX and LastSignificantCoeffY, which are the x-coordinate and the y-coordinate of the last significant coefficient in the scan order determined before the coefficient coding (residual_coding).

The secondary transform indication method according to the fourth embodiment does not use the numSigCoeff counter. Therefore, even if the coefficient at the (xC, yC) position is a significant coefficient (sig_coeff_flag[xC][yC]==1), numSigCoeff may not be updated. In other words, the secondary transform indication method according to the fourth embodiment may be a method in which a counter for a significant coefficient is not used. In addition, with the secondary transform indication method according to the fourth embodiment, since the numZeroOutSigCoeff variable may be set based on lastScanPos, a counter based on sig_coeff_flag may not be used in the coefficient coding (residual_coding).

Figure 29:
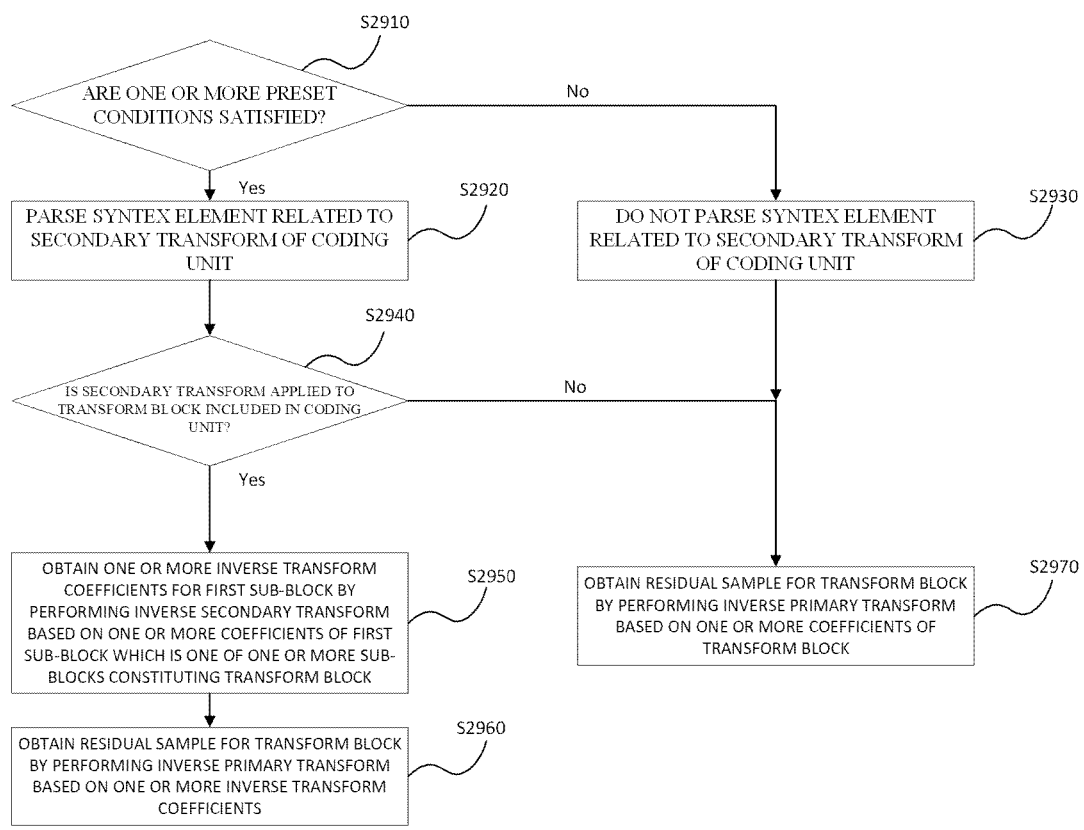
FIG. 29 is a flowchart showing a video signal processing method according to an embodiment of the present invention.

FIG. 29 is a flowchart showing a video signal processing method according to an embodiment of the present invention.

Hereinafter, a video signal processing method and apparatus based on the embodiments described with reference to FIGS. 15 to 28 will be described.

The video signal decoding apparatus may include a processor that performs the video signal processing method described in FIG. 29.

First, the processor may receive a bitstream including a syntax element related to a secondary transform of a coding unit.

The processor may check whether or not one or more preset conditions are satisfied, and when the one or more preset conditions are satisfied, the processor may parse the syntax element related to the secondary transform of the coding unit (S2910 and S2920). On the other hand, when one or more preset conditions are not satisfied, the processor may not parse the syntax element related to the secondary transform of the coding unit (S2930). In this case, the value of the syntax element related to the secondary transform may be set to 0.

The syntax element related to the secondary transform of the coding unit described in FIG. 29 may be lfnst_idx[x0][y0], which is a syntax element indicating whether or not the secondary transform is applied to the transform block included in the current coding unit described in FIGS. 15 to 28.

The processor may parse the syntax element related to the secondary transform of the coding unit through step S2920, and may check whether or not the secondary transform is applied to the transform block included in the coding unit based on the parsed syntax element (S2940).

In this case, the processor may obtain one or more inverse transform coefficients for a first sub-block by performing an inverse secondary transform based on one or more coefficients of the first sub-block which is one of one or more sub-blocks constituting the transform block when the secondary transform is applied to the transform block (S2950).

Then, the processor may obtain a residual sample for the transform block by performing an inverse primary transform based on the one or more inverse transform coefficients obtained in S2950 (S2960).

The secondary transform may be a low frequency nonseparable transform (LFNST). In addition, the transform block may be a block to which a primary transform that is separable into a vertical transform and a horizontal transform is applied. In this case, the inverse primary transform may refer to an inverse transform for the primary transform, and the inverse secondary transform may refer to an inverse transform for the secondary transform.

The syntax element related to the secondary transform of the coding unit may include information indicating whether or not the secondary transform is applied to the coding unit and information indicating a transform kernel used for the secondary transform.

The first sub-block may be a first sub-block according to a preset scan order, and in this case, the index of the first sub-block may be 0.

A first condition of the one or more preset conditions may be a case where an index value indicating a position of a first coefficient among the one or more coefficients of the first sub-block is greater than a preset threshold value. In this case, the first coefficient may be a last significant coefficient according to a preset scan order, and the significant coefficient may refer to a non-zero coefficient. The preset threshold value may be 0. The preset scan order may be an up-right diagonal scan order described in FIGS. 13 and 14.

A second condition among the one or more preset conditions may be a case where the width and the height of the transform block are 4 pixels or more.

A third condition of the one or more preset conditions may be a case where a value of a transform skip flag included in the bitstream is not a specific value. In this case, the transform skip flag may indicate that the primary transform and the secondary transform are not applied to the transform block when the transform skip flag value has the specific value.

A fourth condition of the one or more preset conditions may be a case where at least one coefficient of the one or more coefficients of the sub-block is not 0 and the at least one coefficient is present in a place other than a first position according to a preset scan order. In this case, the first position in the preset scan order may mean a position in which the horizontal and vertical coordinate values are (0, 0) as described above, or the first position according to the preset scan order (e.g., up-right diagonal order).

In addition, the coding unit may include a plurality of coding blocks. In this case, the syntax element related to the secondary transform may be parsed when at least one of the transform blocks corresponding to a plurality of coding blocks, respectively, satisfies the one or more preset conditions.

On the other hand, when the syntax element related to the secondary transform is not parsed or is set to 0 (S2930), or when it is confirmed that the secondary transform is not applied to the transform block included in the coding unit in step S2940, the processor may obtain the residual sample for the transform block by performing the inverse primary transform based on one or more coefficients of the transform block (S2970).

In this case, the above-described inverse primary transform and inverse secondary transform may be inverse transforms of the primary transform and secondary transform, respectively.

The video signal processing method performed by the video signal decoding apparatus described in FIG. 29 or a method similar thereto may be performed by a video signal encoding apparatus.

The video signal encoding apparatus may include a processor that encodes a video signal.

In this case, the processor may obtain a plurality of primary transform coefficients for a block by performing the primary transform on the residual sample of the block included in the coding unit. The processor may obtain one or more secondary transform coefficients for a first sub-block which is one of sub-blocks constituting the block by performing a secondary transform based on one or more of the plurality of primary transform coefficients. The processor may obtain a bitstream by encoding information on the one or more secondary transform coefficients and a syntax element related to the secondary transform of the coding unit.

The secondary transform may be referred to as a low frequency non-separable transform (LFNST), and the primary transform may be separable into the vertical transform and the horizontal transform.

In addition, the syntax element related to the secondary transform may be encoded when one or more preset conditions are satisfied. The syntax element related to the secondary transform may include information indicating whether or not the secondary transform is applied to the coding unit and information indicating a transform kernel used for the secondary transform. In this case, the syntax element related to the secondary transform may be lfnst_idx [x0][y0], which is the syntax element described in FIGS. 15 to 28.

The first sub-block may be a first sub-block according to the preset scan order. In this case, the index of the first sub-block may be 0.

A first condition of the one or more preset conditions may be a case where an index value indicating a position of a first coefficient among the one or more secondary transform coefficients is greater than a preset threshold value. In this case, the first coefficient may be the last significant coefficient according to the preset scan order, and the significant coefficient may refer to a non-zero coefficient. The preset threshold value may be 0. The preset scan order may be an up-right diagonal scan order described in FIGS. 13 and 14.

A second condition among the one or more preset conditions may be a case where the width and the height of the primary transform block are 4 pixels or more.

A third condition of the one or more preset conditions may be a case where a value of a transform skip flag included in the bitstream is not a specific value. In this case, the transform skip flag may indicate that the primary transform and the secondary transform are not applied to the block when the transform skip flag value has the specific value.

A fourth condition of the one or more preset conditions may be a case where at least one coefficient of the one or more secondary transform coefficients is not 0 and the at least one coefficient is present in a place other than a first position according to a preset scan order. In this case, the first position in the preset scan order may mean a position in which the horizontal and vertical coordinate values are (0, 0) as described above, or the first position according to the preset scan order (e.g., up-right diagonal order).

In addition, the coding unit may include a plurality of coding blocks. In this case, the syntax element related to the secondary transform may be encoded when at least one of the (transform) blocks included in the coding unit corresponding to each of the plurality of coding blocks satisfies the one or more preset conditions.

In addition, the video signal encoding apparatus may include a video signal decoding processor that performs the video signal processing method described in FIG. 29.

As described above, the bitstream may include syntax elements related to the secondary transform of the coding units described in FIGS. 15 to 29. In this case, the bitstream may be stored in a non-transitory computer-readable medium. Meanwhile, when the above-described one or more preset conditions are not satisfied, the video signal encoding apparatus may not include the syntax element related to the secondary transform in the bitstream or may set the syntax element related to the secondary transform to 0. The bitstream may be decoded by the video signal decoding apparatus described with reference to FIG. 29 or may be encoded by the video signal encoding apparatus described above.

A method for encoding the bitstream may be an encoding method including, for example, performing a primary transform on a residual sample of a block included in a coding unit to obtain a plurality of primary transform coefficients for the block, performing a secondary transform based on one or more coefficients of the plurality of primary transform coefficients to obtain one or more secondary transform coefficients for a first sub-block which is one of sub-blocks constituting the block, and encoding information on the one or more secondary transform coefficients and a syntax element related to the secondary transform of the coding unit.

In the present specification, acquiring a coefficient may mean obtaining a pixel/block related to the coefficient, and acquiring a residual sample may mean acquiring a residual signal/pixel/block related to the residual sample.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including instructions executable by a computer, such as a program module executed by a computer. A computer-readable medium may be any available medium that is accessible by a computer, and includes both volatile and nonvolatile media, removable and non-removable media. Further, the computer-readable medium may include both computer storage media and communication media. The computer storage medium includes both volatile and nonvolatile, removable and non-removable media implemented in any method or technology for storage of information such as computer readable instructions, data structures, program modules or other data. The communication media typically include computer readable instructions, data structures, other data in a modulated data signal such as program modules, or other transmission mechanisms, and include any information delivery media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding apparatus, comprising a processor,
    wherein the processor is configured to:
    parse a syntax element related to a secondary transform of a coding unit based on whether a prediction method of the coding unit is MIP (Matrix based Intra Prediction),
    check whether or not the secondary transform is applied to a transform block included in the coding unit based on the parsed syntax element,
    obtain one or more inverse transform coefficients based on an inverse transform of the secondary transform when the secondary transform is applied to the transform block, and
    obtain a residual sample for the transform block based on the one or more inverse transform coefficients,
    wherein the secondary transform is low frequency non-separable transform (LFNST),
    wherein the syntax element is parsed when one or more preset conditions are satisfied,
    wherein a first condition of the one or more preset conditions is that an index of a last significant coefficient according to a preset scan order in a sub-block is greater than 0, and
    wherein the sub-block is a first sub-block according to the preset scan order in the transform block.

2. The video signal decoding apparatus of claim 1,
    wherein the syntax element includes information indicating whether or not the secondary transform is applied to the coding unit and indicating a transform kernel used for the secondary transform.

3. The video signal decoding apparatus of claim 1,
    wherein a second condition of the one or more preset conditions is that a width and height of the transform block are 4 or more.

4. The video signal decoding apparatus of claim 1,
    wherein the preset scan order is an up-right diagonal scan order.

5. The video signal decoding apparatus of claim 1,
    wherein a third condition of the one or more preset conditions is that a value of a transform skip flag included in a bitstream is not a specific value, and
    wherein the transform skip flag indicates that a primary transform and the secondary transform are not applied to the transform block when the value of the transform skip flag is the specific value.

6. The video signal decoding apparatus of claim 4,
    wherein indices of the one or more inverse transform coefficients are determined based on the preset scan order,
    wherein an index of a first coefficient among the one or more inverse transform coefficients is 0, and
    wherein the last significant coefficient is a non-zero coefficient.

7. The video signal decoding apparatus of claim 1,
    wherein the coding unit includes a plurality of coding blocks according to a color format of a video signal, and
    wherein the syntax element is parsed when at least one of transform blocks corresponding to each of the plurality of coding blocks satisfies the one or more preset conditions.

8. The video signal decoding apparatus of claim 1,
    wherein the transform block is a block to which a primary transform that is separable into a vertical transform and a horizontal transform is applied.

9. The video signal decoding apparatus of claim 8,
    wherein the residual sample is obtained by performing an inverse transform of the primary transform based on the one or more inverse transform coefficients.

10. A video signal encoding apparatus, comprising a processor,
    wherein the processor is configured to:
    obtain a bitstream to be decoded by a decoder using a decoding method,
    wherein the decoding method comprises:
    parsing a syntax element related to a secondary transform of a coding unit based on whether a prediction method of the coding unit is MIP (Matrix based Intra Prediction);
    checking whether or not the secondary transform is applied to a transform block included in the coding unit based on the parsed syntax element;
    obtaining one or more inverse transform coefficients based on an inverse transform of the secondary transform when the secondary transform is applied to the transform block; and
    obtaining a residual sample for the transform block based on the one or more inverse transform coefficients,
    wherein the secondary transform is low frequency non-separable transform (LFNST),
    wherein the syntax element is parsed when one or more preset conditions are satisfied,
    wherein a first condition of the one or more preset conditions is that an index of a last significant coefficient according to a preset scan order in a sub-block is greater than 0, and
    wherein the sub-block is a first sub-block according to the preset scan order in the transform block.

11. The video signal encoding apparatus of claim 10,
    wherein the syntax element includes information indicating whether or not the secondary transform is applied to the coding unit and indicating a transform kernel used for the secondary transform.

12. The video signal encoding apparatus of claim 10,
    wherein a second condition of the one or more preset conditions is that a width and height of the transform block are 4 or more.

13. The video signal encoding apparatus of claim 10,
    wherein the preset scan order is an up-right diagonal scan order.

14. The video signal encoding apparatus of claim 10,
wherein a third condition of the one or more preset conditions is that a value of a transform skip flag included in the bitstream is not a specific value, and
wherein the transform skip flag indicates that a primary transform and the secondary transform are not applied to the transform block when the value of the transform skip flag is the specific value.

15. The video signal encoding apparatus of claim 13,
wherein indices of the one or more inverse transform coefficients are determined based on the preset scan order,
wherein an index of a first coefficient among the one or more inverse transform coefficients is 0, and
wherein the last significant coefficient is a non-zero coefficient.

16. The video signal encoding apparatus of claim 10,
wherein the coding unit includes a plurality of coding blocks according to a color format of a video signal, and
wherein the syntax element is parsed when at least one of transform blocks corresponding to each of the plurality of coding blocks satisfies the one or more preset conditions.

17. The video signal encoding apparatus of claim 10,
wherein the transform block is a block to which a primary transform that is separable into a vertical transform and a horizontal transform is applied.

18. The video signal encoding apparatus of claim 17,
wherein the residual sample is obtained by performing an inverse transform of the primary transform based on the one or more inverse transform coefficients.

19. A non-transitory computer-readable medium storing a bitstream, the bitstream being decoded by a decoding method,
wherein the decoding method comprises:
parsing a syntax element related to a secondary transform of a coding unit based on whether a prediction method of the coding unit is MIP (Matrix based Intra Prediction);
checking whether or not the secondary transform is applied to a transform block included in the coding unit based on the parsed syntax element;
obtaining one or more inverse transform coefficients based on an inverse transform of the secondary transform when the secondary transform is applied to the transform block; and
obtaining a residual sample for the transform block based on the one or more inverse transform coefficients,
wherein the secondary transform is low frequency non-separable transform (LFNST),
wherein the syntax element is parsed when one or more preset conditions are satisfied,
wherein a first condition of the one or more preset conditions is that an index of a last significant coefficient according to a preset scan order in a sub-block is greater than 0, and
wherein the sub-block is a first sub-block according to the preset scan order in the transform block.

20. A method of decoding a video signal, the method comprising:
parsing a syntax element related to a secondary transform of a coding unit based on whether a prediction method of the coding unit is MIP (Matrix based Intra Prediction);
checking whether or not the secondary transform is applied to a transform block included in the coding unit based on the parsed syntax element;
obtaining one or more inverse transform coefficients based on an inverse transform of the secondary transform when the secondary transform is applied to the transform block; and
obtaining a residual sample for the transform block based on the one or more inverse transform coefficients,
wherein the secondary transform is low frequency non-separable transform (LFNST),
wherein the syntax element is parsed when one or more preset conditions are satisfied,
wherein a first condition of the one or more preset conditions is that an index of a last significant coefficient according to a preset scan order in a sub-block is greater than 0, and
wherein the sub-block is a first sub-block according to the preset scan order in the transform block.

* * * * *